(12) United States Patent
Kato

(10) Patent No.: US 11,460,752 B2
(45) Date of Patent: Oct. 4, 2022

(54) WAVELENGTH CONVERSION DEVICE AND WAVELENGTH CONVERSION METHOD

(71) Applicant: FUJITSU LIMITED, Kawasaki (JP)

(72) Inventor: Tomoyuki Kato, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/166,667

(22) Filed: Feb. 3, 2021

(65) Prior Publication Data

US 2021/0286228 A1 Sep. 16, 2021

(30) Foreign Application Priority Data

Mar. 13, 2020 (JP) .............................. JP2020-044635

(51) Int. Cl.
   *G02F 1/35* (2006.01)
(52) U.S. Cl.
   CPC .................................. *G02F 1/3505* (2021.01)
(58) Field of Classification Search
   None
   See application file for complete search history.

(56) References Cited

U.S. PATENT DOCUMENTS

| 8,054,525 B2 * | 11/2011 | Okuno ..................... G02F 1/353 |
| | | 359/244 |
| 2005/0264871 A1 | 12/2005 | Takahashi et al. |
| 2008/0291528 A1 * | 11/2008 | Susumu ................ G02F 1/3501 |
| | | 359/326 |
| 2018/0159631 A1 * | 6/2018 | Nakahara ................ H04J 14/02 |
| 2021/0286228 A1 * | 9/2021 | Kato ....................... G02F 1/0147 |
| 2021/0405502 A1 * | 12/2021 | Umeki ...................... G02F 1/377 |

FOREIGN PATENT DOCUMENTS

| JP | H06-281510 A | 10/1994 |
| JP | 2005-301009 A | 10/2005 |
| WO | WO-2014045658 A1 * | 3/2014 ........... G02F 1/3544 |

* cited by examiner

Primary Examiner — Rhonda S Peace
(74) Attorney, Agent, or Firm — Fujitsu Patent Center

(57) ABSTRACT

A wavelength conversion device includes a nonlinear optical medium and a controller. The nonlinear optical medium configured to generate light from signal light and excitation light, the excitation light having a wavelength different from a wavelength of the signal light and having a second electric field strength than a first electric field strength of the signal light, the light having a wavelength different from a wavelengths of the signal light and the excitation light. The controller configured to control a first temperature of the nonlinear optical medium based on an intensity of the light.

16 Claims, 52 Drawing Sheets

| TEMPERATURE (°C) | INTENSITY RATIO (Ias/Is) | ZERO DISPERSION WAVELENGTH (nm) |
|---|---|---|
| 10 | 0.866 | 1567.1 |
| ⋮ | ⋮ | ⋮ |
| 30 | 1.000 | 1567.8 |
| ⋮ | ⋮ | ⋮ |
| 50 | 1.134 | 1568.5 |
| ⋮ | ⋮ | ⋮ |

402D3

WAVELENGTH CONVERSION DEVICE AND WAVELENGTH CONVERSION METHOD

CROSS-REFERENCE TO RELATED APPLICATION

This application is based upon and claims the benefit of priority of the prior Japanese Patent Application No. 2020-44635, filed on Mar. 13, 2020, the entire contents of which are incorporated herein by reference.

FIELD

The embodiments discussed herein are related to a wavelength conversion device and a wavelength conversion method.

BACKGROUND

A wavelength conversion device has been devised that generates, from signal light, new light having a wavelength different from that of the signal light by using a nonlinear optical effect of an optical fiber. When the wavelength of the signal light is within a certain range (hereinafter referred to as a wavelength conversion band), the new light is efficiently generated. The wavelength conversion band fluctuates depending on a change in a temperature (hereinafter referred to as an environmental temperature) of an environment in which the wavelength conversion device is placed.

By limiting a wavelength dispersion slope or the like of the optical fiber to less than or equal to a certain value, the fluctuation of the wavelength conversion band is suppressed to some extent (see, for example, Patent Document 1). To further suppress the fluctuation of the wavelength conversion band, the optical fiber is housed in a thermostatic chamber (see, for example, Japanese Laid-open Patent Publication No. 2005-301009).

A temperature of the optical fiber can be derived from a measurement result of Raman scattered light generated in the optical fiber (see, for example, Japanese Laid-open Patent Publication No. 6-281510).

Japanese Laid-open Patent Publication No. 2005-301009 and Japanese Laid-open Patent Publication No. 6-281510 are disclosed as related art.

SUMMARY

According to an aspect of the embodiments, a wavelength conversion device includes: a nonlinear optical medium configured to generate light from signal light and excitation light, the excitation light having a wavelength different from a wavelength of the signal light and having a second electric field strength than a first electric field strength of the signal light, the light having a wavelength different from a wavelengths of the signal light and the excitation light; and a controller configured to control a first temperature of the nonlinear optical medium based on an intensity of the light.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of spectra of the signal light and the like;

FIG. 14 is a diagram illustrating an example of spectra of the signal light 108 and the like;

FIG. 16 is a diagram illustrating an example of an excitation light source 32 and the like;

FIG. 17 is a diagram illustrating an example of an optical filter 60 and the like;

FIG. 32 is a diagram illustrating an example of spectra of the signal light 208 and the like;

FIG. 35 is a diagram illustrating an example of spectra of signal light 308 and the like;

FIG. 41 is a diagram illustrating an example of a look-up table recorded in a non-volatile memory 76;

DESCRIPTION OF EMBODIMENTS

In the related art, it is possible to suppress the fluctuation of the wavelength conversion band due to a change in the environmental temperature to some extent by limiting the wavelength dispersion slope or the like of the optical fiber to less than or equal to the certain value. However, even if the wavelength dispersion slope or the like is limited, the temperature of the optical fiber changes together with the environmental temperature, so that the suppression of the fluctuation of the wavelength conversion band is limited and insufficient. Thus, an object of the embodiments is to solve such a problem.

By the way, the wavelength conversion band is a wavelength range in which a ratio ($E/E_0$) between a ratio E (which is a wavelength conversion efficiency) of an intensity of newly generated light to an intensity of signal light and its maximum value $E_0$ (which is the maximum value of the wavelength conversion efficiency E) is kept at greater than or equal to a certain value (for example, −3 dB). When the wavelength conversion efficiency changes due to a change in the environmental temperature or the like, the wavelength conversion band also changes. Thus, "fluctuation of the wavelength conversion band" can be rephrased as "fluctuation of the wavelength conversion efficiency".

Hereinafter, embodiments will be described with reference to the drawings. However, the technical scope is not limited to the embodiments, but extends to the matters described in the claims and equivalents thereof. Even in different drawings, portions or the like having the same structure are denoted by the same reference signs, and the description thereof will be omitted.

First Embodiment (1) Structure

Figure 1:
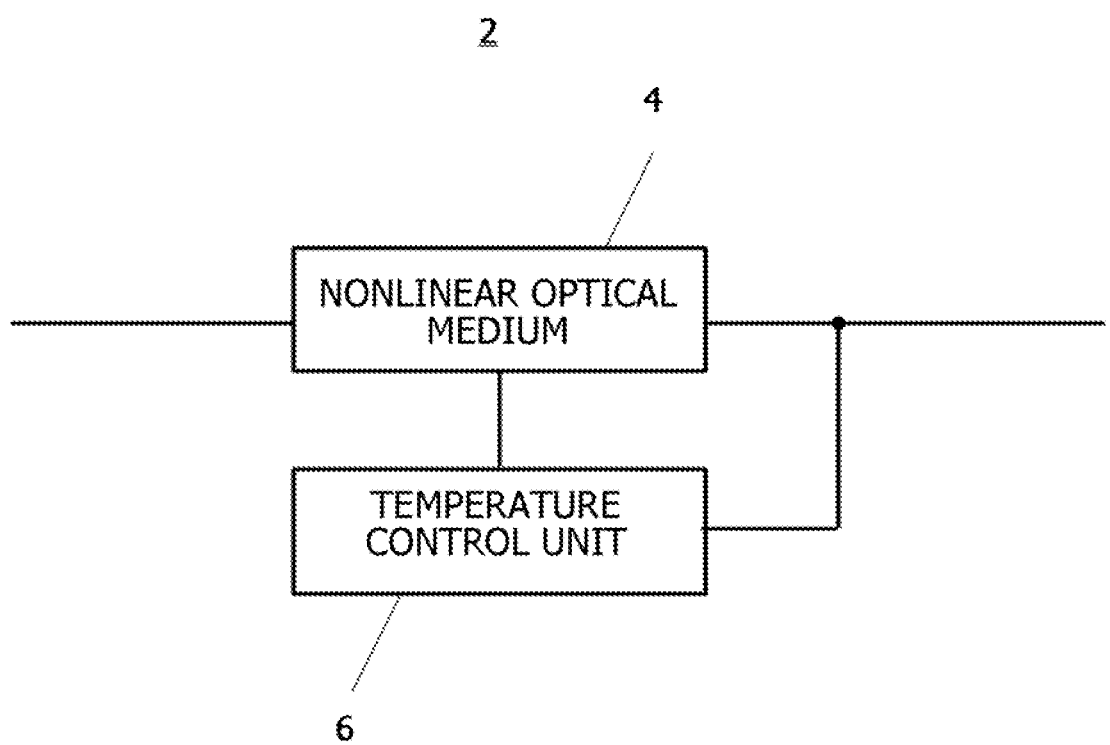
FIG. 1 is a functional block diagram illustrating an example of a wavelength conversion device 2 of a first embodiment.

FIG. 1 is a functional block diagram illustrating an example of a wavelength conversion device 2 of a first embodiment. As illustrated in FIG. 1, the wavelength conversion device 2 of the first embodiment includes a nonlinear optical medium 4 that generates new light from input light. The wavelength conversion device 2 of the first embodiment further includes a temperature control unit 6 that controls a temperature of the nonlinear optical medium 4 based on an intensity of the new light generated by the nonlinear optical medium 4.

The nonlinear optical medium 4 is, for example, a single-mode optical fiber. A material of the single-mode optical fiber of the first embodiment is, for example, quartz ($SiO_2$). A core of the single-mode optical fiber is, for example, quartz to which aluminum (Al), bismuth (Bi), phosphorus (P) or germanium (Ge) is added. A length of the single-mode optical fiber (which is the nonlinear optical medium 4) of the first embodiment is, for example, 100 m to 1000 m or 250 m to 750 m. The nonlinear optical medium 4 may be a medium that maintains polarization of signal light (for example, a polarization-maintaining optical fiber).

The nonlinear optical medium 4 may be an optical waveguide including a semiconductor (for example, Si, SiN, GaAs, AlGaAs, InP, InGaAsP). The nonlinear optical medium 4 may be an optical waveguide including a dielectric (for example, quartz glass, lithium niobate, chalcogenide glass).

A hardware configuration of the temperature control unit 6 will be described in a second embodiment.

(2) Operation

Operation and the like of each functional block illustrated in FIG. 1 will be described.

(2-1) Operation of Nonlinear Optical Medium

Figure 2:
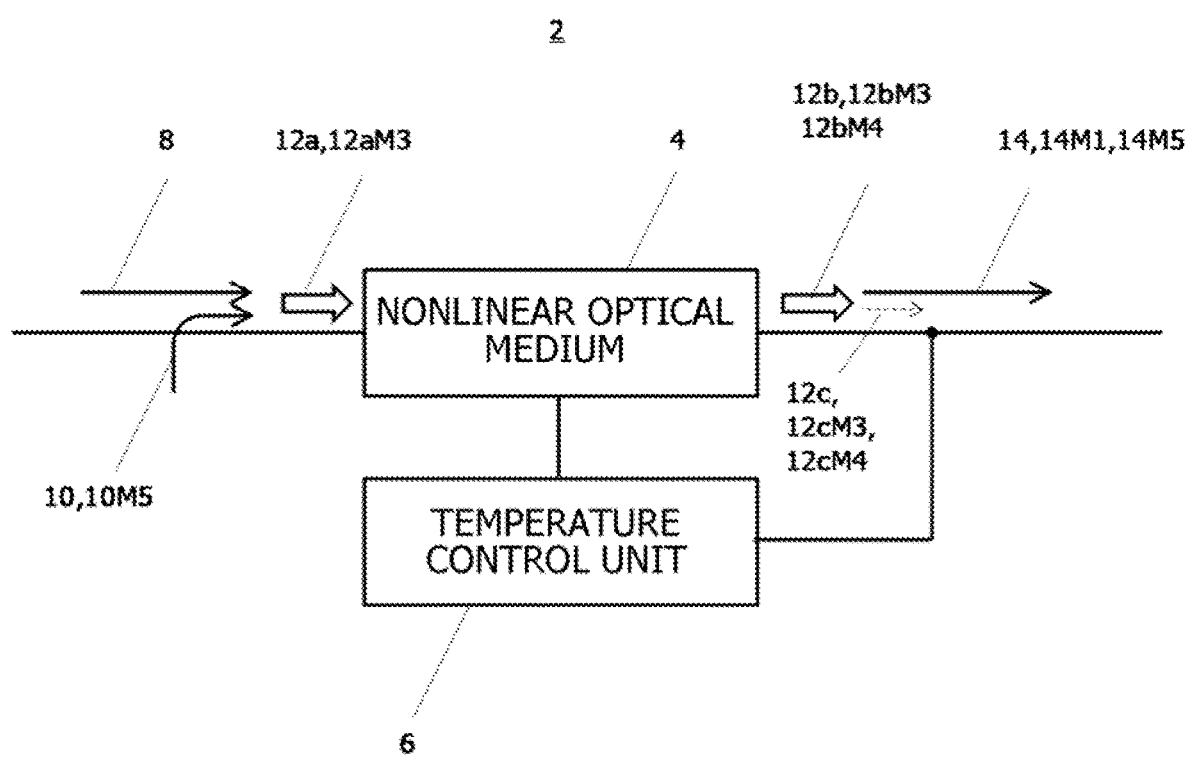
FIG. 2 is a diagram illustrating an example of a flow of signal light and the like in the wavelength conversion device 2.

FIG. 2 is a diagram illustrating an example of a flow of the signal light and the like in the wavelength conversion device 2.

Figure 3:
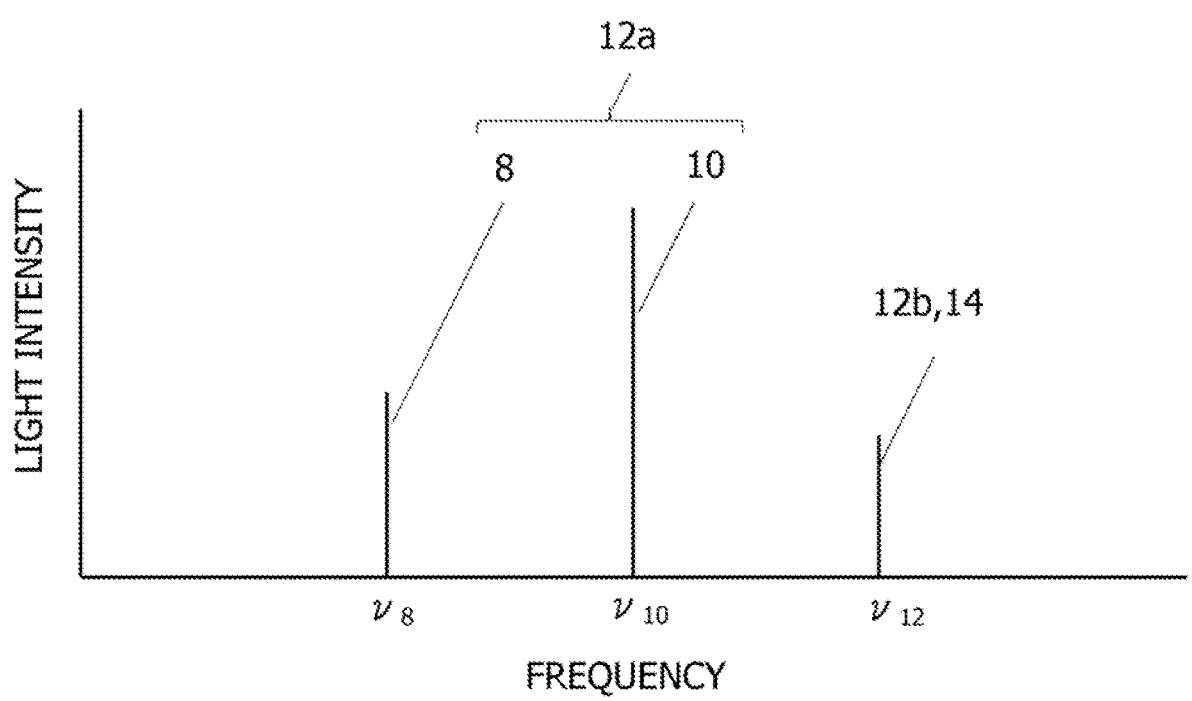

FIG. 3 is a diagram illustrating an example of spectra of the signal light and the like. The horizontal axis is a frequency of light. The vertical axis is an intensity of the light (which is optical power). The unit on the vertical axis is an arbitrary unit, and the scale on the vertical axis is a log scale (the same applies to the drawings below). A reference numeral (for example, "8") attached to light (for example, the signal light) corresponding to each spectrum is attached to each spectrum in FIG. 3 (hereinafter, the same applies). In other words, the reference numeral "8" is attached to the spectrum of signal light 8.

The nonlinear optical medium 4 (see FIG. 2) generates second light 12b from first light 12a including the signal light 8 (see FIGS. 2 and 3) and excitation light 10. The first light 12a is the input light of the nonlinear optical medium 4. The second light 12b is the new light generated by the nonlinear optical medium 4. The second light 12b of the first embodiment is wavelength-converted light 14 generated from the signal light 8 and the excitation light 10.

In the example illustrated in FIG. 3, a frequency of the signal light 8 is vs. A frequency of the excitation light 10 is a frequency $v_{10}$ different from the frequency vs of the signal light 8. The excitation light 10 is light stronger than the signal light 8. A frequency $v_{12b}$ of the new light (which is the second light 12b) is a frequency different from the frequency vs of the signal light 8 and the frequency $v_{10}$ of the excitation light 10. An intensity (which is optical power) of the excitation light 10 is preferably kept constant over time.

The frequency of light is inversely proportional to the wavelength of light. The electric field strength of light is proportional to the square root of the intensity of light (which is the optical power).

As described above, the nonlinear optical medium 4 generates light (which is the second light 12b) having a wavelength different from that of the signal light 8 and the excitation light 10, from the signal light 8 and the excitation light 10 having a wavelength different from that of the signal light 8 and having a stronger electric field strength than that of the signal light 8.

By the way, the spectra of the signal light 8 and the like are localized in a narrow wavelength range. The wavelength of the signal light 8 is a center wavelength of the signal light 8. The center wavelength is a wavelength located at the center of the 3 dB band of light (which is a wavelength range in which the intensity of light is within −3 dB of its maximum value). The same applies to light (for example, the excitation light 10 and the like) other than the signal light 8.

The nonlinear optical medium 4 of the first embodiment (for example, a single-mode optical fiber) generates the wavelength-converted light 14 (see FIGS. 2 and 3) by degenerate four-wave mixing. In other words, the wavelength-converted light 14 is generated by the third-order nonlinear polarization of the nonlinear optical medium 4. The frequency $v_{12b}$ of the wavelength-converted light 14 is $2v_{10}-v_8$ ($=v_{10}+v_{10}-v_8$).

(2-2) Operation of Temperature Control Unit

The temperature control unit 6 controls the temperature (hereinafter referred to as a first temperature) of the nonlinear optical medium 4 based on an intensity of third light 12c included in the second light 12b.

The temperature control unit 6 preferably controls the temperature (first temperature) of the nonlinear optical medium 4 to cause the intensity of the third light 12c to be increased.

In the first embodiment, unless otherwise specified, the temperature control unit 6 controls the temperature of the nonlinear optical medium 4 to cause the intensity of the third light 12c to be increased.

The third light 12c is, for example, the wavelength-converted light 14. In the first embodiment, the third light 12c is the wavelength-converted light 14 unless otherwise specified.

Since the third light 12c is a part (or all) of the second light 12b and both are generated by the nonlinear optical medium 4, the intensity of the third light 12c is proportional to an intensity of the second light 12b. Thus, the temperature control unit 6 resultantly controls the temperature of the nonlinear optical medium 4 on the basis of the intensity of the light (which is the second light 12b) generated by the nonlinear optical medium 4. Thus, the temperature control unit 6 preferably controls the temperature (first temperature) of the nonlinear optical medium 4 to cause the intensity of the second light 12b to be increased.

(2-3) Output of Wavelength-Converted Light

The wavelength conversion device 2 outputs the wavelength-converted light 14 that is light included in the second light 12b and is generated from the signal light 8 and the excitation light 10.

(3) Suppression of Fluctuation of Wavelength Conversion Efficiency

Figure 4:
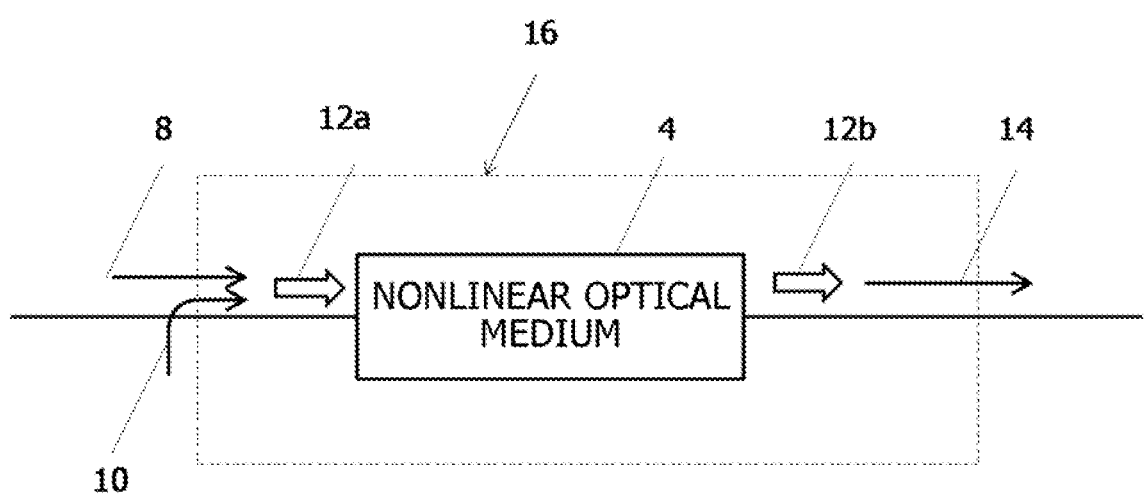
FIG. 4 is a functional block diagram illustrating an example of a wavelength conversion device 16 not including a temperature control unit.

FIG. 4 is a functional block diagram illustrating an example of a wavelength conversion device 16 not including the temperature control unit 6.

The nonlinear optical medium 4 of the wavelength conversion device 16 of FIG. 4 is the same medium as the nonlinear optical medium 4 of the wavelength conversion device 2 of FIG. 2. The nonlinear optical medium 4 is, for example, a single-mode optical fiber in which a zero dispersion wavelength at room temperature (for example, 27° C.; hereinafter, the same applies) substantially matches the wavelength of the excitation light 10. When the zero dispersion wavelength of the nonlinear optical medium 4 matches the wavelength of the excitation light 10, a phase matching condition for the degenerate four-wave mixing is satisfied, and a wavelength conversion efficiency increases. The wavelength conversion efficiency is a ratio ($=I_{14}/I_8$) between an intensity $I_8$ of the signal light 8 and an intensity $I_{14}$ of the wavelength-converted light 14. Here, the "wavelength-converted light" is new light generated from the signal light by a nonlinear optical medium and having a wavelength different from that of the signal light.

Thus, it is preferable that the zero dispersion wavelength of the nonlinear optical medium 4 at room temperature substantially matches the wavelength of the excitation light 10. An absolute value of a difference between the zero dispersion wavelength of the nonlinear optical medium 4 at room temperature and the wavelength of the excitation light 10 is, for example, preferably less than or equal to 1 nm, more preferably less than or equal to 0.5 nm, and most preferably less than or equal to 0.2 nm. The same applies to the wavelength conversion device 2 of the first embodiment illustrated in FIG. 2.

Figure 5:
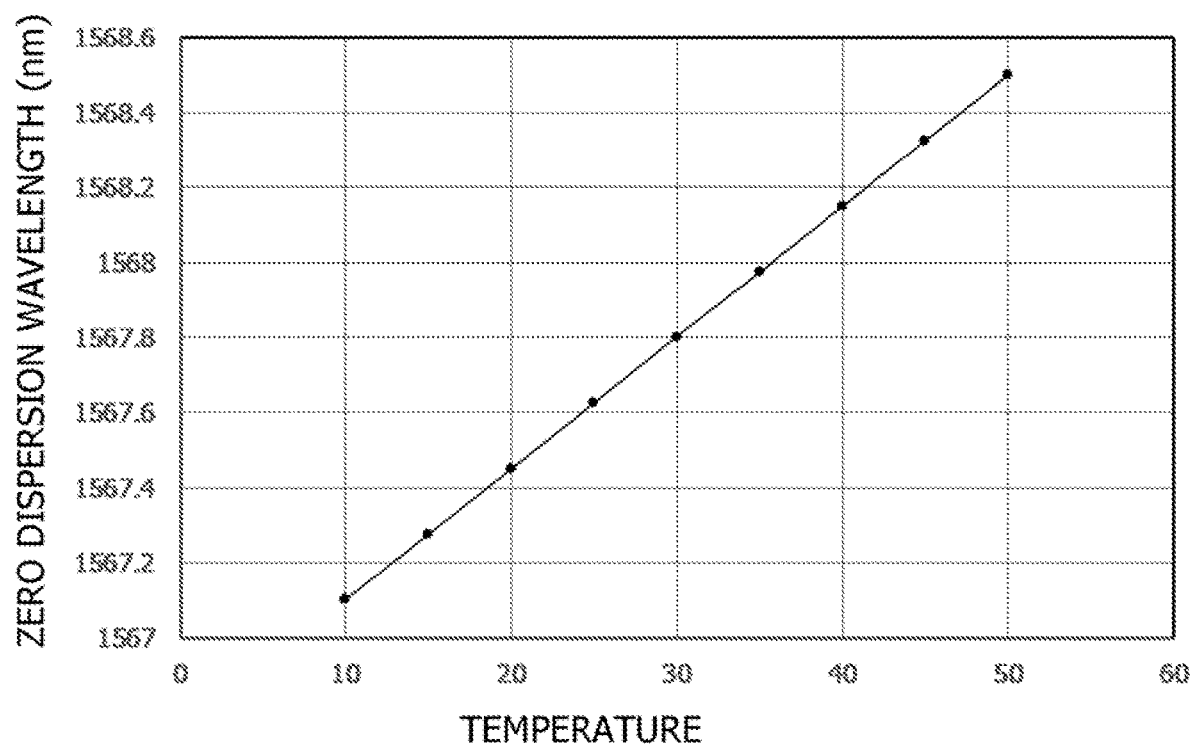
FIG. 5 is a diagram illustrating an example of a relationship between a temperature and a zero dispersion wavelength of a single-mode optical fiber.

FIG. 5 is a diagram illustrating an example of a relationship between a temperature and a zero dispersion wavelength of a single-mode optical fiber, in which chromatic dispersion characteristics is designed to a given zero dispersion wavelength. The vertical axis is the zero dispersion wavelength of the single-mode optical fiber. The horizontal axis is the temperature of the single-mode optical fiber.

Now, a case is considered where the nonlinear optical medium 4 is a single-mode optical fiber, and moreover, the zero dispersion wavelength of the nonlinear optical medium 4 at room temperature substantially matches a wavelength $\lambda_{10}$ of the excitation light 10. As illustrated in FIG. 5, as the temperature of the single-mode optical fiber changes, so does the zero dispersion wavelength. Thus, when an environmental temperature of the single-mode optical fiber (which is the nonlinear optical medium 4) changes from room temperature to another temperature, the wavelength $\lambda_{10}$ of the excitation light 10 deviates from the zero dispersion wavelength. As a result, a phase relationship between lights (for example, signal light and excitation light) propagating in the single-mode optical fiber deviates from the phase matching condition, and as a result, the wavelength conversion efficiency of the signal light decreases.

Figure 6:
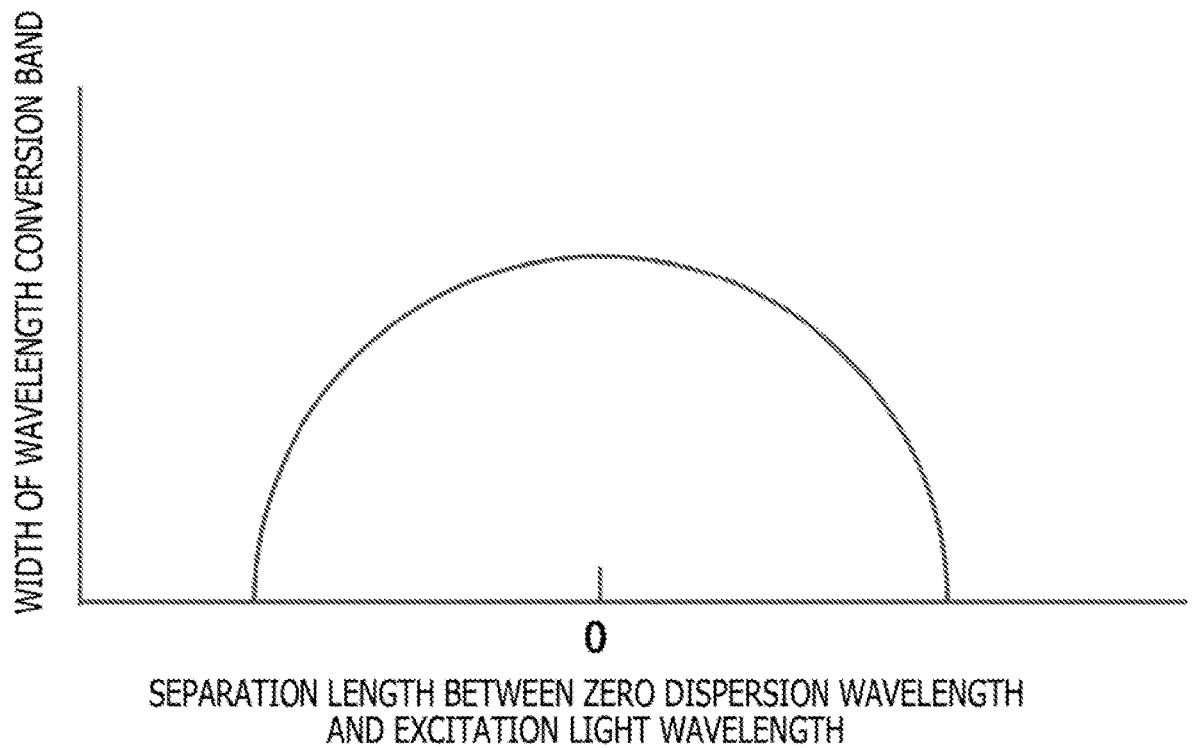
FIG. 6 is a diagram illustrating an example of a relationship of a wavelength conversion band with respect to a separation length between a zero dispersion wavelength of a nonlinear optical medium 4 and a wavelength of excitation light 10.

FIG. 6 is a diagram illustrating an example of a relationship of the wavelength conversion band with respect to the difference (hereinafter referred to as separation length) between the zero dispersion wavelength of the nonlinear optical medium 4 and the wavelength of the excitation light 10. The horizontal axis is a separation length. The vertical axis is a width of the wavelength conversion band. The scale of the vertical axis is a log scale.

As described above, when the zero dispersion wavelength of the nonlinear optical medium 4 deviates from an excitation light wavelength (which is the wavelength of the excitation light 10), the wavelength conversion efficiency of the signal light decreases. The wavelength conversion efficiency also decreases when the wavelength of the signal light deviates from the excitation light wavelength, and influence (which is a decrease in the wavelength conversion efficiency) of the deviation between the excitation light wavelength and the zero dispersion wavelength of the nonlinear optical medium increases as a deviation increases between the wavelength of the signal light and the excitation light wavelength. Thus, as illustrated in FIG. 6, as the deviation (which is an absolute value of the separation length) between the excitation light wavelength and the zero dispersion wavelength of the nonlinear optical medium 4 increases, the wavelength conversion band reduces.

The reduction of the wavelength conversion band is small while the absolute value of the separation length is small. However, as the absolute value of the separation length increases, the wavelength conversion band reduces at an accelerating rate.

Since the wavelength conversion device 16 (see FIG. 4) not including the temperature control unit 6 is not able to suppress a change in the temperature of the nonlinear optical medium 4 due to the change in the environmental temperature, the wavelength conversion device 16 is not able to suppress the reduction of the wavelength conversion band due to the change in the environmental temperature. Even if the wavelength dispersion slope or the like is limited (see BACKGROUND), the suppression of the reduction of the wavelength conversion band is limited.

On the other hand, in the wavelength conversion device 2 of the first embodiment (see FIG. 2), the temperature control unit 6 controls the temperature of the nonlinear optical medium 4 to cause the intensity of the third light 12c (which is the wavelength-converted light 14) to be increased. Thus, even if the environmental temperature of the wavelength conversion device 2 changes, the wavelength conversion efficiency of the nonlinear optical medium 4 is maintained near the maximum value (which is the maximum value of the wavelength conversion efficiency).

The maintenance of the wavelength conversion efficiency is achieved by keeping the temperature of the nonlinear optical medium 4 substantially constant by the temperature control of the temperature control unit 6. Since the temperature of the nonlinear optical medium 4 is kept substantially constant, the zero dispersion wavelength of the nonlinear optical medium 4 is maintained near an excitation light wavelength $\lambda p$, and the decrease is suppressed in the wavelength conversion efficiency due to the change in the environmental temperature.

—Suppression of Decrease in Wavelength Conversion Efficiency by Temperature Measurement—

It is also conceivable to measure the environmental temperature of the wavelength conversion device 2 (for example, a temperature in a room where the wavelength conversion device 2 is arranged) and control the temperature of the nonlinear optical medium 4 on the basis of a result of this measurement. However, since the thermal resistance of the nonlinear optical medium such as an optical fiber is high, the temperature of the nonlinear optical medium 4 tends to deviate from the environmental temperature. Thus, even if the temperature of the nonlinear optical medium 4 is controlled based on the measurement result of the environmental temperature, the suppression of the decrease in the wavelength conversion efficiency of the nonlinear optical medium 4 is limited and not sufficient.

Even if the temperature of the nonlinear optical medium 4 is controlled on the basis of the temperature measured by mounting a temperature sensor such as a thermistor or thermocouple on the nonlinear optical medium 4, the high thermal resistance of the nonlinear optical medium hinders accurate temperature measurement. Thus, even if the temperature of the nonlinear optical medium 4 is controlled based on the temperature measured by the temperature sensor, the suppression of the decrease in the wavelength conversion efficiency due to the change in the environmental temperature is limited and is not sufficient.

The temperature that can be measured by the temperature sensor is a temperature of the surface of the nonlinear optical medium 4, not a temperature of the central portion of the nonlinear optical medium 4 through which the signal light 8 propagates. Thus, even if the temperature of the nonlinear optical medium 4 measured by the temperature sensor is controlled, the suppression of the decrease in the wavelength conversion efficiency due to the change in the environmental temperature is limited and is not sufficient. The same applies to a case where the temperature of the nonlinear optical medium 4 is measured by radiated infrared rays.

It is also conceivable to house the nonlinear optical medium 4 in a thermostatic chamber to keep the temperature of the nonlinear optical medium 4 constant. However, if the nonlinear optical medium 4 is housed in a thermostatic chamber, the size of the wavelength conversion device increases.

(4) Wavelength Conversion Method

Figure 7:
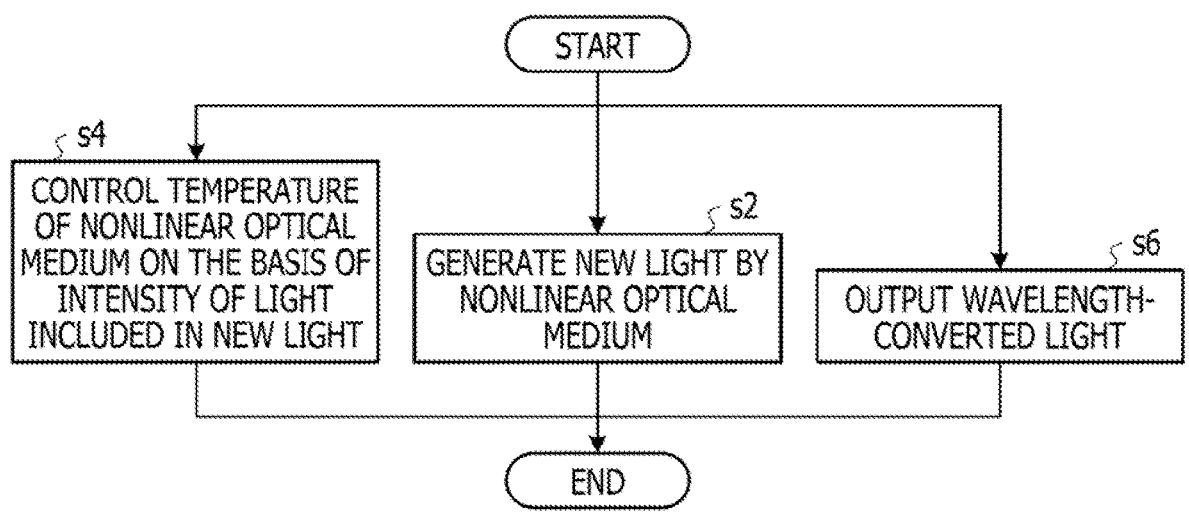
FIG. 7 is a diagram explaining an example of a procedure of a wavelength conversion method executed in the wavelength conversion device 2 of FIG. 1.

FIG. 7 is a diagram explaining an example of a procedure of a wavelength conversion method executed in the wavelength conversion device 2 of FIG. 2. The wavelength conversion method illustrated in FIG. 7 may be executed by a device other than the device illustrated in FIG. 1.

—Step s2—

A step is executed of inputting, to the nonlinear optical medium 4, the first light 12a including the signal light 8 and the excitation light 10 having a wavelength different from that of the signal light 8 and having a stronger electric field strength than that of the signal light 8, and generating new light (which is the second light 12b) having a wavelength different from that of the signal light 8 and the excitation light 10.

—Step s4—

Moreover, while step s2 is executed, a step is executed of controlling the temperature (which is the first temperature) of the nonlinear optical medium 4 on the basis of the intensity of the third light (for example, the wavelength-converted light 14) included in the second light 12b.

As described above, the intensity of the second light 12b and the intensity of the third light 12c are proportional to each other. Thus, while step s2 is executed, the temperature (hereinafter referred to as the first temperature) of the nonlinear optical medium 4 is controlled on the basis of the intensity of the light (which is the second light 12b) generated by the nonlinear optical medium 4.

—Step s6—

While step s2 and step s4 are executed, the wavelength-converted light 14 is output that is the light included in the second light 12b and generated from the signal light 8 and the excitation light 10.

In step 94 of controlling the temperature of the nonlinear optical medium 4, for example, the temperature of the nonlinear optical medium 4 (which is the first temperature) is controlled to cause the intensity of the third light 12c to be increased. In step s4, the temperature of the nonlinear optical medium 4 may be controlled to cause the temperature (which is the first temperature) of the nonlinear optical medium 4 to be close to a target value (which is a target value of the first temperature) on the basis of the intensity of the third light 12c (see, for example, a fourth modification).

Steps s4 to s6 are started at the same time as the start of step s2 or after the start of step s2, and are continued while step s2 is executed.

(5) Modifications (5-1) First Modification

Figure 8:
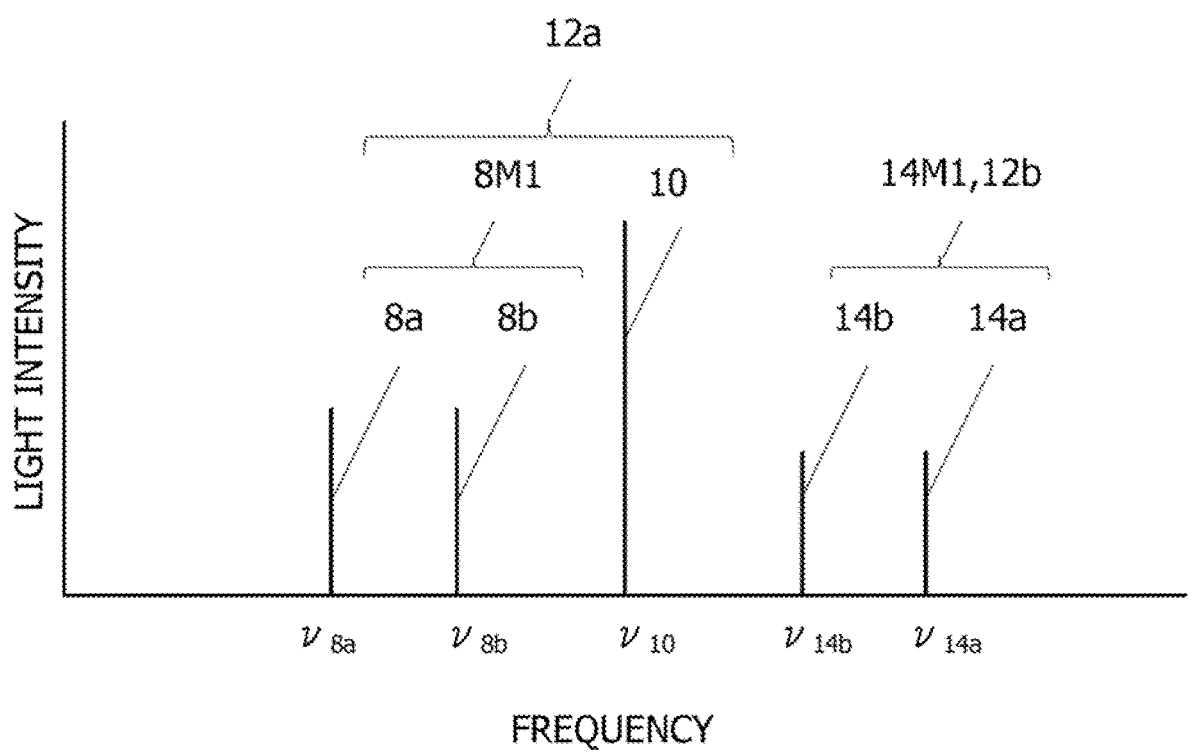
FIG. 8 is a diagram explaining a first modification of the first embodiment.

FIG. 8 is a diagram explaining a first modification of the first embodiment. FIG. 8 illustrates spectra of the signal light and the like of the first modification. The horizontal axis is a frequency of light. The vertical axis is an intensity of the light (which is optical power).

As illustrated in FIG. 8, signal light 8M1 of the first modification is light including first signal light 8a, and second signal light 8b having a frequency different from that of the first signal light 8a. The frequency of the first signal light 8a is $v_{8a}$. The frequency of the second signal light 8b is $v_{8b}$.

In other words, the signal light 8M1 of the first modification includes the first signal light 8a, and the second signal light 8b having a wavelength different from that of the first signal light 8a. In other words, the signal light 8M1 of the first modification is a collection of a plurality of lights having different wavelengths. The first light 12a of the first modification includes the signal light 8M1 and the excitation light 10.

The nonlinear optical medium 4 of the first modification generates first wavelength-converted light 14a from the first signal light 8a and the excitation light 10. The nonlinear optical medium 4 further generates second wavelength-converted light 14b from the second signal light 8b and the excitation light 10. The frequency of the first wavelength-converted light 14a is $v_{14a}$. The frequency of the second wavelength-converted light 14b is $v_{14b}$ different from $v_{14a}$.

In other words, wavelength-converted light 14M1 (second light 12b) of the first modification is light including the first wavelength-converted light 14a generated from the first signal light 8a and the excitation light 10, and the second wavelength-converted light 14b generated from the second signal light 8b and the excitation light 10. The second light 12b of the first modification is the wavelength-converted light 14M1.

Since the temperature control unit 6 of the first modification controls the temperature of the nonlinear optical medium 4 to cause the intensity of the wavelength-converted light 14M1 to be increased, it is possible to suppress the fluctuation of the wavelength conversion efficiency due to the change in the environmental temperature (see "(3) Suppression of fluctuation of wavelength conversion efficiency"). The third light 12c of the first modification is the wavelength-converted light 14M1.

Thus, according to the first modification, it is possible to suppress the fluctuation of the wavelength conversion efficiency due to the change in the environmental temperature while generating a plurality of the wavelength-converted lights from a plurality of the signal lights having different wavelengths.

(5-2) Second Modification

A second modification is similar to the first modification. Thus, the description of portions common to the first modification will be omitted.

The temperature control unit 6 of the second modification controls the temperature of the nonlinear optical medium 4 to cause an intensity to be increased of light (the first wavelength-converted light 14a in the example illustrated in FIG. 8) having a farthest frequency from the frequency of the excitation light 10 out of the first wavelength-converted light 14a (see FIG. 8) and the second wavelength-converted light 14b. In other words, the temperature control unit 6 of the second modification controls the temperature of the nonlinear optical medium 4 based on the intensity of the light (the first wavelength-converted light 14a in the example illustrated in FIG. 8) having the farthest wavelength from the wavelength of the excitation light 10 out of the first wavelength-converted light 14a (see FIG. 8) and the second wavelength-converted light 14b.

As the frequency of the signal light deviates from the frequency of the excitation light 10, the wavelength conversion efficiency of the signal light is strongly affected by the temperature of the nonlinear optical medium 4. Thus, out of the first wavelength-converted light 14a and the second wavelength-converted light 14b, the intensity of the light (the first wavelength-converted light 14a in the example illustrated in FIG. 8) having the farthest wavelength from the wavelength of the excitation light 10 is most affected by the temperature of the nonlinear optical medium 4.

Thus, the temperature control unit 6 of the second modification controls the temperature of the nonlinear optical medium 4 to cause the intensity of the light to be increased that is most affected by the temperature of the nonlinear optical medium 4 out of the first wavelength-converted light 14a and the second wavelength-converted light 14b. For this reason, according to the second modification, it is possible to effectively suppress the fluctuation of the wavelength conversion efficiency due to the change in the environmental temperature.

(5-3) Third Modification

Figure 9:
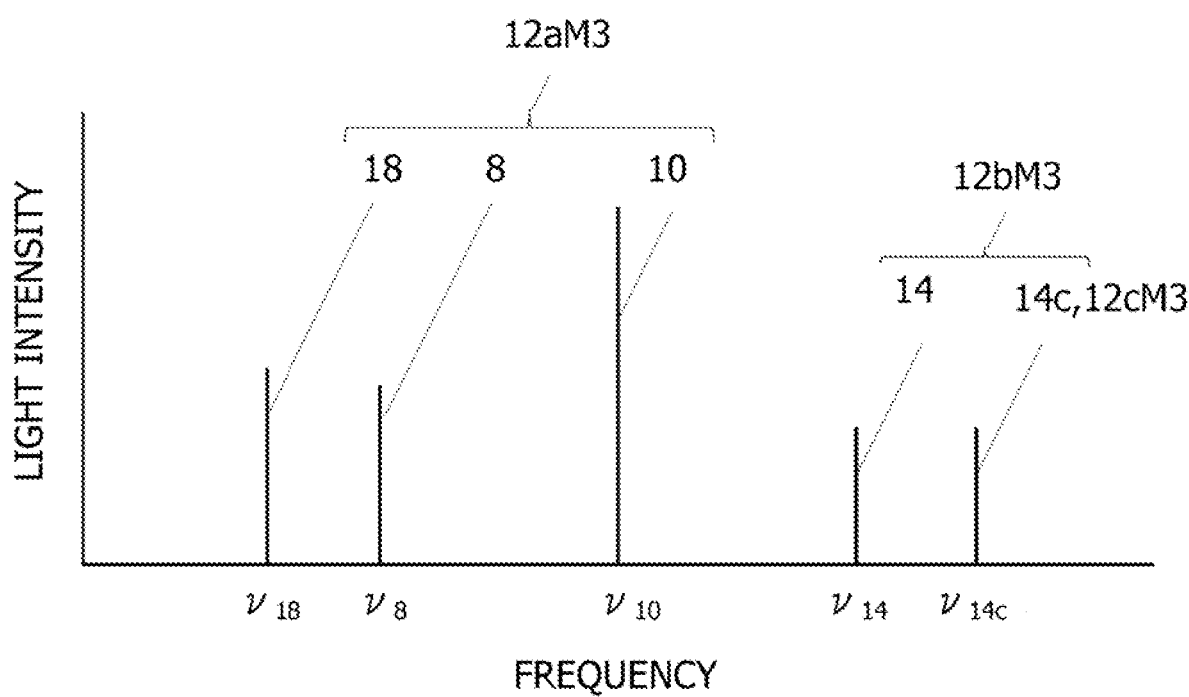
FIG. 9 is a diagram explaining a third modification of the first embodiment.

FIG. 9 is a diagram explaining a third modification of the first embodiment. FIG. 9 illustrates spectra of the signal light and the like of the third modification. The horizontal axis is a frequency of light. The vertical axis is an intensity of the light (which is optical power).

As illustrated in FIG. 9, the nonlinear optical medium 4 of the third modification generates new light (which is second light 12bM3) from input light (which is first light 12aM3) including the signal light 8, the excitation light 10, and additional light 18. A frequency via (or wavelength) of the additional light 18 is a frequency (or wavelength) different from the frequency vs (or wavelength) of the signal light 8 and the frequency $v_{10}$ (or wavelength) of the excitation light 10. The intensity of the excitation light 10 and an intensity of the additional light 18 are preferably kept constant over time.

In the third modification, the nonlinear optical medium 4 generates the wavelength-converted light 14 from the signal light 8 and the excitation light 10. The nonlinear optical medium 4 further generates third wavelength-converted light 14c from the additional light 18 and the excitation light 10. In other words, the second light 12bM3 of the third modification is light including the wavelength-converted light 14 and the third wavelength-converted light 14c. The wavelength-converted light 14 and the third wavelength-converted light 14c are generated by the same nonlinear optical effect (degenerate four-wave mixing in the example illustrated in FIG. 9).

The temperature control unit 6 controls the temperature of the nonlinear optical medium 4 on the basis of an intensity of the third wavelength-converted light 14c. Specifically, the temperature control unit 6 controls the temperature of the nonlinear optical medium 4 to cause the intensity of the third wavelength-converted light 14c to be Increased. In other words, third light 12cM3 of the third modification is the third wavelength-converted light 14c. The wavelength conversion device 2 of the third modification outputs at least the wavelength-converted light 14 of the light (which is the second signal light 12bM3) generated by the nonlinear optical medium 4.

When the intensity of the signal light 8 changes, the intensity of the wavelength-converted light 14 also changes. Thus, if the temperature of the nonlinear optical medium 4 is controlled on the basis of the intensity of the wavelength-converted light 14, the temperature of the nonlinear optical medium 4 is changed due to a change in the intensity of the signal light 8 even if the environmental temperature does not change.

In the third modification, since the temperature of the nonlinear optical medium 4 is controlled on the basis of the intensity of the additional light 18 (see FIG. 9), the temperature of the nonlinear optical medium 4 is not changed even if the intensity of the signal light 8 changes. Thus, according to the third modification, the fluctuation is suppressed of the wavelength conversion efficiency due to the change in the intensity of the signal light 8.

Note that, the "intensity of the signal light 8" is not an instantaneous intensity of the signal light 8 but a time average of the intensity of the signal light 8 (hereinafter, the same applies). Similarly, the "intensity of the wavelength-converted light 14" is not an instantaneous intensity of the wavelength-converted light 14 but a time average of the intensity of the wavelength-converted light 14 (hereinafter, the same applies).

(5-4) Fourth Modification

Figure 10:
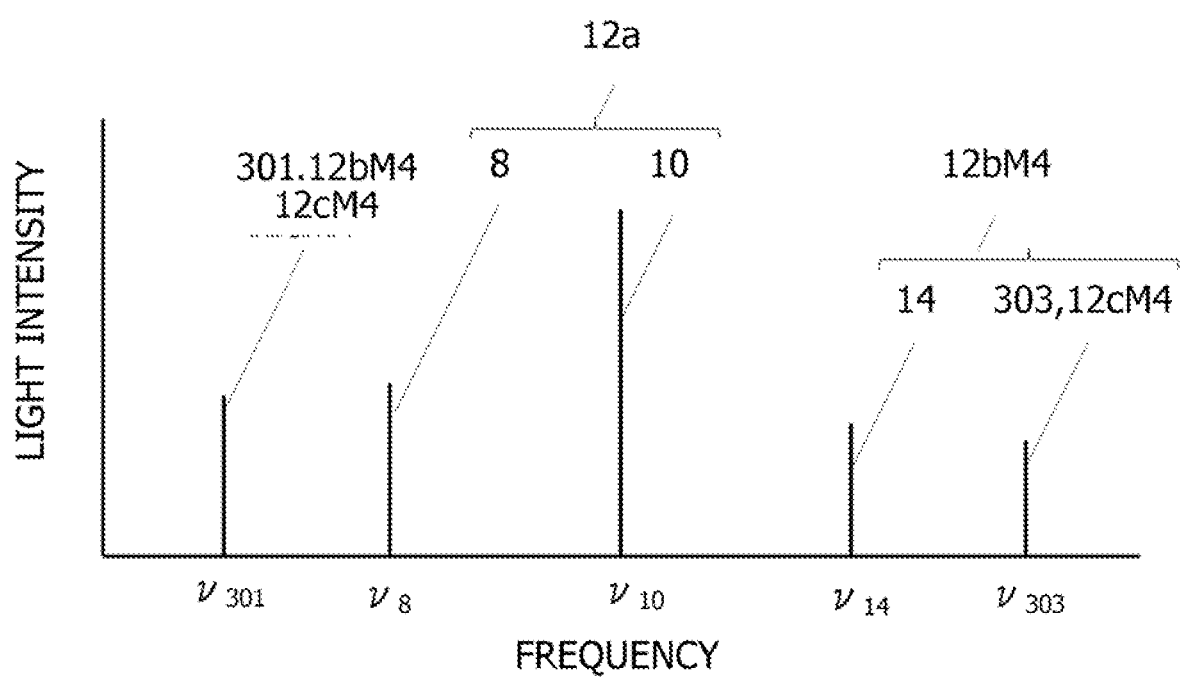
FIG. 10 is a diagram explaining a fourth modification of the first embodiment.

FIG. 10 is a diagram explaining a fourth modification of the first embodiment. FIG. 10 illustrates spectra of the signal light and the like of the fourth modification. The horizontal axis is a frequency of light. The vertical axis is an intensity of the light (which is optical power).

The nonlinear optical medium 4 of the fourth modification generates new light (which is second signal light 12bM4) including light generated from the excitation light 10 by Raman scattering and the wavelength-converted light 14, from the input light (which is the first light 12a) including the signal light 8 and the excitation light 10. The light generated by Raman scattering is hereinafter referred to as Raman scattered light. The intensity of the excitation light 10 is preferably kept constant over time. The wavelength conversion device 2 of the fourth modification outputs at least the wavelength-converted light 14 of the light (which is the second signal light 12bM4) generated by the nonlinear optical medium 4.

The excitation light 10 incident on the nonlinear optical medium 4 is scattered by inelastic scattering (which is Raman scattering) accompanied by emission or absorption of optical phonons. As a result, Stokes light 301 and anti-Stokes light 303 are generated. As illustrated in FIG. 10, a frequency $v_{301}$ of the Stokes light 301 is a frequency different from the frequency $v_8$ of the signal light 8 and the frequency $v_{10}$ of the excitation light 10. A frequency $v_{303}$ of the anti-Stokes light 303 is a frequency different from the frequency vs of the signal light 8, the frequency $v_{10}$ of the excitation light 10, and the frequency $v_{301}$ of the Stokes light 301. The light (second light 12bM4) generated by the nonlinear optical medium 4 includes the wavelength-converted light 14 generated from the signal light 8 and the excitation light 10, and the Stokes light 301 and anti-Stokes light 303 generated by Raman scattering from the excitation light 10.

The temperature control unit 6 controls the temperature of the nonlinear optical medium 4 to cause the temperature (which is the first temperature) of the nonlinear optical medium 4 to be close to the target value (which is the target value of the first temperature) on the basis of an intensity of each of the anti-Stokes light 303 and the Stokes light 301. In other words, third light 12cM4 of the fourth modification is the Stokes light 301 and anti-Stokes light 303 generated by the Raman scattered light of the excitation light 10.

For example, the temperature control unit 6 (see FIG. 2) derives the temperature of the nonlinear optical medium 4 or an amount (hereinafter referred to as a temperature equivalent) corresponding to the temperature of the nonlinear optical medium 4 on the basis of an intensity of the third light 12cM4, and controls the temperature of the nonlinear optical medium 4 on the basis of the derived temperature or the temperature equivalent. Specific examples of the "temperature equivalent" will be described in a fourth embodiment.

The target value of the temperature (which is the target value of the temperature of the nonlinear optical medium 4) is, for example, a temperature (hereinafter referred to as a second temperature) at which the absolute value of the difference between the wavelength of the excitation light 10 and the zero dispersion wavelength of the nonlinear optical medium 4 is less than or equal to a certain value (hereinafter referred to as a tolerance). The tolerance is preferably 1 nm, more preferably 0.5 nm, and most preferably 0.2 nm.

The temperature control based on the intensity of the Raman scattered light (which is the Stokes light 301 and the anti-Stokes light 303) is not affected by the change in the intensity of the signal light 8. Thus, according to the fourth modification, it is possible to suppress the fluctuation of the wavelength conversion efficiency due to the change in the intensity of the signal light 8 (see the third modification).

In the fourth modification, the additional light 18 (see FIG. 9) is not used. Thus, according to the fourth modification, the fluctuation of the wavelength conversion efficiency due to the change in the intensity of the signal light 8 is suppressed without providing a light source of the additional light 18.

In the above example, the temperature control unit 6 controls the temperature of the nonlinear optical medium 4 based on the intensity of the Raman scattered light in the nonlinear optical medium 4. However, the temperature control unit 6 may control the temperature of the nonlinear optical medium 4 on the basis of an intensity of light generated by scattering other than Raman scattering. For example, the temperature control unit 6 may control the temperature of the nonlinear optical medium 4 based on an intensity of light generated by Brillouin scattering in the nonlinear optical medium 4.

(5-5) Fifth Modification

Figure 11:
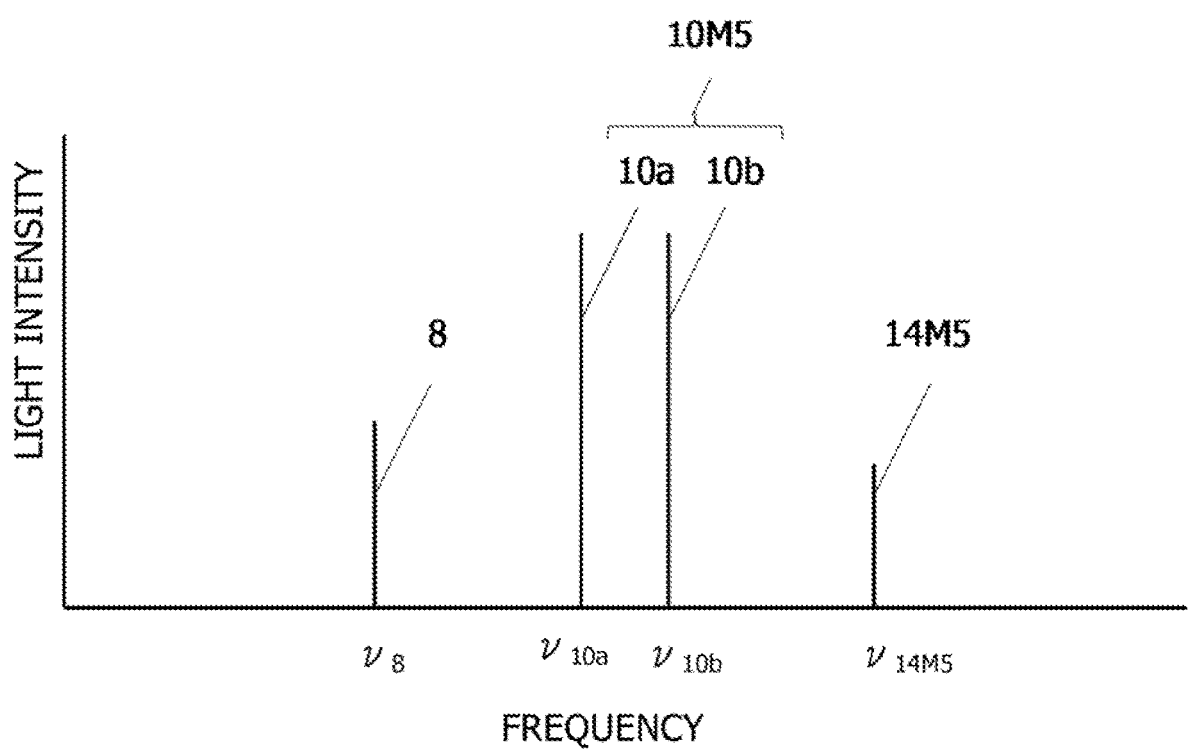
FIG. 11 is a diagram explaining a fifth modification of the first embodiment.

FIG. 11 is a diagram explaining a fifth modification of the first embodiment. FIG. 11 illustrates spectra of the signal light and the like of the fifth modification. The horizontal axis is a frequency of light. The vertical axis is an intensity of the light (which is optical power).

Up to this point, the first to third wavelength-converted lights 14a to 14c are generated by degenerate four-wave mixing. However, the first to third wavelength-converted lights 14a to 14c may be generated by nondegenerate four-wave mixing.

In this case, excitation light 10M5 includes first excitation light 10a and second excitation light 10b having a wavelength different from that of the first excitation light 10a. When the frequency of the first excitation light 10a is $v_{10a}$ and the frequency of the second excitation light 10b is $v_{10b}$, a frequency $v_{14M5}$ of wavelength-converted light 14M5 is $v_{10a}+v_{10b}-v_8$. The frequency of the signal light 8 is $v_8$.

The wavelength conversion device 2 (see FIG. 1) of the fifth modification controls the temperature of the nonlinear optical medium 4 to cause an intensity of the wavelength-converted light 14M5 to be increased. In this control, a frequency corresponding to the zero dispersion wavelength of the nonlinear optical medium 4 is controlled to be dose to an average value Av1 of the frequency $v_{10a}$ of the first excitation light 10a and the frequency $v_{10b}$ of the second excitation light 10b. The average value Av1 is $(v_{10a}+v_{10b})/2$.

The wavelength conversion device 2 of the fifth modification may control the temperature of the nonlinear optical medium 4 to cause the temperature of the nonlinear optical medium 4 to be dose to the target value on the basis of the intensity of the Raman scattered light of at least one of the first excitation light 10a or the second excitation light 10b. The target value of the temperature is a temperature (third temperature) at which a difference between a wavelength corresponding to an average value Av2 of the frequencies $v_{10a}$ and $v_{10b}$ of the first and second excitation lights 10a and 10b, and the zero dispersion wavelength of the nonlinear optical medium 4 is less than or equal to a certain value (which is the tolerance described above). The wavelength corresponding to the average value Av2 is a wavelength ($=3 \times 10^8/Av2$) obtained by dividing $3 \times 10^8$ by the average value Av2. The unit is meters.

The first excitation light 10a and the second excitation light 10b are generated, for example, by different excitation light sources. Thus, it is easy to increase an intensity (which is a total of intensities of the excitation lights 10a and 10b) of the excitation light 10M5 as compared with the case of single excitation light. Thus, according to the fifth modification, the wavelength conversion efficiency can be increased by increasing the intensity of the excitation light 10M5 as compared with the case of single excitation light.

(5-6) Sixth Modification

The wavelength-converted light 14 described with reference to FIG. 3 is generated by the third-order nonlinear polarization of the nonlinear optical medium 4. However, the wavelength-converted light 14 may be generated by the second-order nonlinear polarization of the nonlinear optical medium 4. The same applies to the wavelength-converted light, the third wavelength-converted light 14c, and the like of the first to fifth modifications.

For example, the wavelength-converted light 14 may be generated as a difference frequency. Alternatively, the wavelength-converted light 14 may be generated as a sum frequency. The second-order nonlinear polarization is a phenomenon that occurs in substances that do not have central symmetry, such as compound semiconductors. Thus, the nonlinear optical medium 4 of the sixth modification is an optical waveguide of GaAs, an optical waveguide of lithium niobate, or the like.

The wavelength conversion device of the first embodiment controls the temperature of the nonlinear optical medium on the basis of the intensity of the new light (for example, the wavelength-converted light) generated by the nonlinear optical medium from the input light (for example, the signal light and the excitation light). Since the generation of the new light is strongly affected by the temperature of the nonlinear optical medium, according to the wavelength conversion device of the first embodiment that controls the temperature of the nonlinear optical medium on the basis of the intensity of the new light, the temperature of the nonlinear optical medium can be controlled accurately. The same applies to the wavelength conversion method of the first embodiment.

Thus, according to the first embodiment, it is possible to provide a wavelength conversion device and a wavelength conversion method in which the wavelength conversion efficiency is not easily affected by the change in the environmental temperature.

Second Embodiment

Figure 12:
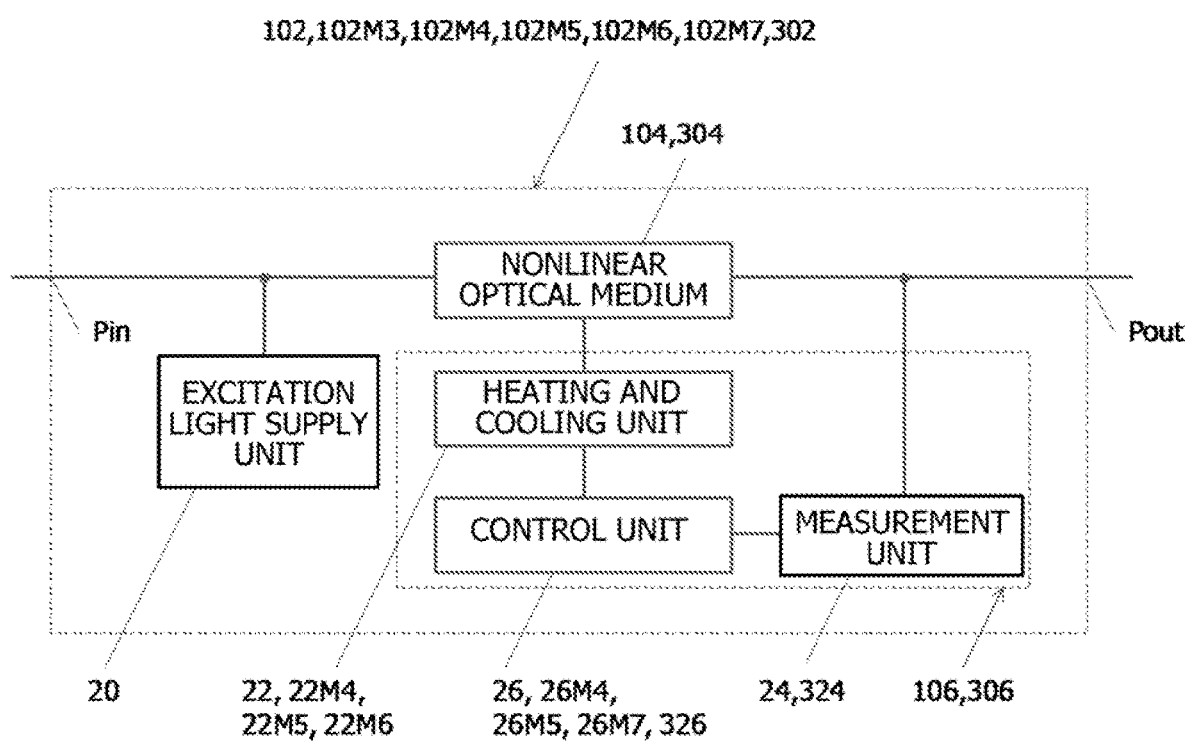
FIG. 12 is a functional block diagram illustrating an example of a wavelength conversion device 102 of a second embodiment.

FIG. 12 is a functional block diagram illustrating an example of a wavelength conversion device 102 of a second embodiment. The wavelength conversion device 102 of the second embodiment includes an excitation light supply unit 20 that supplies excitation light, and a temperature control unit 106 including a plurality of functional blocks. Other configurations and steps (hereinafter referred to as configurations and the like) are similar to those of the first embodiment (for example, the first modification). Thus, the description of the same configurations and the like as those in the first embodiment will be omitted or simplified. The second embodiment is an example of the first modification of the first embodiment (1) Structure As illustrated in FIG. 12, the wavelength conversion device 102 of the second embodiment includes a nonlinear optical medium 104, the temperature control unit 106, and the excitation light supply unit 20 that supplies the excitation light 10 (see FIG. 2).

The excitation light supply unit 20 may be omitted (the same applies to third to fourth embodiments described later). In that case, the excitation light 10 is supplied from the outside of the wavelength conversion device 102. The nonlinear optical medium 104 is the nonlinear optical medium 4 (for example, a single-mode optical fiber)

described in the first embodiment. The temperature control unit 106 is an example of the temperature control unit 6 described in the first embodiment.

The temperature control unit 106 includes a heating and cooling unit 22, a measurement unit 24, and a control unit 26. Details of the heating and cooling unit 22, the measurement unit 24, and the control unit 26 will be described later.

(2) Operation

Operation and the like of each functional block illustrated in FIG. 12 will be described.

(2-1) Operation of Excitation Light Supply Unit

Figure 13:
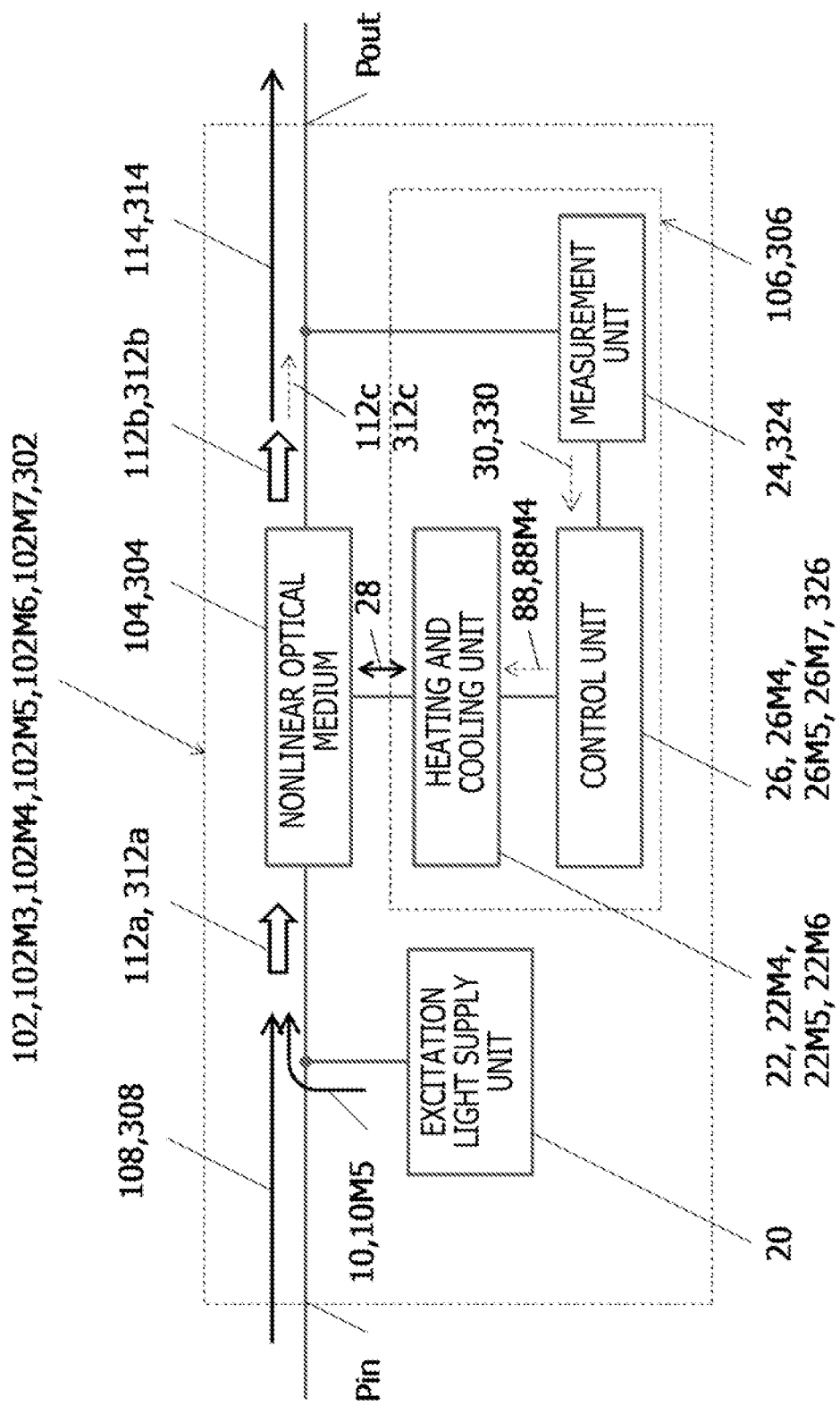
FIG. 13 is a diagram illustrating an example of a flow of signal light 108 and the like in the wavelength conversion device 102.

FIG. 13 is a diagram illustrating an example of a flow of signal light 108 and the like in the wavelength conversion device 102. The excitation light supply unit 20 generates the excitation light 10, and multiplexes the generated excitation light 10 with the signal light 108. Input light (which is first light 112a) of the nonlinear optical medium 104 is light including the excitation light 10 and the signal light 108.

(2-2) Operation of Nonlinear Optical Medium

Figure 14:
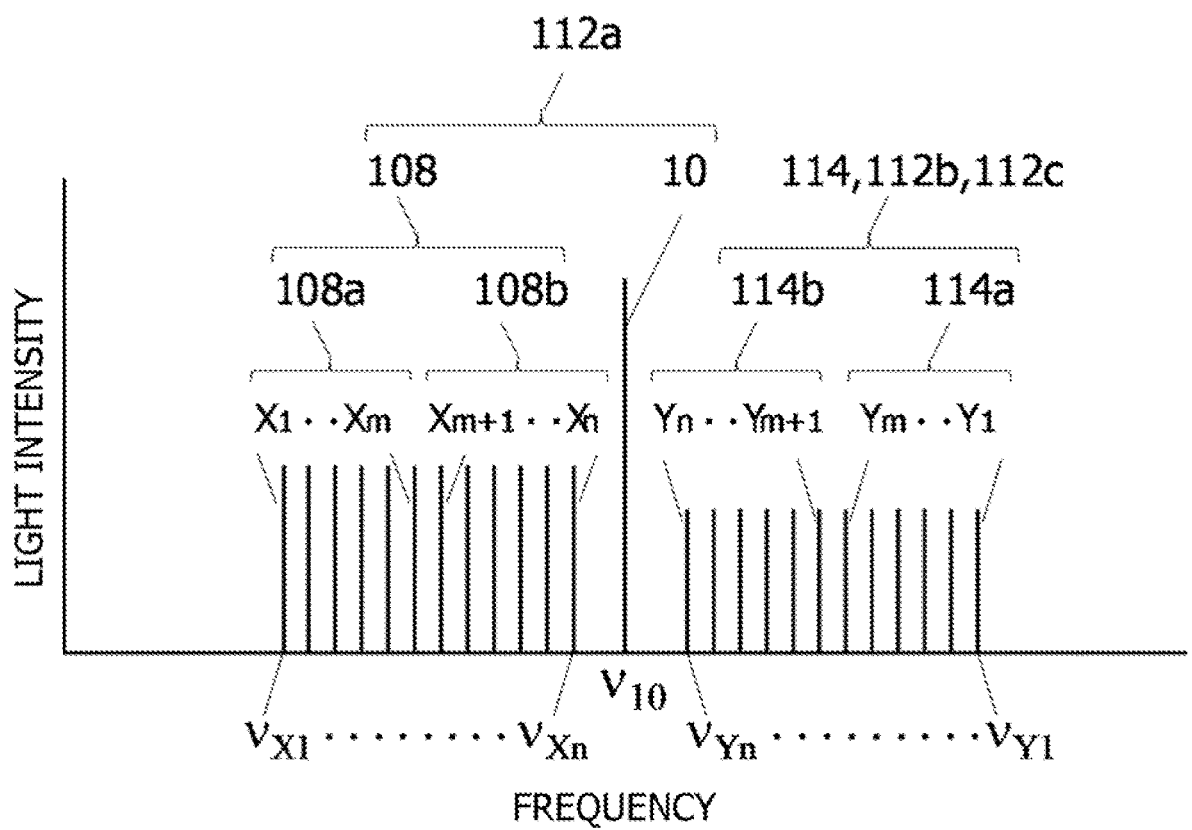

FIG. 14 is a diagram illustrating an example of spectra of the signal light 108 and the like. The horizontal axis is a frequency of light. The vertical axis is an intensity of the light (which is optical power).

The signal light 108 (see FIG. 14) of the second embodiment is light including first signal light 108a, and second signal light 108b having a wavelength (in other words, frequency) different from that of the first signal light 108a, similarly to the first modification (see FIG. 8) of the first embodiment. However, the first signal light 108a of the second embodiment includes a plurality of signal lights X1 to Xm (m is an integer greater than 1) having different wavelengths. Similarly, the second signal light 108b includes a plurality of signal lights Xm+1 to Xn (n is an integer greater than m+1) having different wavelengths. In other words, the signal light 108 of the second embodiment is highly wavelength-multiplexed light. The first light 112a (which is the input light of the nonlinear optical medium 104) of the second embodiment includes the signal light 108 and the excitation light 10.

The nonlinear optical medium 104 of the second embodiment generates first wavelength-converted light 114a from the first signal light 108a and the excitation light 10. The nonlinear optical medium 104 further generates second wavelength-converted light 114b from the second signal light 108b and the excitation light 10. Wavelength-converted light 114 of the second embodiment includes the first wavelength-converted light 114a and the second wavelength-converted light 114b. Second light 112b (which is new light generated by the nonlinear optical medium 104) of the second embodiment is the wavelength-converted light 114.

The frequency $v_{10}$ of the excitation light 10 is a frequency different from a frequency $v_{Xk}$ of each of signal lights Xk (k is an integer greater than or equal to 1 and less than or equal to n) included in the multiplexed signal light 108. The excitation light 10 is light having a stronger electric field strength than an electric field strength of each signal light Xk.

The first wavelength-converted light 114a of the second embodiment includes a plurality of wavelength-converted lights Y1 to Ym (m is an integer greater than 1) having different wavelengths. Similarly, the second wavelength-converted light 114b includes a plurality of wavelength-converted lights Ym+1 to Yn (n is an integer greater than m+1) having different wavelengths.

In the example illustrated in FIG. 14, both the first signal light 108a and the second signal light 108b include the plurality of signal lights. However, one of the first signal light 108a or the second signal light 108b may include the plurality of signal lights and the other may be single signal light. —explanation not depending on grouping—

In the example illustrated in FIG. 14, the signal light 108 is divided into two groups (which are the first signal light 108a and the second signal light 108b). By dividing the signal light 108 into the two groups, it becomes easy to explain a third modification described later. However, grouping does not have to be made for the signal light 108.

When the grouping is not made, the signal light 108 includes the plurality of signal lights Xk (k is an integer greater than or equal to 2 and less than or equal to n, n is an integer greater than or equal to 2), and a wavelength of each signal light Xk is different from a wavelength of another signal light Xj (is an integer other than k) included in the multiplexed signal light 108.

Similarly, the wavelength-converted light 114 includes a plurality of wavelength-converted lights Yk (k is an integer greater than or equal to 2 and less than or equal to n, n is an integer greater than or equal to 2), and a wavelength of each wavelength-converted light Yk is different from a wavelength of another wavelength-converted light Yj (j is an integer other than k) included in the wavelength-converted light 114.

The nonlinear optical medium 104 generates the wavelength-converted light Yk from the signal light Xk and the excitation light 10. When the wavelength-converted light 114 is generated by degenerate four-wave mixing, a frequency $v_{yk}$ of the kth wavelength-converted light Yk is $2v_{10}-v_{xk}$ (k is an integer less than or equal to n, and n is an integer greater than or equal to 2). The frequency of the excitation light 10 is $v_{10}$. The frequency of the kth signal light Xk is $v_{xk}$.

(2-3) Operation of Temperature Control Unit

The temperature control unit 106 (see FIG. 13) controls the temperature (which is the first temperature) of the nonlinear optical medium 104 on the basis of an intensity of the light (which is the second light 112b) generated by the nonlinear optical medium 104.

Specifically, the temperature control unit 106 controls the heating and cooling unit 22 to cause an intensity of the wavelength-converted light 114 to be increased, on the basis of a measurement result 30 of the measurement unit 24. The measurement unit 24 measures an intensity of light (which is branch light) that branches off from the light (which is the second light 112b) generated by the nonlinear optical medium 104. The second light 112b and third light 112c of the second embodiment are wavelength-converted light 114.

In the following description, a result of measurement by the measurement unit 24 or the like is referred to as a measurement result (the same applies to the third to fourth embodiments).

(2-3-1) Operation of Heating and Cooling Unit

The heating and cooling unit 22 performs at least one of heating or cooling of the nonlinear optical medium 104.

The heating and cooling unit 22 supplies heat 28 to (in other words, heats), for example, the nonlinear optical medium 104. Alternatively, the heating and cooling unit 22 absorbs the heat 28 from (in other words, cools) the nonlinear optical medium 104. The heating and cooling unit 22 may perform both heating and cooling of the nonlinear optical medium 104.

(2-3-2) Operation of Measurement Unit

The measurement unit 24 (see FIG. 13) measures the intensity of the new light (which is the second light 112b) generated by the nonlinear optical medium 104. Specifically, the measurement unit 24 (see FIG. 13) measures the intensity of the light (which is the branch light) that branches off from the second light 112b, thereby indirectly measuring the intensity of the new light (which is the second light 112b) generated by the nonlinear optical medium 104.

(2-3-3) Operation of Control Unit

The control unit 26 (see FIG. 13) controls the heating and cooling unit 22 based on the measurement result 30 of the measurement unit 24.

For example, the control unit 26 controls the heating and cooling unit 22 to cause an intensity of the third light 112c to be increased, based on the measurement result 30 of the measurement unit 24. For example, while acquiring information (which is the measurement result 30) indicating the intensity of the third light 112c, the control unit 26 controls the heating and cooling unit 22 to cause the intensity of the third light 112c to be increased on the basis of the acquired information.

(2-4) Output of Wavelength-Converted Light

The wavelength conversion device 102 (see FIG. 13) outputs the second light 112b (which is the wavelength-converted light 114).

A part of the excitation light 10 and the signal light 108 is not converted into the wavelength-converted light 114 and is output from the nonlinear optical medium 104. These lights (which are a part of the excitation light 10 and a part of the signal light 108) are removed by an optical filter described later. The same applies to the third to fourth embodiments.

(3) Suppression of Fluctuation of Wavelength Conversion Efficiency

The temperature control unit 106 of the second embodiment controls the temperature of the nonlinear optical medium 104 to cause the intensity to be increased of the wavelength-converted light 114 (which is the third light 112c) generated by the nonlinear optical medium 104. As a result, the wavelength conversion efficiency of the nonlinear optical medium 104 is maintained near the maximum value (which is the maximum value of the wavelength conversion efficiency) even if the environmental temperature changes. The maintenance of the wavelength conversion efficiency is achieved by keeping the temperature of the nonlinear optical medium 104 substantially constant by the temperature control of the temperature control unit 106. Since the temperature of the nonlinear optical medium 104 is kept substantially constant, a zero dispersion wavelength of the nonlinear optical medium 104 is maintained near the excitation light wavelength λp, and the decrease is suppressed in the wavelength conversion efficiency due to the change in the environmental temperature. (see "(3) Suppression of fluctuation of wavelength conversion efficiency" in the first embodiment).

(4) Wavelength Conversion Method

A wavelength conversion method of the second embodiment is substantially the same as the wavelength conversion method of the first embodiment described with reference to FIG. 7. However, in step s2, the highly multiplexed wavelength-converted light 114 (which is the second light 112b) is generated from the highly multiplexed signal light 108 (which is the first light 112a). Steps s4 and s6 are executed on the basis of the highly multiplexed wavelength-converted light 114 (which is the second light 112b).

(5) Hardware Configuration

Figure 15:
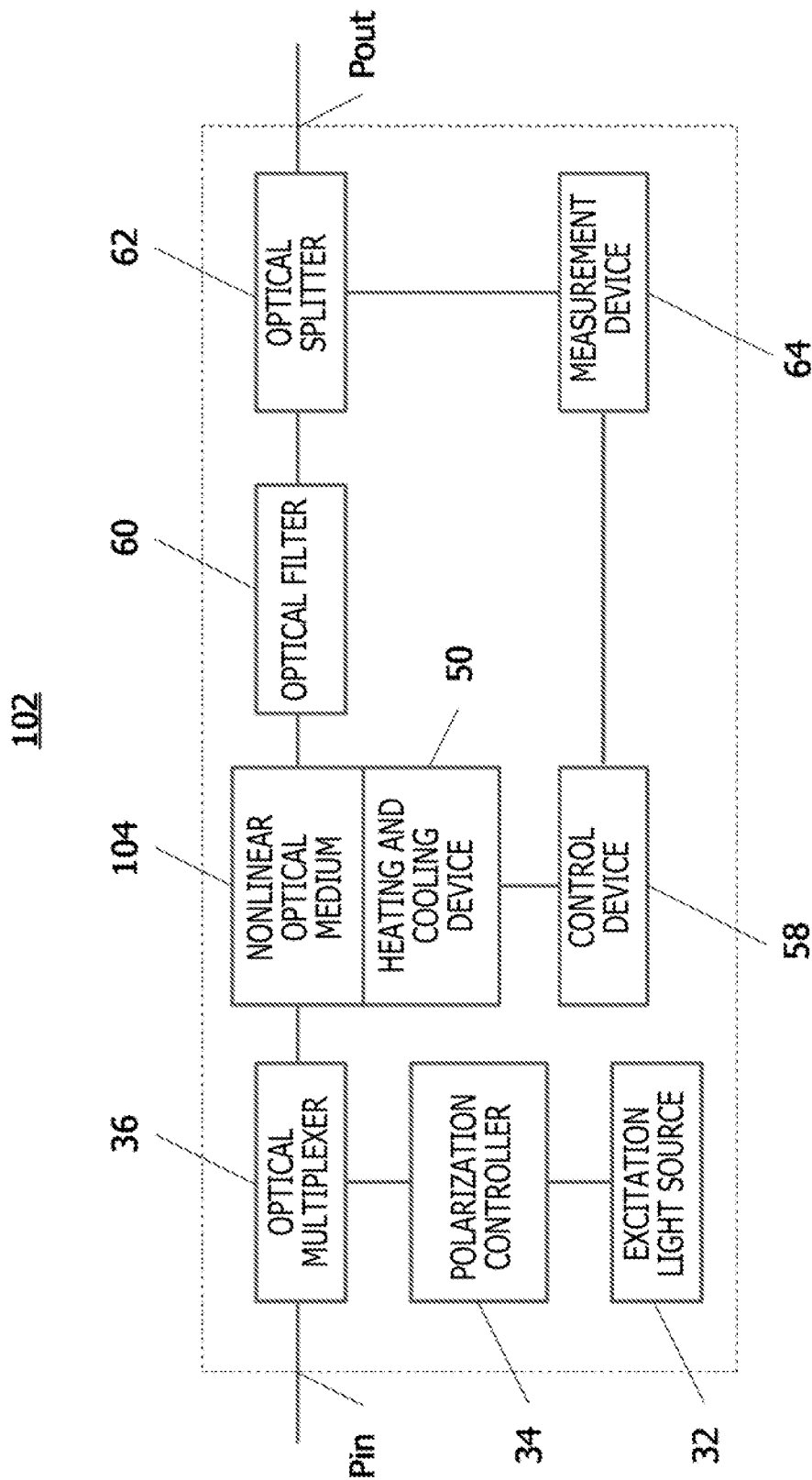
FIG. 15 is a diagram illustrating an example of a hardware configuration of the wavelength conversion device 102.

FIG. 15 is a diagram illustrating an example of a hardware configuration of the wavelength conversion device 102. Each hardware component (for example, an optical multiplexer 36) illustrated in FIG. 15 is included in any of the functional blocks illustrated in FIG. 12 (for example, the excitation light supply unit 20). Hereinafter, a structure and operation of hardware of each functional block illustrated in FIG. 12 will be described based on FIG. 15.

(5-1) Hardware Configuration of Excitation Light Supply Unit

Figure 16:
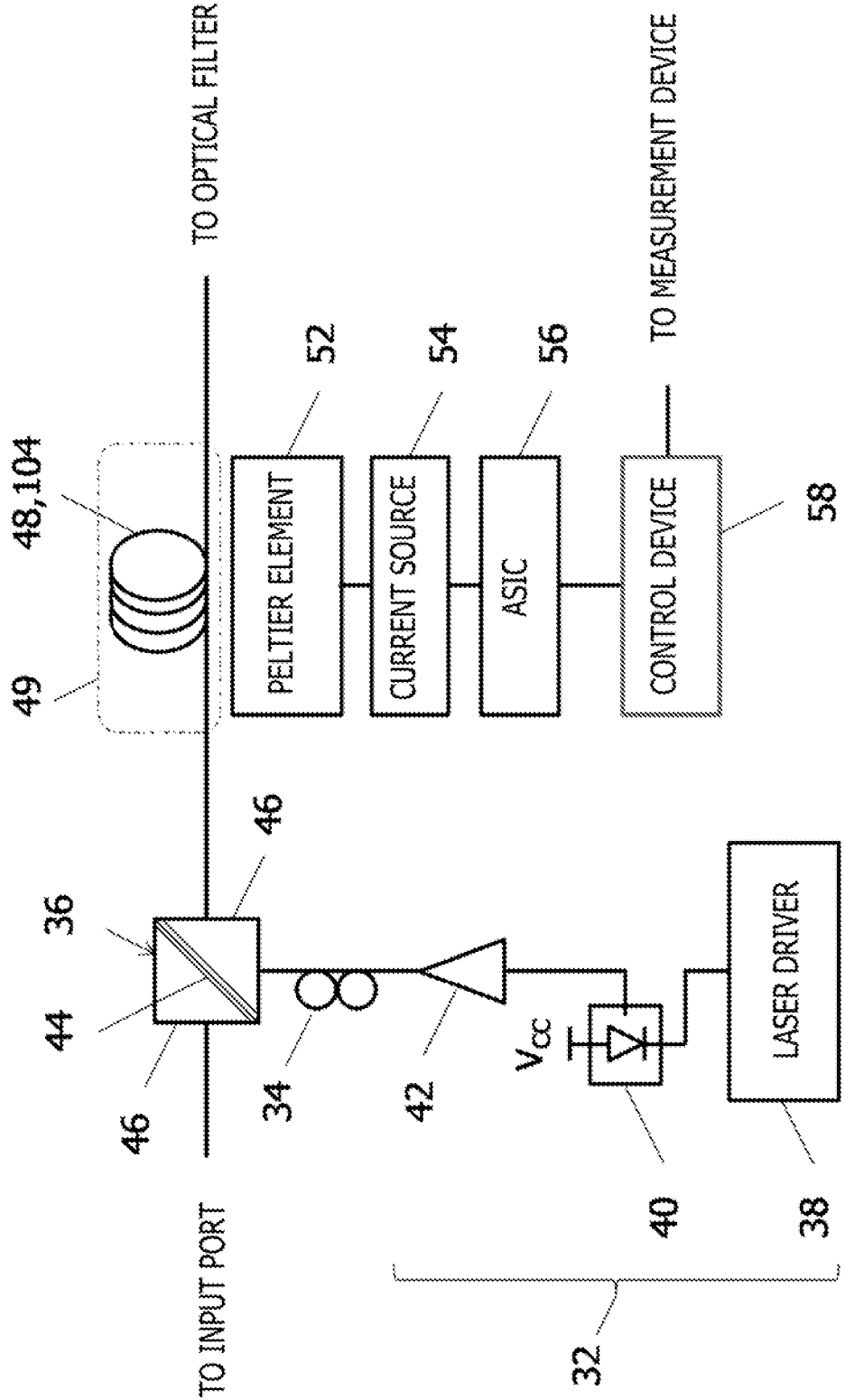

The excitation light supply unit 20 (see FIG. 13) includes, for example, an excitation light source 32 (see FIG. 15), a polarization controller 34, and the optical multiplexer 36. FIG. 16 is a diagram illustrating an example of a hardware configuration of the excitation light source 32 and the like.

—Excitation Light Source 32—

The excitation light source 32 includes, for example, a laser driver 38, a semiconductor laser 40, and an optical amplifier 42. The excitation light source 32 generates a seed of the excitation light 10.

The laser driver 38 is a circuit that drives the semiconductor laser 40. When driven by the laser driver 38, the semiconductor laser 40 outputs laser light. The laser light output from the semiconductor laser 40 is continuous light and is amplified by the optical amplifier 42.

The semiconductor laser 40 is, for example, a distributed feedback semiconductor laser. The semiconductor laser 40 may be a distributed reflector semiconductor laser or an external cavity semiconductor laser. The optical amplifier 42 is, for example, an optical fiber amplifier. The optical amplifier 42 may be a semiconductor optical amplifier.

—Polarization Controller 34—

The amplified laser light passes through the polarization controller 34 and then is incident on the optical multiplexer 36. The excitation light 10 (see FIG. 13) is laser light amplified by the optical amplifier 42 and whose polarization direction is further controlled by the polarization controller 34.

The polarization controller 34 controls the polarization direction of the laser light amplified by the optical amplifier 42 so that the polarization direction (which is a vibration direction of a magnetic field vector) of the excitation light 10 after being multiplexed with the signal light 108 matches a polarization direction of the signal light 108.

The polarization controller 34 is, for example, an optical device including a half-wave plate and a quarter-wave plate.

—Optical Multiplexer 36—

The optical multiplexer 36 (see FIG. 15) multiplexes the signal light 108 input from an input port Pin of the wavelength conversion device 102 with the excitation light 10. The first light 112a (see FIG. 13) includes the signal light 108 and the excitation light 10 multiplexed by the optical multiplexer 36.

The optical multiplexer 36 (see FIG. 16) includes, for example, a dielectric multilayer film 44 and a pair of transparent prisms 46 sandwiching the dielectric multilayer film 44. The dielectric multilayer film 44 changes a course of the excitation light 10 to the nonlinear optical medium 104 side while allowing the signal light 108 to pass through (see FIG. 13). As a result, the signal light 108 is multiplexed with the excitation light 10.

The optical multiplexer 36 and the like (the input port Pin, the optical multiplexer 36, the polarization controller 34, the optical amplifier 42, and the semiconductor laser 40) are connected to each other by, for example, an optical fiber (for example, a polarization maintaining fiber). The same applies to the optical filter and the like described later.

(5-2) Hardware Configuration of Nonlinear Optical Medium

The nonlinear optical medium 104 (see FIG. 13) is, for example, a single-mode optical fiber 48 (see FIG. 16).

The nonlinear optical medium 104 generates the multiplexed second light 112b from the first light 112a including the multiplexed signal light Xk (which is the first signal light 108a) and the excitation light 10 (see "(2-2) Operation of nonlinear optical medium").

(5-3) Hardware Configuration of Heating and Cooling Unit

The heating and cooling unit 22 (see FIG. 13) includes, for example, a heating and cooling device 50 (see FIG. 15). The heating and cooling device 50 includes, for example, a Peltier element 52 (see FIG. 16), a current source 54, and an Application Specific Integrated Circuit (ASIC) 56.

—Current Source 54—

The current source 54 is a circuit that supplies a current to the Peltier element 52.

—Peltier Element 52—

The Peltier element 52 is thermally connected to, for example, the optical fiber 48. The Peltier element 52 supplies the heat 28 (see FIG. 13) to the optical fiber 48 or absorbs the heat 28 from the optical fiber 48, depending on a direction of the current supplied from the current source 54.

—ASIC 56—

The ASIC 56 is an integrated circuit that controls the current source 54 in response to a command 88 from the control unit 26 (see FIG. 13).

In the above example, at least one of heating or cooling is performed directly on the nonlinear optical medium 104. However, the nonlinear optical medium 104 may be immersed in a liquid, and at least one of heating or cooling of the nonlinear optical medium 104 may be executed through the liquid. For example, the heating and cooling unit 22 (see FIG. 13) includes a liquid 49 (see FIG. 16) in which the nonlinear optical medium 104 is immersed, and a device (for example, the Peltier element 52) that performs at least one of heating or cooling of the nonlinear optical medium 104 through the liquid 49 (for example, pure water). The nonlinear optical medium 104 is immersed in a liquid, whereby the nonlinear optical medium 104 is uniformly heated or cooled.

The liquid 49 in which the nonlinear optical medium 104 is immersed is not limited to pure water. The nonlinear optical medium 104 may be immersed in, for example, any of a fluorocarbon, an oil, a silicone oil, and a mixture of biphenyl and diphenyl ether.

(5-4) Hardware Configuration of Measurement Unit

Figure 17:
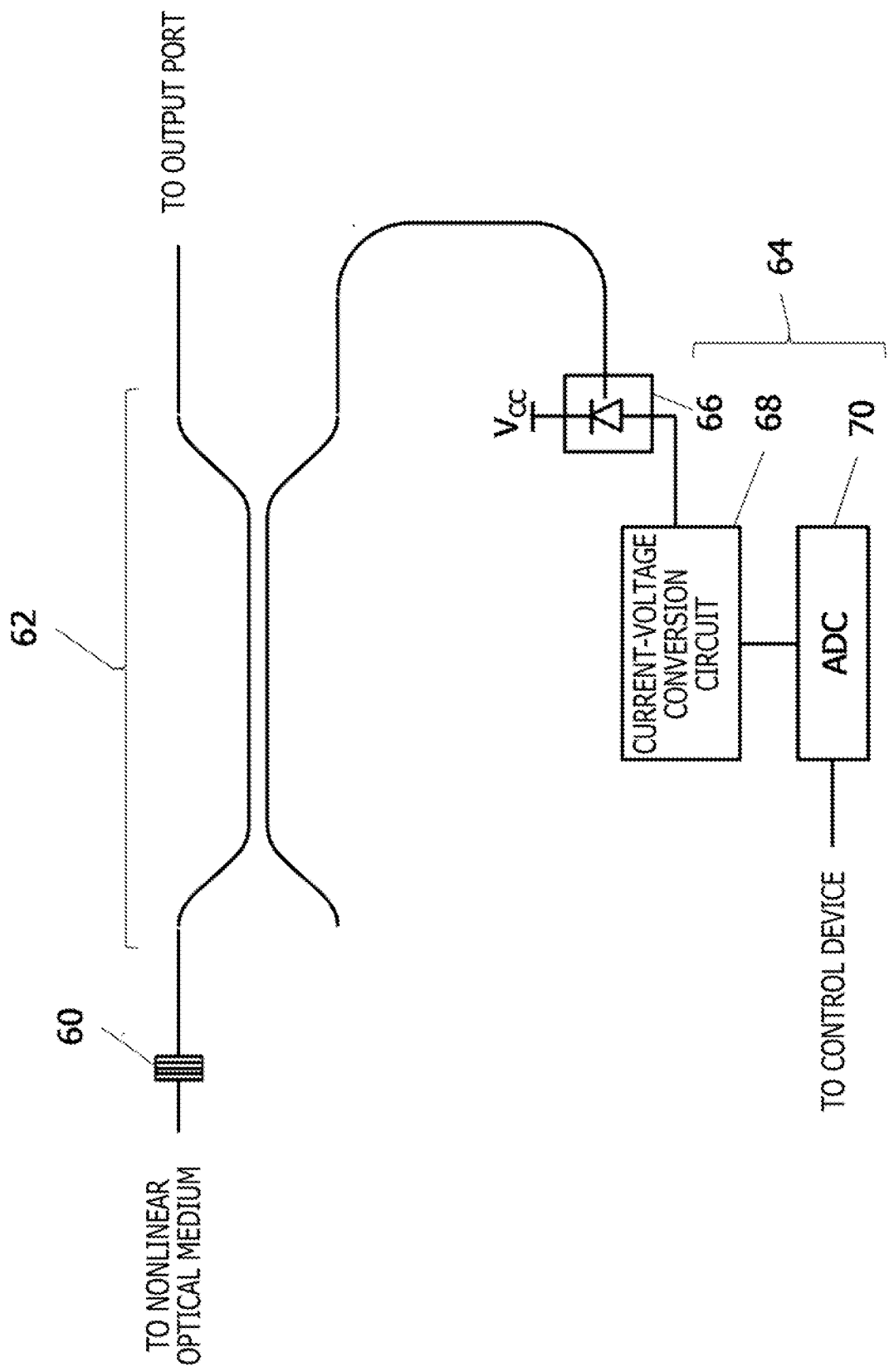

The measurement unit 24 (see FIG. 13) includes, for example, an optical filter 60 (see FIG. 15), an optical splitter 62, and a measurement device 64. FIG. 17 is a diagram illustrating an example of the optical filter 60 and the like.

—Optical Filter 60—

The optical filter 60 (see FIG. 15) allows the new light (which is the second light 112b) generated by the nonlinear optical medium 104 to pass through, and blocks the excitation light 10 and the signal light 108. The optical filter 60 (see FIG. 17) is, for example, an optical device including a dielectric multilayer film.

—Optical Splitter 62—

The optical splitter 62 (see FIG. 15) extracts a part (hereinafter, referred to as split light) of each of lights (for example, wavelength-converted lights Y1 to Yn) included in the new light (which is the second light 112b) generated by the nonlinear optical medium 104, and sends the split light to the measurement device 64 (see FIG. 15).

The optical splitter 62 is a device that causes a part (hereinafter, referred to as branch light) of input from the input light to branch off. When the input light (here, the second light 112b) includes a plurality of lights having different wavelengths, the branch light includes a plurality of split lights obtained by splitting each of the plurality of lights. In the example illustrated in FIG. 15, the input light of the optical splitter 62 is a plurality of generated lights (which are wavelength-converted lights Y1 to Yn) having different wavelengths, generated by the nonlinear optical medium 104.

The optical splitter 62 extracts a part of the input light (for example, 1% to 10%). The same applies to an optical splitter 262 of the third embodiment described later.

The optical splitter 62 further sends a part (hereinafter referred to as output light) other than the branch light of the new light (which is the second light 112b) to an output port Pout. The output light that reaches the output port Pout is output from the output port Pout to the outside of the wavelength conversion device 102.

The optical splitter 62 is, for example, an optical fiber coupler, as illustrated in FIG. 17. The optical splitter 62 may be an optical device (for example, a directional coupler formed on a substrate) other than the optical fiber coupler.

—Measurement Device 64—

The measurement device 64 (see FIG. 15) includes, for example, a photodetector 66 (see FIG. 17), a current-voltage conversion circuit 68, and an analog-to-digital converter 70. The measurement device 64 receives the branch light from the optical splitter 62 and transmits a digital signal indicating the intensity of the branch light to the control unit 26 (see FIG. 13). The digital signal is an example of the "measurement result 30" described with reference to FIG. 13.

First, the photodetector 66 receives the branch light from the optical splitter 62 and converts the received branch light into a photocurrent. The photocurrent is transmitted to the current-voltage conversion circuit 68. The photodetector 66 is, for example, a pin photodiode. The photodetector 66 may be another photodetector (for example, an avalanche photodiode). The same applies to a first photodetector 366a and a second photodetector 366b (see the fourth embodiment) described later.

The current-voltage conversion circuit 68 converts the photocurrent from the photodetector 66 into a voltage. The voltage is transmitted to the analog-to-digital converter 70. The analog-to-digital converter 70 converts the voltage transmitted from the current-voltage conversion circuit 68 into a digital signal. The digital signal is the measurement result 30 of the measurement unit 24.

(5-5) Hardware Configuration of Control Unit

Figure 18:
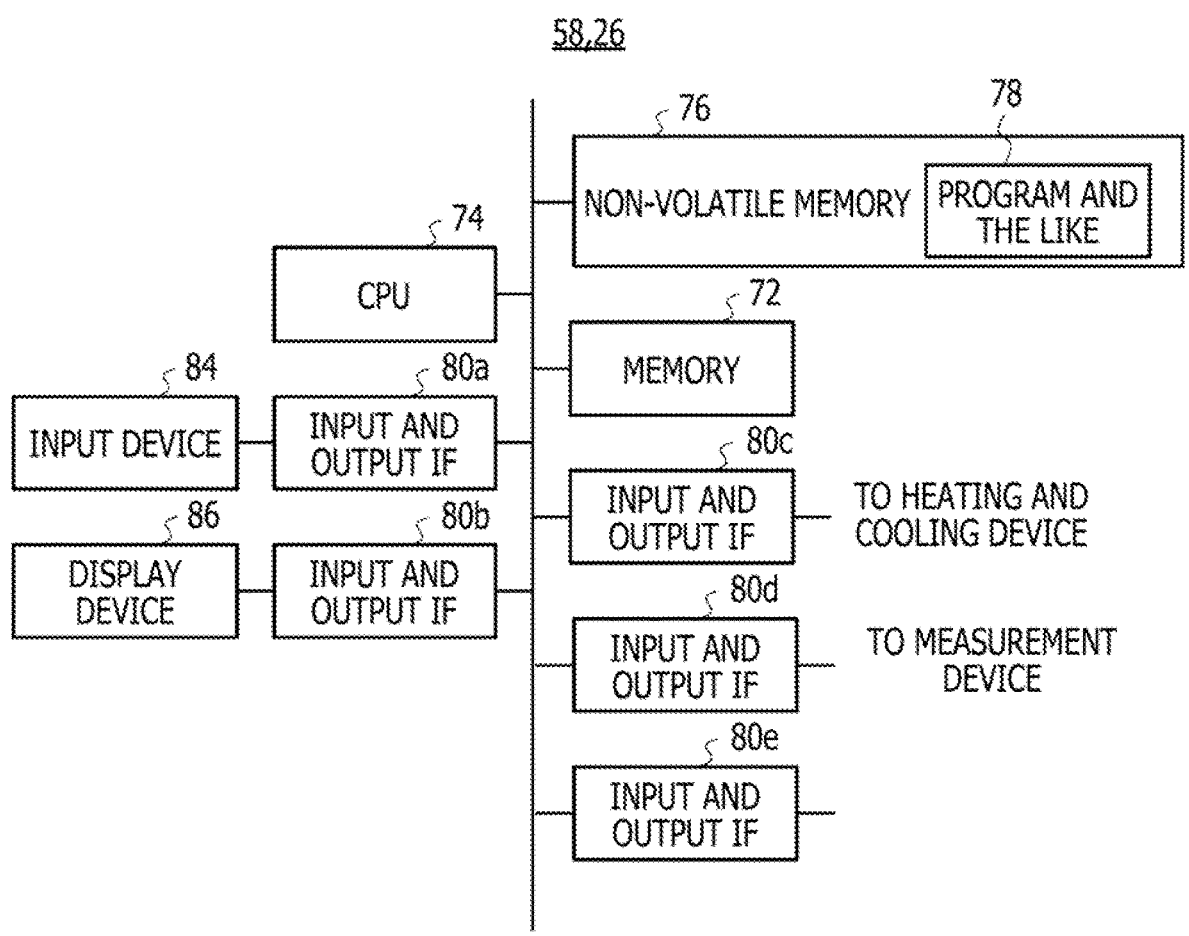
FIG. 18 is a diagram illustrating an example of a control device 58.

The control unit 26 (see FIG. 13) includes, for example, a control device 58 (see FIG. 15). FIG. 18 is a diagram illustrating an example of the control device 58.

The control unit 26 (which is the control device 58) includes, for example, a memory 72 (see FIG. 18) and a processor coupled to the memory 72. The processor is hardware. In the example illustrated in FIG. 18, the processor is a Central Processing Unit (CPU) 74. While acquiring information (which is the "measurement result 30") indicating the intensity of the light (which is the third light 112c) included in the new light generated by the nonlinear optical medium 104, the processor (which is the CPU 74) controls the heating and cooling unit 22 based on the acquired information. The information acquired by the processor is also information indicating the intensity of the new light (which is the second light 112b) generated by the nonlinear optical medium 104. The memory 72 is, for example, a Dynamic Random Access Memory (DRAM).

The control device 58 further includes a non-volatile memory 76. The non-volatile memory 76 records a plurality of programs 78 executed by the CPU 74. The plurality of programs 78 includes a control program described later.

Once the control program of the second embodiment is started, the same processing is repeated endlessly. The plurality of programs 78 also includes a termination program for forcibly terminating such endless processing. The same applies to programs of the third to fourth embodiments. Processing executed by the termination program is interrupt processing.

The control device 58 further includes a plurality of input and output interfaces 80a to 80e, and a bus 82. The CPU 74 and the like are connected to each other via the bus 82.

An input device 84 (for example, a keyboard) may be connected to one of the input and output interfaces (for example, the input and output interface 80a). A display device 86 (for example, a liquid crystal display) may be connected to another one of the input and output interfaces (for example, the input and output interface 80b).

The ASIC 56 (see FIG. 16) of the heating and cooling unit 22 is connected to another one of the input and output interfaces (for example, the input and output interface 80c).

The analog-to-digital converter 70 (see FIG. 17) of the measurement unit 24 is connected to another one of the input and output interfaces (for example, the input and output interface 80d).

Thus, the control unit 26 of the second embodiment is implemented by the CPU 74, the memory 72, the non-volatile memory 76, and the plurality of input and output interfaces 80a to 80d. The input and output interface 80e is used in a control device of the fourth embodiment. In the control device 58 of the second embodiment, the input and output interface 80e may be omitted.

In the example illustrated in FIG. 18, the control device 58 is a device including the memory 72 and the processor (which is the CPU 74), but the control device 58 may be another circuit. The control device 58 may be, for example, an ASIC or a logic circuit.

—Control Program—

Figure 19:
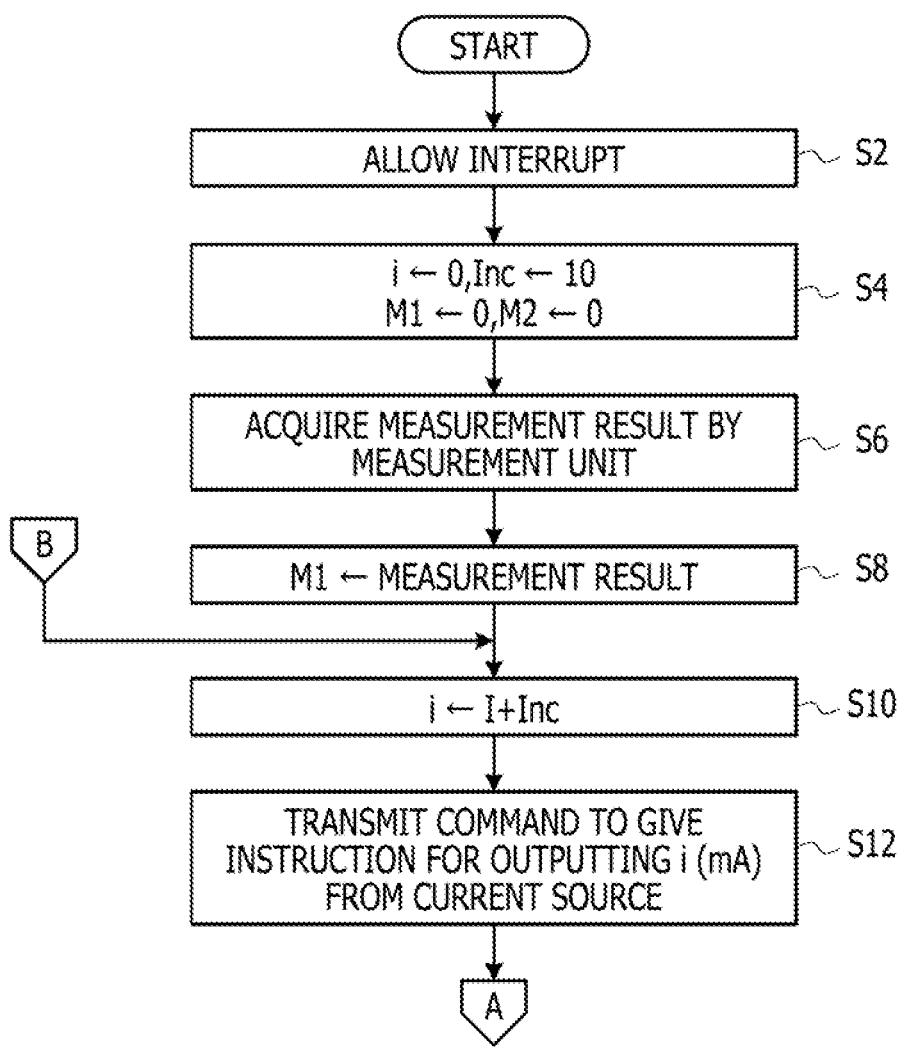
FIG. 19 is a diagram illustrating an example of a flowchart of a control program 78.
Figure 20:
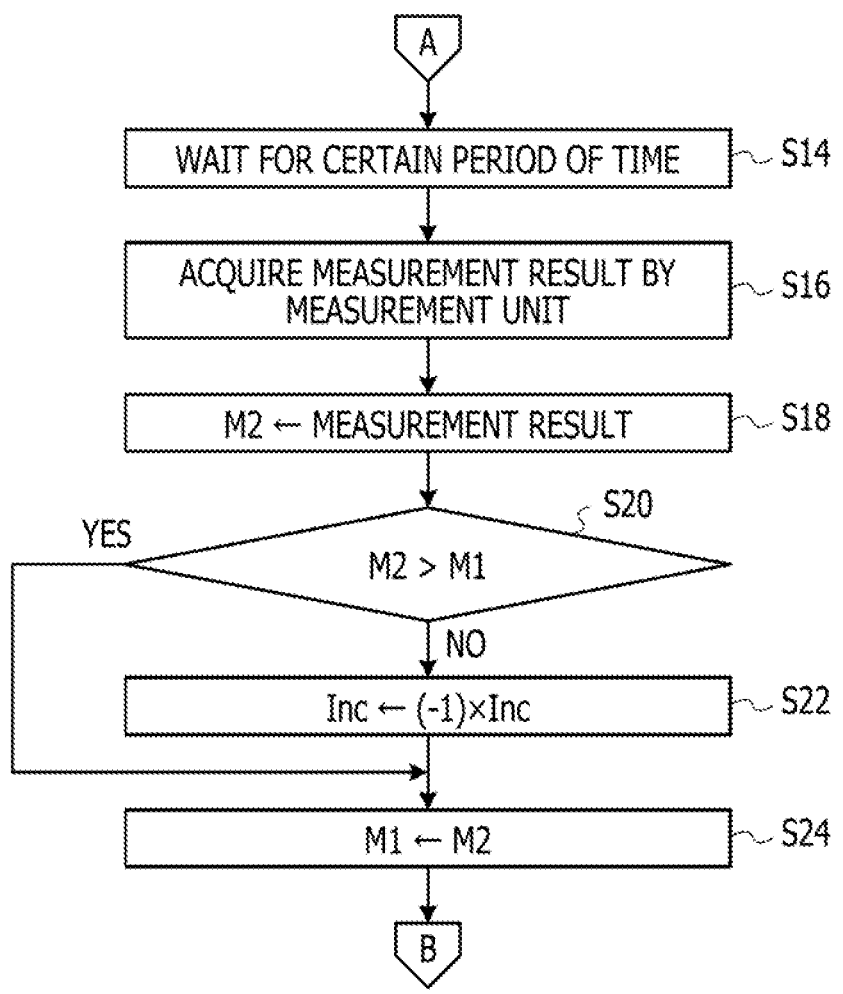
FIG. 20 is a diagram illustrating the example of the flowchart of the control program 78.

FIGS. 19 to 20 are diagrams illustrating an example of a flowchart of the control program. Each step of FIGS. 19 to 20 is executed by the control unit 26.

The CPU 74 reads a control program from the non-volatile memory 76 and executes the control program, in response to start operation executed in, for example, the input device 84 (see FIG. 18).

—Step S2—

First, the CPU 74 allows interrupt processing by the termination program or the like.

—Step S4—

After step S2, the CPU 74 assigns initial values to multiple variables i, Inc, M1, and M2. The initial values of the variables i, M1, and M2 are, for example, zero. The initial value of the variable Inc is, for example, 10.

The variable i is an output current of the current source 54 connected to the Peltier element 52 (see FIG. 16). The variable Inc is an increment of the variable i. The unit of the variable i and the variable Inc is, for example, mA.

—Step S6—

After step S4, the CPU 74 acquires the measurement result 30 of the measurement unit 24 (see FIG. 13) via the input and output interface 80d connected to the measurement device 64 (see FIG. 15). The measurement result 30 is information indicating the intensity of the third light 112c (which is the wavelength-converted light 114).

—Step S8—

After step S6, the CPU 74 assigns the measurement result acquired in step S6 to the variable M1.

—Step S10—

After step S8, the CPU 74 adds a value of the variable Inc to the variable i.

—Step S12—

After step S10, the CPU 74 transmits the command 88 (see FIG. 13) to the heating and cooling unit 22. The command 88 is a command instructing the heating and cooling unit 22 to output a current (for example, 10 mA) corresponding to a value of the variable i (for example, 10) from the current source 54 (see FIG. 16). The output of the current source 54 is supplied to the Peltier element 52.

The command 88 is transmitted to the ASIC 56 (see FIG. 16) of the heating and cooling unit 22 via the input and output interface 80c connected to the heating and cooling unit 22.

The heating and cooling unit 22 changes a degree of heating or cooling of the nonlinear optical medium 104 in response to the command 88. As a result, the temperature of the nonlinear optical medium 104 changes.

—Step S14—

After step S12, the CPU 74 waits for a certain period of time (for example, 1 second to 1000 seconds). During waiting of the CPU 74, the temperature change of the nonlinear optical medium 104 by the command 88 is almost completed.

—Step S16—

After step S14, the CPU 74 again acquires the measurement result 30 of the measurement unit 24 (see FIG. 13).

—Step S18—

After step S16, the CPU 74 assigns the measurement result acquired in step S16 to the variable M2.

—Step S20—

After step S18, the CPU 74 determines whether or not the variable M2 is greater than the variable M1. If the variable M2 is greater than the variable M1, the CPU 74 proceeds to step S24. If the variable M2 is less than or equal to the variable M1, the CPU 74 proceeds to step S22.

—Step S22—

When proceeding from step S20 to step S22, the CPU 74 assigns to the variable Inc a value obtained by multiplying the variable Inc by −1.

—Step S24—

After step S20 or step S22, the CPU 74 assigns a value of the variable M2 to the variable M1. The CPU 74 then returns to step S10.

In step S20, it is determined whether or not the intensity of the third light 112c (here, the wavelength-converted light 114) is increased by the variable i changed in step S10. On the basis of a result of the determination, the value of the variable i is repeatedly changed to cause the intensity of the third light 112c to be increased (steps S10 to S24). Thus, the temperature of the nonlinear optical medium 104 is controlled to cause the intensity of the third light 112c to be increased.

(6) Modifications (6-1) First Modification

In the above example, as illustrated in FIG. 12, the wavelength conversion device 102 includes the excitation light supply unit 20. However, the wavelength conversion device 102 does not have to include the excitation light supply unit 20. In this case, the excitation light 10 is generated outside the wavelength conversion device and multiplexed with the signal light 108, and then input to the wavelength conversion device. The wavelength conversion device that does not include the excitation light supply unit 20 can use one excitation light supply unit 20 provided outside together with another wavelength conversion device.

According to a first modification, the wavelength conversion device 102 can be downsized.

(6-2) Second Modification

In the above example, as illustrated in FIG. 12, the temperature control unit 106 includes the measurement unit 24. However, the temperature control unit 106 does not have to include the measurement unit 24. In this case, the temperature control unit 106 acquires information indicating the intensity of the third light 112c from, for example, the outside of the wavelength conversion device 102. The wavelength conversion device that does not include the measurement unit 24 can use one measurement unit 24 provided outside together with another wavelength conversion device.

According to a second modification, the wavelength conversion device 102 can be downsized.

(6-3) Third Modification

Figure 21:
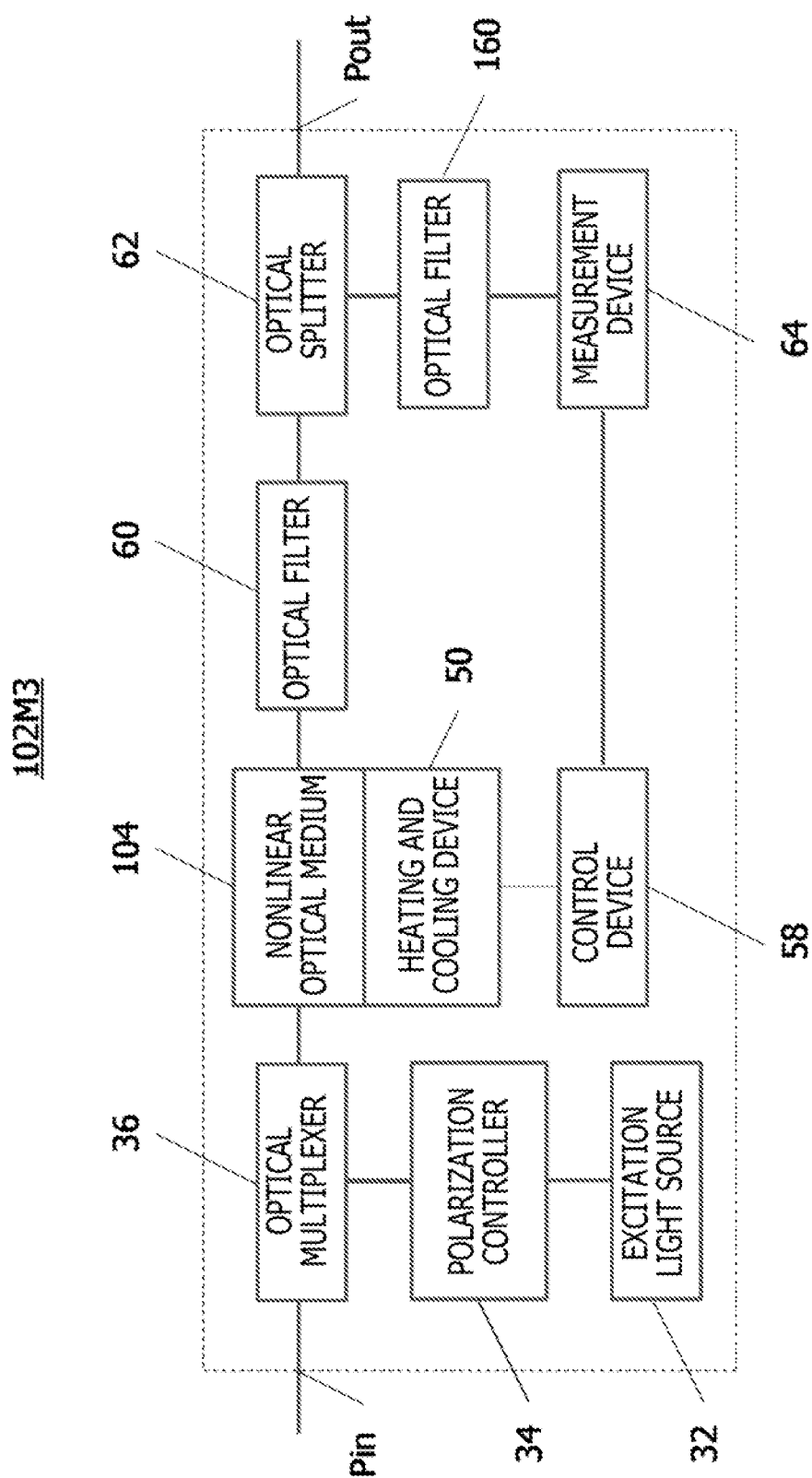
FIG. 21 is a diagram illustrating an example of a hardware configuration of a wavelength conversion device 102M3 of a third modification of the second embodiment.

FIG. 21 is a diagram illustrating an example of a hardware configuration of a wavelength conversion device 102M3 of a third modification of the second embodiment. The wavelength conversion device 102M3 includes an optical filter 160 arranged between the optical splitter 62 and the measurement device 64. The optical filter 160 is an optical filter different from the optical filter 60 arranged between the nonlinear optical medium 104 and the optical splitter 62. The third modification is an example of the second modification of the first embodiment.

The optical filter 160 allows light having the farthest wavelength from the wavelength of the excitation light 10 out of the first wavelength-converted light 114a (see FIG. 14) and the second wavelength-converted light 114b to pass through, and blocks the other light. In the example illustrated in FIG. 14, the first wavelength-converted light 114a (which includes the wavelength-converted lights Y1 to Ym) is allowed to pass through, and the second wavelength-converted light 114b (which includes the wavelength-converted lights Ym+1 to Yn) is blocked. The third light 112c (which is the light whose intensity is measured by the measurement unit 24) of the third modification is light (which is the first wavelength-converted light 114a) that passes through the optical filter 160 out of the first wavelength-converted light 114a and the second wavelength-converted light 114b.

Except for the above points, a structure, operation, and the like of the wavelength conversion device 102M3 of the third modification are substantially the same as the structure, operation, and the like of the wavelength conversion device 102 described with reference to FIGS. 12 to 20.

In the example illustrated in FIG. 14, the wavelength of the first wavelength-converted light 114a is farther from the wavelength of the excitation light 10 than the wavelength of the second wavelength-converted light 114b. Thus, the wavelength conversion efficiency of the first wavelength-converted light 114a is more easily affected by the temperature of the nonlinear optical medium 104 than the wavelength conversion efficiency of the second wavelength-converted light 114b (see "(3) Suppression of fluctuation of wavelength conversion efficiency" in the first embodiment).

Thus, according to the third modification in which the temperature of the nonlinear optical medium 104 is controlled on the basis of the intensity of the first wavelength-converted light 114a (which is the wavelength-converted light farthest from the excitation light 10), it is possible to effectively suppress the fluctuation of the wavelength conversion efficiency due to the change in the environmental temperature.

(6-4) Fourth Modification

Figure 22:
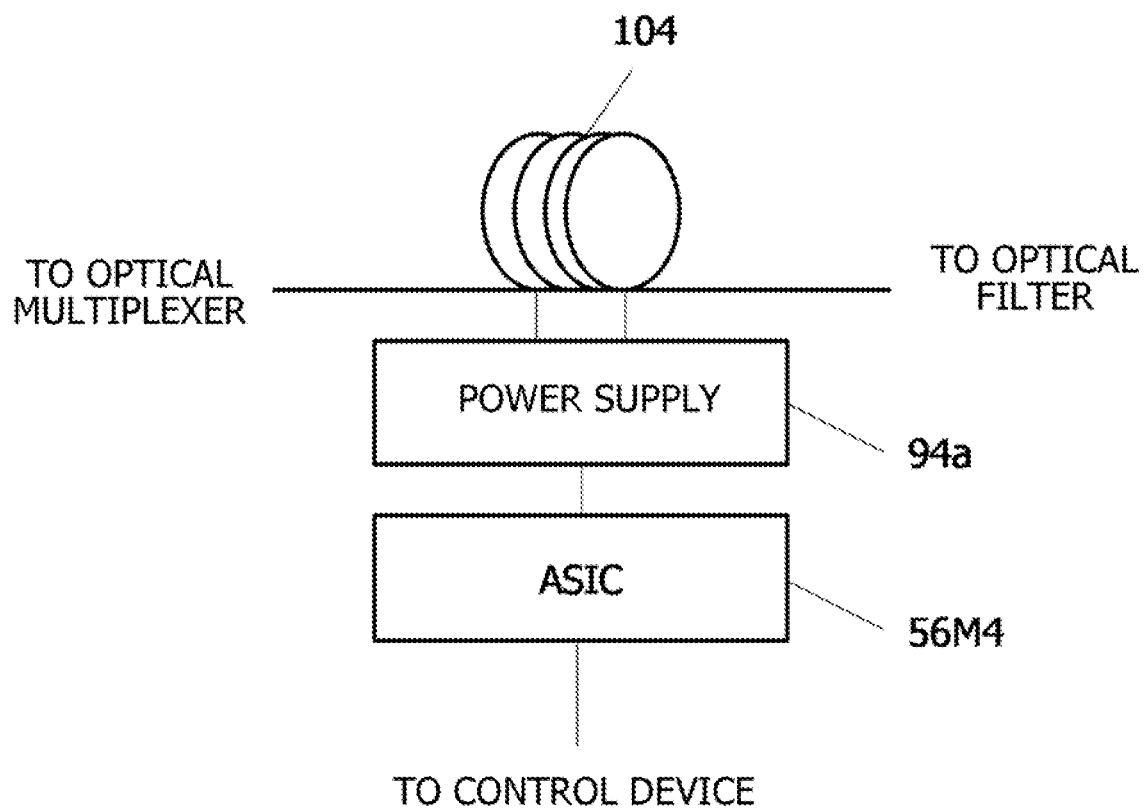
FIG. 22 is a diagram illustrating an example of a heating and cooling unit 22M4 (see FIG. 13) of a fourth modification of the second embodiment.
Figure 23:
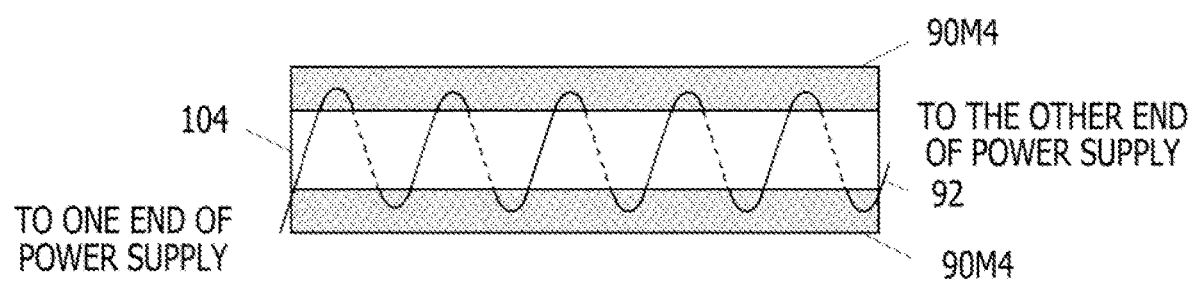
FIG. 23 is a diagram illustrating the example of the heating and cooling unit 22M4 (see FIG. 13) of the fourth modification of the second embodiment.

FIGS. 22 to 23 are diagrams illustrating an example of a heating and cooling unit 22M4 (see FIG. 12) of a fourth modification of the second embodiment. A wavelength conversion device 102M4 of the fourth modification is similar to the wavelength conversion device 102 of the second embodiment described with reference to FIGS. 12 to 20. Thus, the description of portions common to the wavelength conversion device 102 will be omitted or simplified.

The heating and cooling unit 22M4 (see FIG. 12) of the fourth modification includes a coating film 90M4 that surrounds the nonlinear optical medium 104 (see FIG. 23) and a heating wire 92 embedded in the coating film 90M4, instead of the Peltier element 52 (see FIG. 16). The heating and cooling unit 22M4 of the fourth modification further includes a power supply 94a (see FIG. 22; hereinafter referred to as a first power supply) that supplies electric power to the heating wire 92, instead of the current source 54 (see FIG. 16) for the Peltier element 52. A material of the coating film 90M4 is, for example, a polymer such as nylon or a UV curable resin (the same applies to a fifth modification). The heating wire 92 is, for example, a Ni—Cr based alloy or a Fe—Cr—Al based alloy.

The heating and cooling unit 22M4 of the fourth modification controls the temperature of the nonlinear optical medium 104 by heat generated by the heating wire 92.

A control unit 26M4 (which is the control device 58 in FIG. 15) of the fourth modification controls the first power supply 94a via an ASIC 56M4 (see FIG. 22). A hardware configuration of the control unit 26M4 (see FIG. 12) of the fourth modification is substantially the same as the hardware configuration of the control unit 26 (see FIG. 12) described with reference to FIG. 18. However, a control program recorded in the non-volatile memory 76 (see FIG. 18) is different from the control program described with reference to FIGS. 19 to 20.

Figure 24:
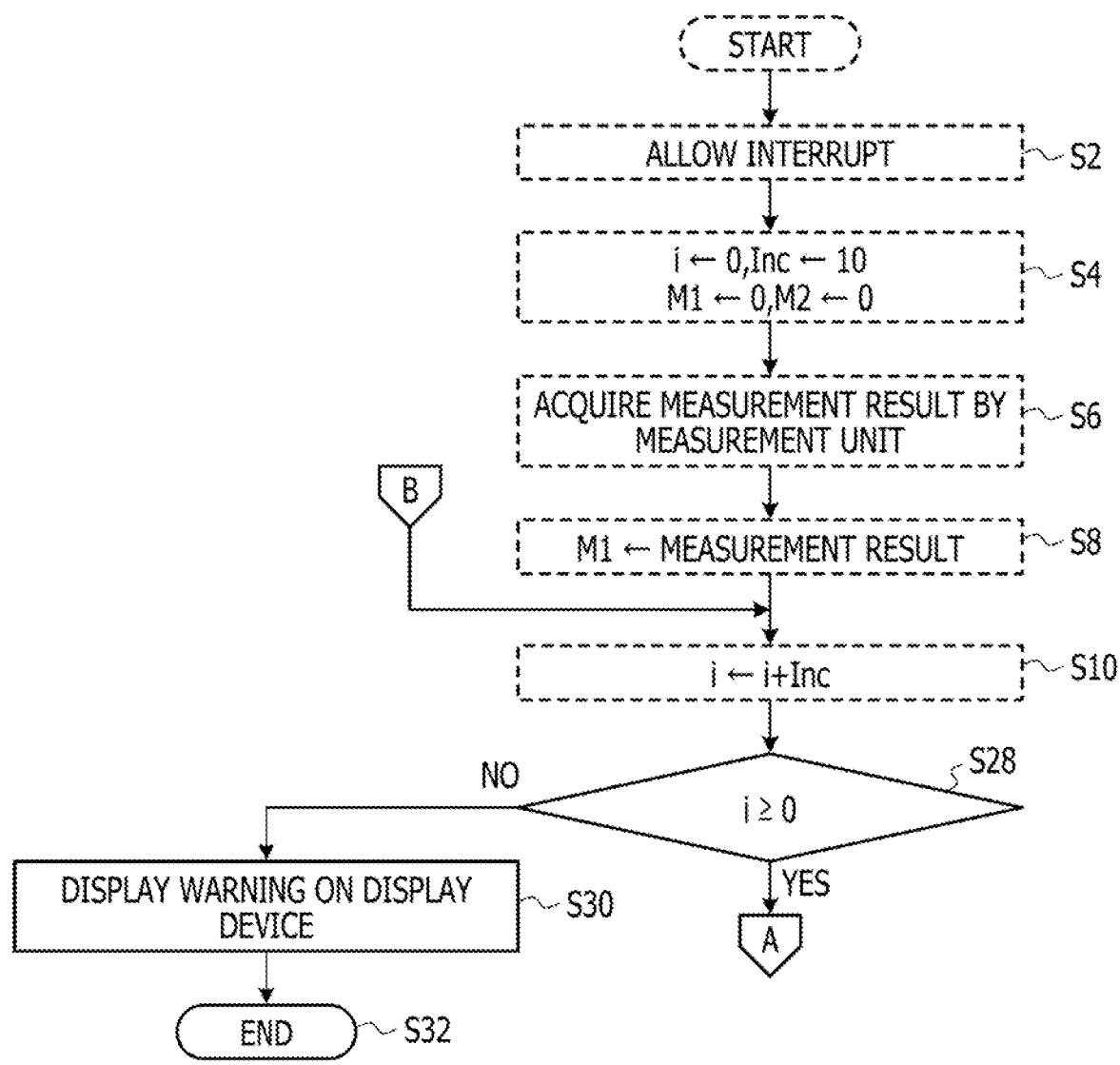
FIG. 24 is a diagram illustrating an example of a flowchart of a control program in the fourth modification of the second embodiment.
Figure 25:
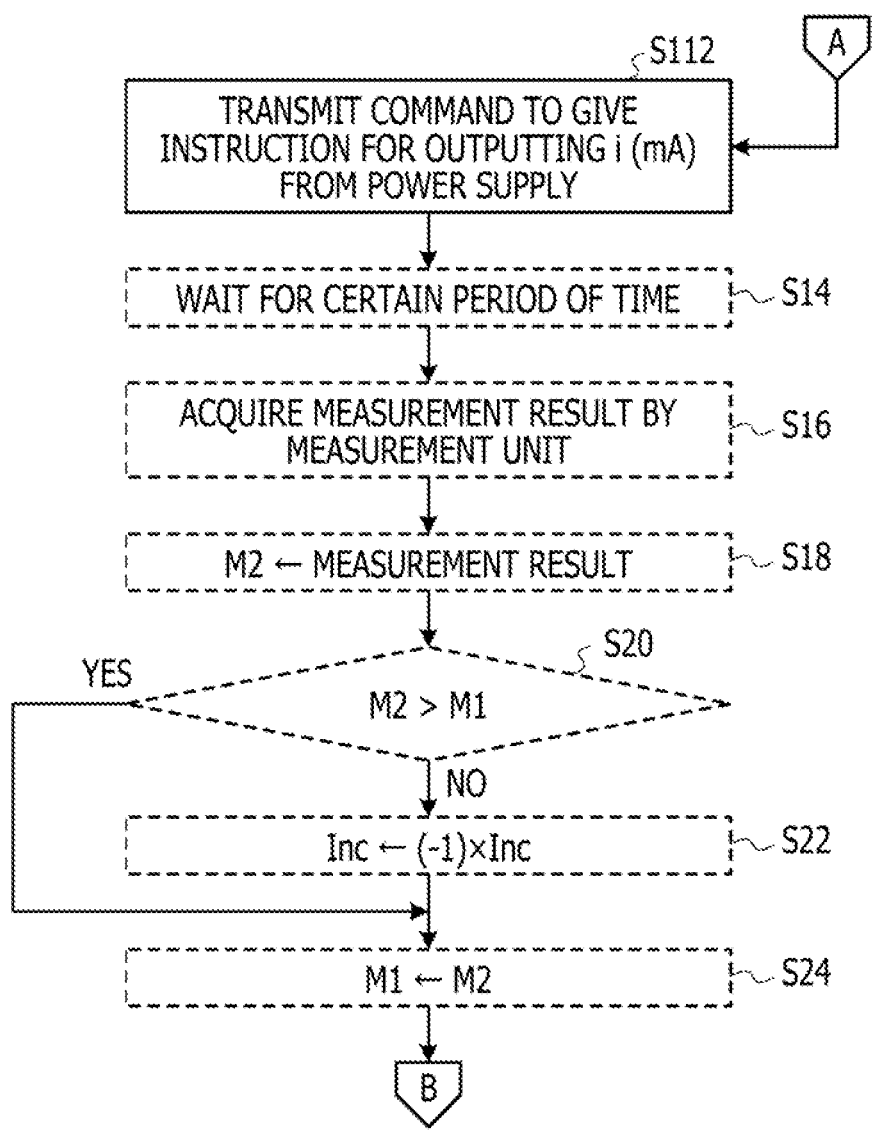
FIG. 25 is a diagram illustrating the example of the flowchart of the control program in the fourth modification of the second embodiment.

FIGS. 24 to 25 are diagrams illustrating an example of a flowchart of the control program of the fourth modification of the second embodiment. Each step of FIGS. 24 to 25 is executed by the control unit 26M4 (see FIG. 12).

The flowchart of FIGS. 24 to 25 includes the same steps as the flowchart described with reference to FIGS. 19 to 20. The steps surrounded by the broken line frame are the steps described in FIGS. 19 to 20. The description of the steps described with reference to FIGS. 19 to 20 will be omitted.

—Step S28—

After step S10, the CPU 74 determines whether or not the variable i is greater than or equal to zero. If the variable i is greater than or equal to zero, the CPU 74 proceeds to step S112. If the variable i is less than zero, the CPU 74 proceeds to step S30. In the fourth modification, the variable i is an output current of the power supply 94a (which is the first power supply) connected to the heating wire 92.

—Step S30—

When proceeding to step S30, the CPU 74 displays a warning on the display device 86 (see FIG. 18) and terminates the control program.

When the intensity of the third light 112c (for example, the wavelength-converted light 114) does not stop increasing after steps S10 to S24 are repeated, the variable i may be less than zero (in other words, a negative value). In this case, it is preferable to cool the nonlinear optical medium 104, but it is difficult to cool the nonlinear optical medium 104 by supplying a current to the heating wire 92. Thus, the CPU 74 displays the warning on the display device 86 and ends energization of the heating wire 92.

—Step S112—

When proceeding to step S112, the CPU 74 transmits a command 88M4 (see FIG. 13) to the heating and cooling unit 22M4. The command 88M4 is a command instructing the heating and cooling unit 22M4 to output the current (for example, 10 mA) corresponding to the value of the variable i (for example, 10) from the power supply 94a (see FIG. 22). The output of the power supply 94a is supplied to the heating wire 92.

Except for the above points, the wavelength conversion device 102M4 of the fourth modification is substantially the same device as the wavelength conversion device 102 of the second embodiment described with reference to FIGS. 12 to 20. The same applies to a wavelength conversion method.

According to the fourth modification, since the coating film 90M4 in which the heating wire 92 is embedded surrounds the nonlinear optical medium 104, the temperature of the nonlinear optical medium 104 can be controlled substantially uniformly.

Moreover, in the fourth modification, since the heating wire 92 is connected to the nonlinear optical medium 104 via the coating film 90M4, the thermal resistance is reduced between the heating wire 92 and the nonlinear optical medium 104. Thus, according to the fourth modification, a response time of the temperature control to the nonlinear optical medium 104 can be shortened.

(6-5) Fifth Modification

Figure 26:
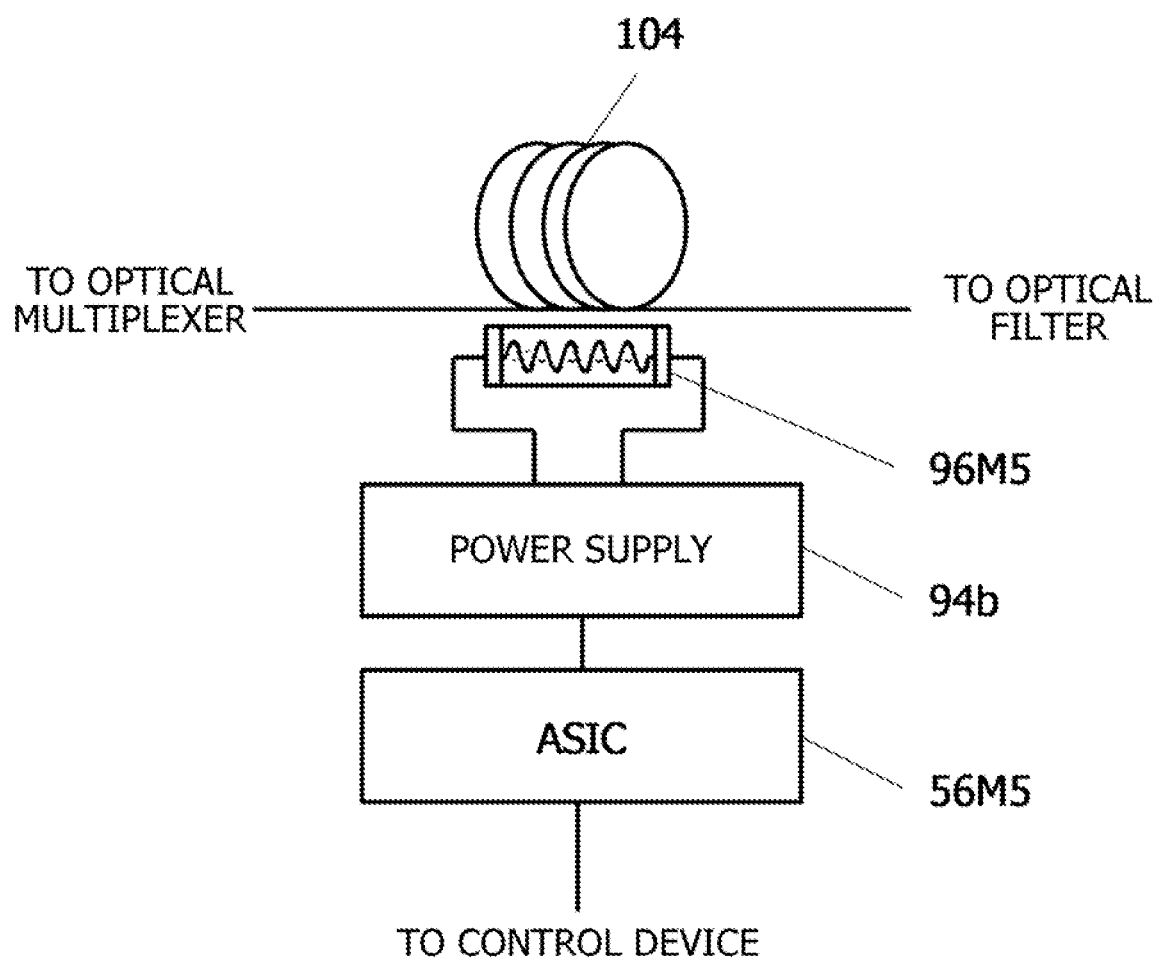
FIG. 26 is a diagram illustrating an example of a heating and cooling unit 22M5 (see FIG. 13) of a fifth modification of the second embodiment.
Figure 27:
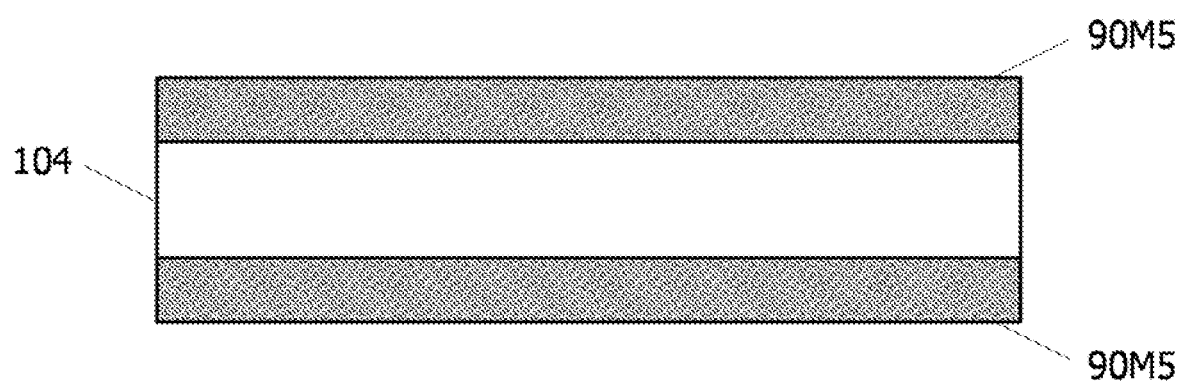
FIG. 27 is a diagram illustrating the example of the heating and cooling unit 22M5 (see FIG. 13) of the fifth modification of the second embodiment.

FIGS. 26 to 27 are diagrams illustrating an example of a heating and cooling unit 22M5 (see FIG. 12) of a fifth modification of the second embodiment. The fifth modification is similar to the wavelength conversion device 102 of the second embodiment described with reference to FIGS. 12 to 20. Thus, the description of portions common to the wavelength conversion device 102 will be omitted or simplified.

The heating and cooling unit 22M5 (see FIG. 12) of the fifth modification includes a coating film 90M5 that surrounds the nonlinear optical medium 104 (see FIG. 27) and contains a material (hereinafter referred to as an infrared absorbing material) that absorbs infrared rays and generates heat. The heating and cooling unit 22M5 of the fifth modification further includes a light source 96M5 (see FIG. 26) that generates infrared rays to be emitted to the coating film 90M5. The heating and cooling unit 22M5 of the fifth modification includes the coating film 90M5 and the light source 96M5, instead of the Peltier element 52 (see FIG. 16). The infrared absorbing material of the coating film 90M5 is, for example, a black body such as carbon particles, graphene, and carbon nanotubes, an infrared absorbing dye, and the like.

The heating and cooling unit 22M5 (see FIG. 12) of the fifth modification further includes a power supply 94b (see FIG. 26; hereinafter, referred to as a second power supply) that supplies electric power to the light source 96M5 for the infrared rays, instead of the current source 54 (see FIG. 16) for the Peltier element 52. The heating and cooling unit 22M5 (see FIG. 12) of the fifth modification controls the temperature of the nonlinear optical medium 104 by the heat generated by the infrared absorbing material of the coating film 90M5 absorbing the infrared rays of the light source 96M5.

The heating and cooling unit 22M5 (see FIG. 12) of the fifth modification further includes an ASIC 56M5 (see FIG. 26).

The control unit 26M5 (see FIG. 12) of the fifth modification controls the second power supply 94b via the ASIC 56M5 (see FIG. 26).

A hardware configuration of the control unit 26M5 (see FIG. 12) of the fifth modification is substantially the same as the hardware configuration of the control unit 26 (see FIG. 12) described with reference to FIG. 18. A control program recorded in the non-volatile memory 76 (see FIG. 18) is substantially the same as the control program of the fourth modification described with reference to FIGS. 24 to 25.

Except for the above points, a wavelength conversion device 102M5 (see FIG. 12) of the fifth modification is substantially the same device as the wavelength conversion device 102 of the second embodiment described with reference to FIGS. 12 to 20. The same applies to a wavelength conversion method.

According to the fifth modification, since the coating film 90M5 including the infrared absorbing material surrounds the nonlinear optical medium 104, the temperature of the nonlinear optical medium 104 can be controlled substantially uniformly.

Moreover, in the fifth modification, the coating film 90M5 (see FIG. 27) including the infrared absorbing material is in dose contact with the nonlinear optical medium 104. Thus, according to the fifth modification, since the thermal resistance can be reduced between the infrared absorbing material and the nonlinear optical medium 104, the response time of the temperature control to the nonlinear optical medium 104 can be shortened.

(6-6) Sixth Modification

Figure 28:
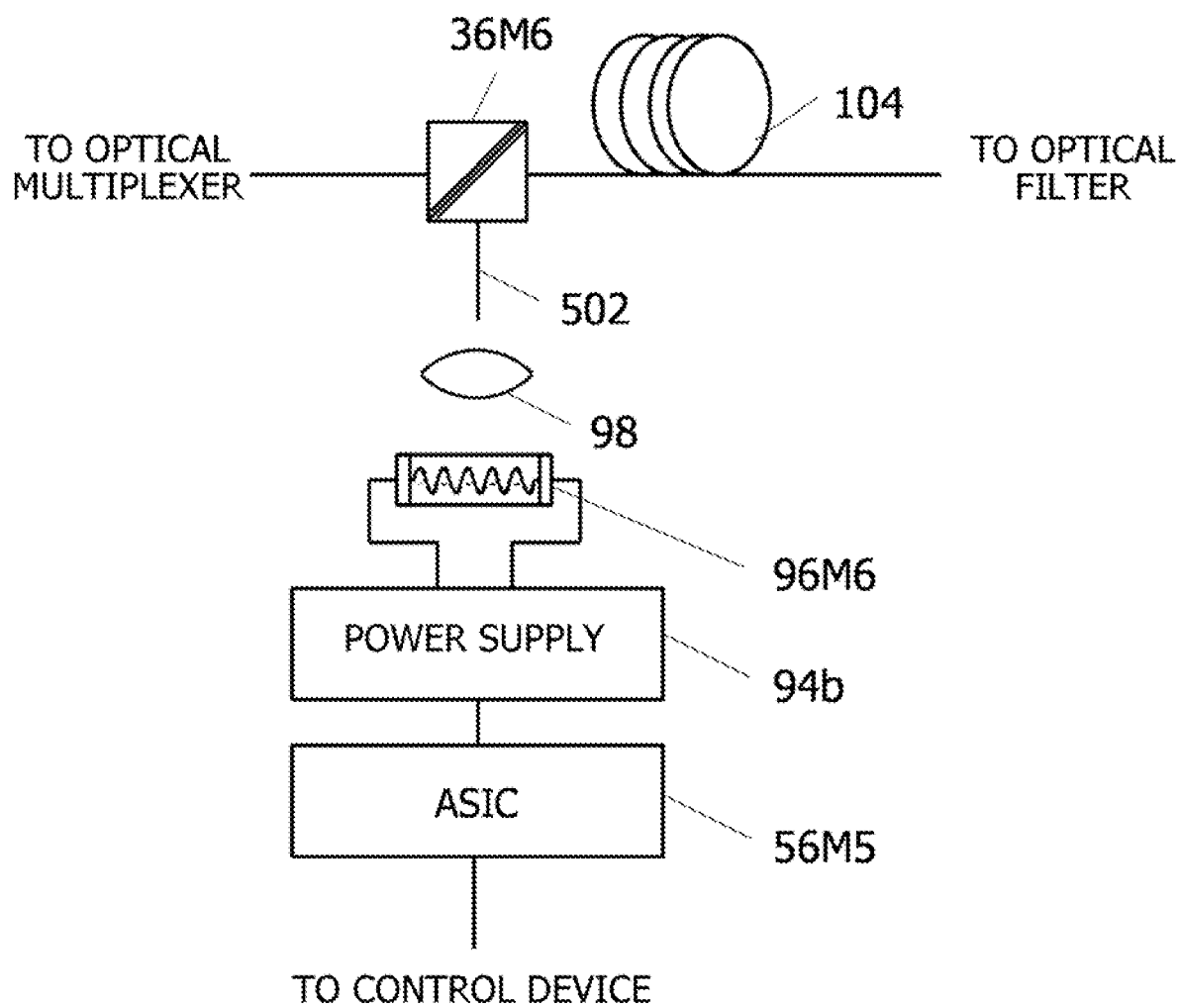
FIG. 28 is a diagram explaining a heating and cooling unit 22M6 (see FIG. 13) of a sixth modification of the second embodiment.

FIG. 28 is a diagram explaining a heating and cooling unit 22M6 (see FIG. 12) of a sixth modification of the second embodiment. The sixth modification is similar to the fifth modification of the second embodiment described with reference to FIGS. 26 to 27. Thus, the description of portions common to the fifth modification will be omitted or simplified.

A light source 96M6 (see FIG. 28) of the sixth modification generates infrared rays that are guided through the nonlinear optical medium 104. For example, the infrared rays generated by the light source 96M6 are focused by a lens 98 and emitted to an end face of the optical fiber 502 connected to an optical multiplexer 36M6.

The infrared rays emitted to the end face of the optical fiber 502 are multiplexed with the signal light 108 (see FIG. 13) and the excitation light 10 by the optical multiplexer 36M6, and are incident on the nonlinear optical medium 104. The infrared rays incident on the nonlinear optical medium 104 are gradually absorbed by the infrared absorbing material of the coating film 90M5 (see FIG. 27) while being guided through the nonlinear optical medium 104. The infrared rays absorbed by the infrared absorbing material are converted into heat, and heat the nonlinear optical medium 104.

Except for the above points, a wavelength conversion device 102M6 (see FIG. 12) of the sixth modification is substantially the same device as the wavelength conversion device 102M5 of the fifth modification. The same applies to a wavelength conversion method.

According to the sixth modification, since the coating film 90M5 including the infrared absorbing material surrounds the nonlinear optical medium 104 similarly to the fifth modification, the temperature of the nonlinear optical medium 104 can be controlled substantially uniformly.

In the sixth modification, the coating film 90M5 including the infrared absorbing material is in dose contact with the nonlinear optical medium 104, similarly to the fifth modification. Thus, according to the sixth modification, since the thermal resistance can be reduced between the infrared absorbing material and the nonlinear optical medium 104, the response time of the temperature control to the nonlinear optical medium 104 can be shortened.

(6-7) Seventh Modification

Figure 29:
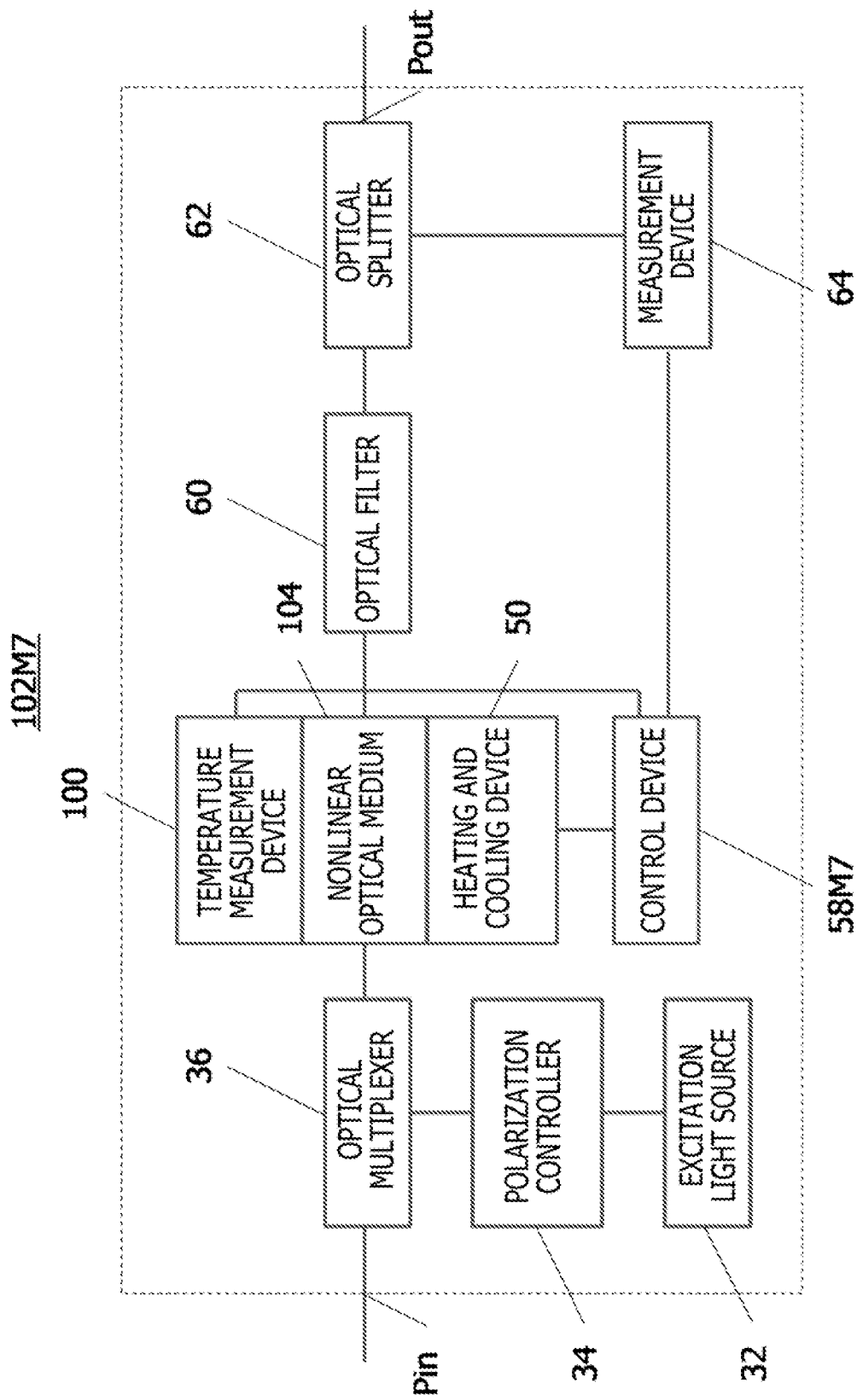
FIG. 29 is a diagram illustrating an example of a hardware configuration of a wavelength conversion device 102M7 of a seventh modification of the second embodiment.

FIG. 29 is a diagram illustrating an example of a hardware configuration of a wavelength conversion device 102M7 (see FIG. 12) of a seventh modification of the second embodiment. The hardware configuration of the wavelength conversion device 102M7 is similar to the hardware configuration of the wavelength conversion device 102 described with reference to FIG. 15. Thus, the description of portions common to the wavelength conversion device 102 of FIG. 15 will be omitted or simplified.

The wavelength conversion device 102M7 of the seventh modification includes a temperature measurement device 100 that measures the temperature of the nonlinear optical medium 104. The temperature measurement device 100 is, for example, a device including a sensor (hereinafter referred to as a temperature sensor) such as a thermistor or a thermocouple, and a circuit that converts output of the temperature sensor into temperature information indicating the temperature of the nonlinear optical medium 104. The temperature sensor may be a device that detects infrared rays radiated by the nonlinear optical medium 104.

A control device 58M7 of the seventh modification is similar to the control device 58 of FIG. 15. However, the control device 58M7 of the seventh modification monitors the temperature of the nonlinear optical medium 104 based on the measurement result by the temperature measurement device 100 while executing a control program (for example, the program of FIGS. 19 to 20).

When it is detected that the temperature of the nonlinear optical medium 104 is not within an allowable range as a result of monitoring, the control device 58M7 of the seventh modification displays a warning, for example, on the display device 86 (see FIG. 18). The monitoring of the temperature of the nonlinear optical medium 104 may be performed by the temperature measurement device 100. A control unit 26M7 (see FIG. 12) of the seventh modification is implemented by the control device 58M7 (see FIG. 29) and the temperature measurement device 100.

Except for the above points, the wavelength conversion device 102M7 of the seventh modification is substantially the same as the wavelength conversion device 102 of the second embodiment described with reference to FIGS. 12 to 20. The same applies to a wavelength conversion method.

According to the seventh modification, since the temperature of the nonlinear optical medium 104 can be monitored, the temperature control unit 106 (see FIG. 12) can be suppressed from being out of control.

In the above example, the temperature control unit 106 includes the heating and cooling unit 22. However, the temperature control unit 106 does not have to include the heating and cooling unit 22. In this case, a part or all of the heating and cooling unit 22 is provided outside the wavelength conversion device 102. For example, portions (which are the light source 96M5, 96M6, and the like) other than the coating film 90M5 covering the nonlinear optical medium 104, of the heating and cooling unit 22M5 or 22M6 of the fifth or sixth modification is provided outside the wavelength conversion device 102. The temperature control unit 106 can control at least one of heating or cooling of the nonlinear optical medium 104 on the basis of the intensity of the third light 112c by using these devices provided outside.

The second embodiment is an example of the first modification of the first embodiment. The number of the signal lights of the first modification of the first embodiment is two, but the number of the signal lights of the second embodiment is three or more. Thus, according to the wavelength conversion device and the wavelength conversion method of the second embodiment, it is possible to suppress the fluctuation of the wavelength conversion efficiency due to the change in the environmental temperature while generating a large number of wavelength-converted lights from the highly multiplexed signal light.

Third Embodiment

Figure 30:
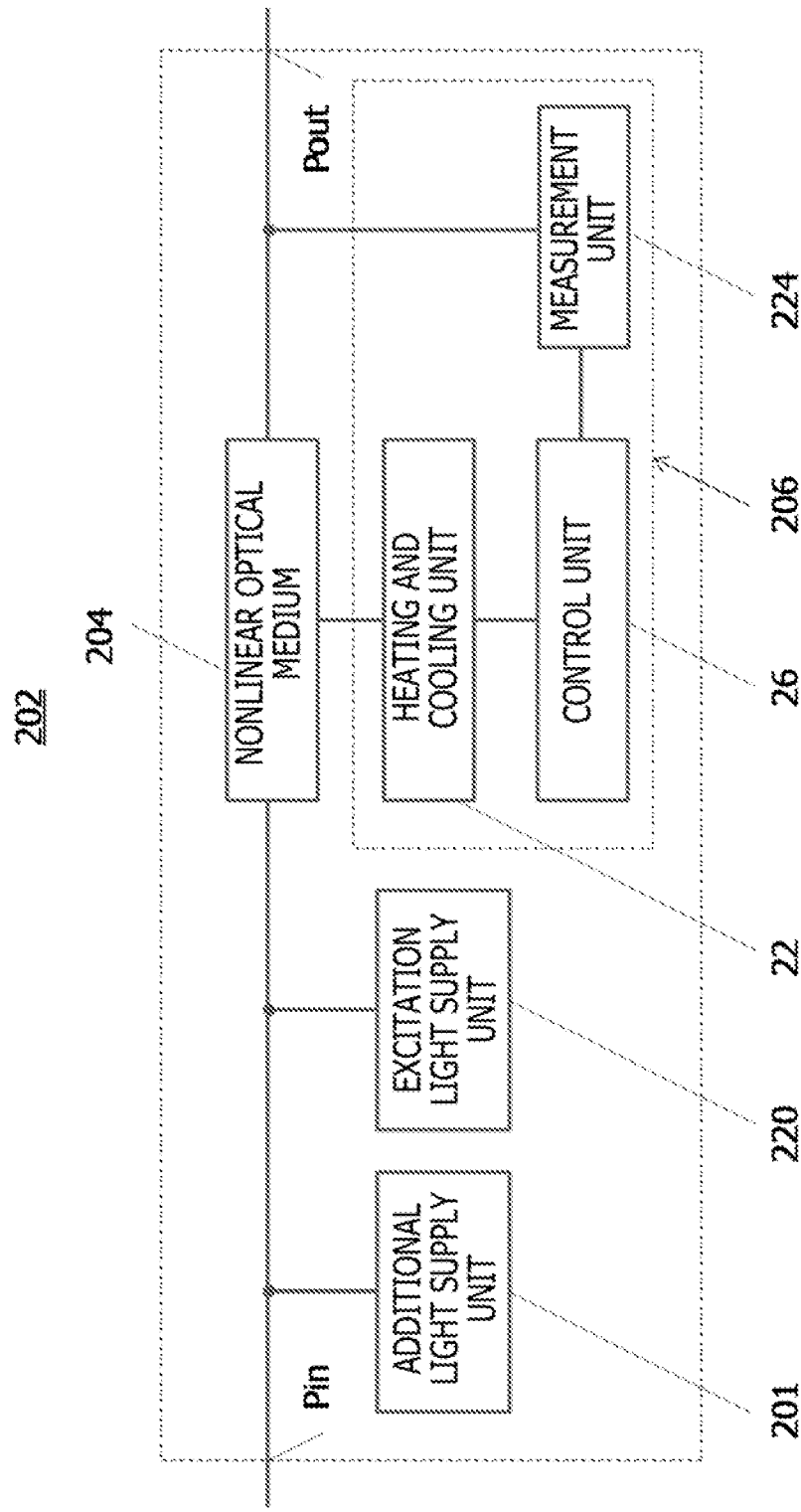
FIG. 30 is a functional block diagram illustrating an example of a wavelength conversion device 202 of a third embodiment.

FIG. 30 is a functional block diagram illustrating an example of a wavelength conversion device 202 of the third embodiment. The wavelength conversion device 202 of the third embodiment includes an additional light supply unit 201 that supplies additional light. Other configurations and steps (hereinafter referred to as configurations and the like) are similar to the configurations and the like of the first to second embodiments (for example, the third modification of the first embodiment). Thus, the description of the same configurations and the like as those in the first to second embodiments will be omitted or simplified. The third embodiment is an example of the third modification of the first embodiment.

(1) Structure

The wavelength conversion device 202 (see FIG. 30) of the third embodiment includes a nonlinear optical medium 204, a temperature control unit 206, and an excitation light supply unit 220, similarly to the wavelength conversion device 102 (see FIG. 12) of the second embodiment. The wavelength conversion device 202 of the third embodiment further includes the additional light supply unit 201 that supplies the additional light (see the third modification of the first embodiment).

The excitation light supply unit 220 supplies the excitation light 10 similarly to the excitation light supply unit 20 (see FIG. 13) of the second embodiment. The nonlinear optical medium 204 is, for example, the nonlinear optical medium 4 (for example, a single-mode optical fiber) described in the first embodiment.

The additional light supply unit 201 may be omitted. In that case, the additional light is supplied from the outside of the wavelength conversion device 202.

The temperature control unit 206 includes the heating and cooling unit 22, a measurement unit 224, and the control unit 26. The heating and cooling unit 22 and the control unit 26 have been described in the second embodiment.

(2) Operation

Operation of each functional block (for example, the additional light supply unit 201) illustrated in FIG. 30 will be described.

(2-1) Operation of Additional Light Supply Unit

Figure 31:
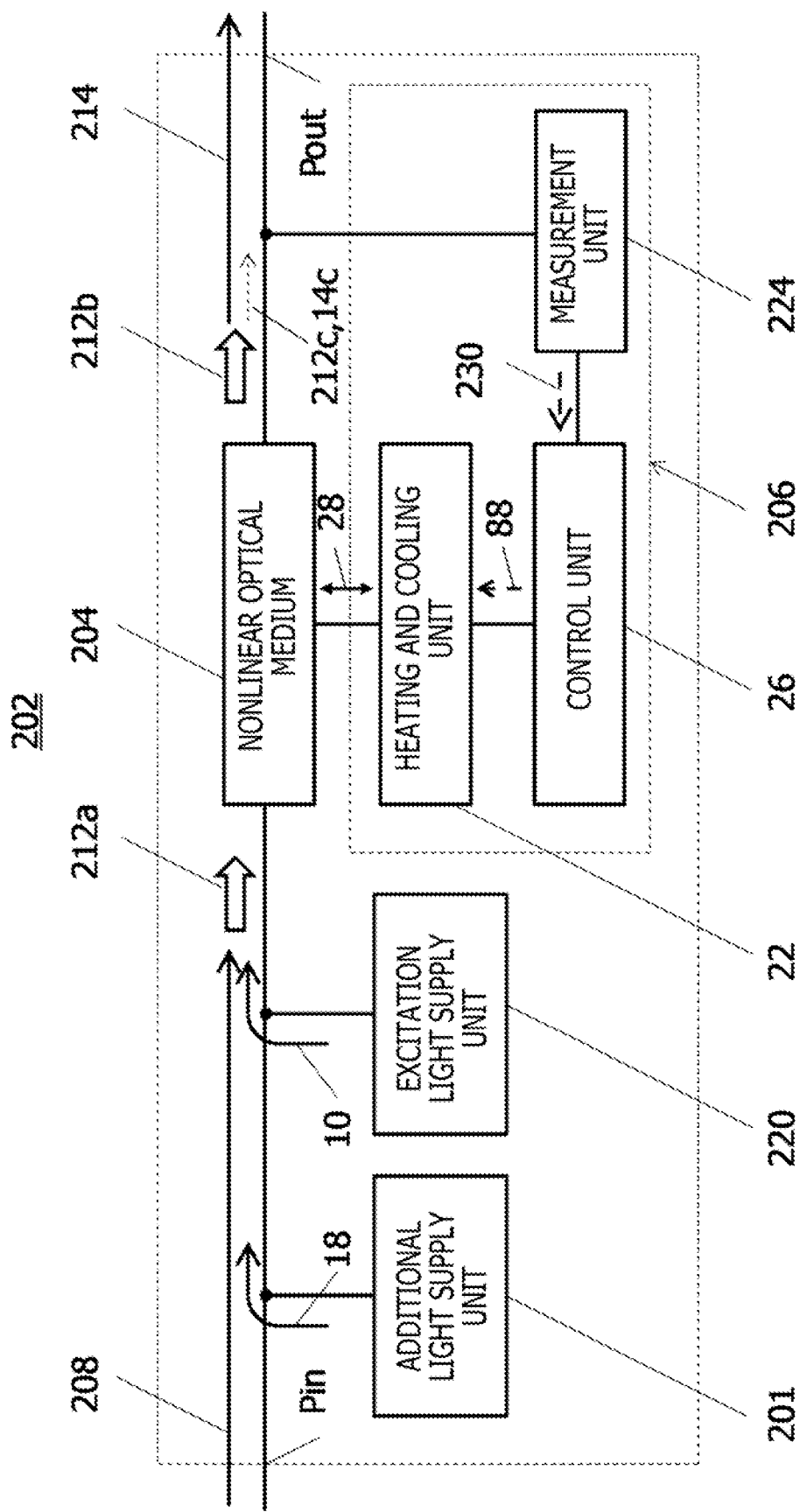
FIG. 31 is a diagram illustrating an example of a flow of signal light 208 and the like in the wavelength conversion device 202 of the third embodiment.

FIG. 31 is a diagram illustrating an example of a flow of signal light 208 and the like in the wavelength conversion device 202 of the third embodiment. The additional light supply unit 201 generates the additional light 18, and multiplexes the generated additional light 18 with the signal light 208.

(2-2) Operation of Excitation Light Supply Unit

The excitation light supply unit 220 generates the excitation light 10, and multiplexes the excitation light 10 with the signal light 208 and the additional light 18. Input light (which is first light 212a) of the nonlinear optical medium 204 is light including the signal light 208, the additional light 18, and the excitation light 10.

In the example illustrated in FIG. 30, the additional light supply unit 201 is arranged between the input port Pin and the excitation light supply unit 220. However, the additional light supply unit 201 may be arranged between the excitation light supply unit 220 and the nonlinear optical medium 204. In that case, the additional light supply unit 201 multiplexes the additional light 18 with the signal light 208 and the excitation light 10.

(2-3) Operation of Nonlinear Optical Medium

Figure 32:
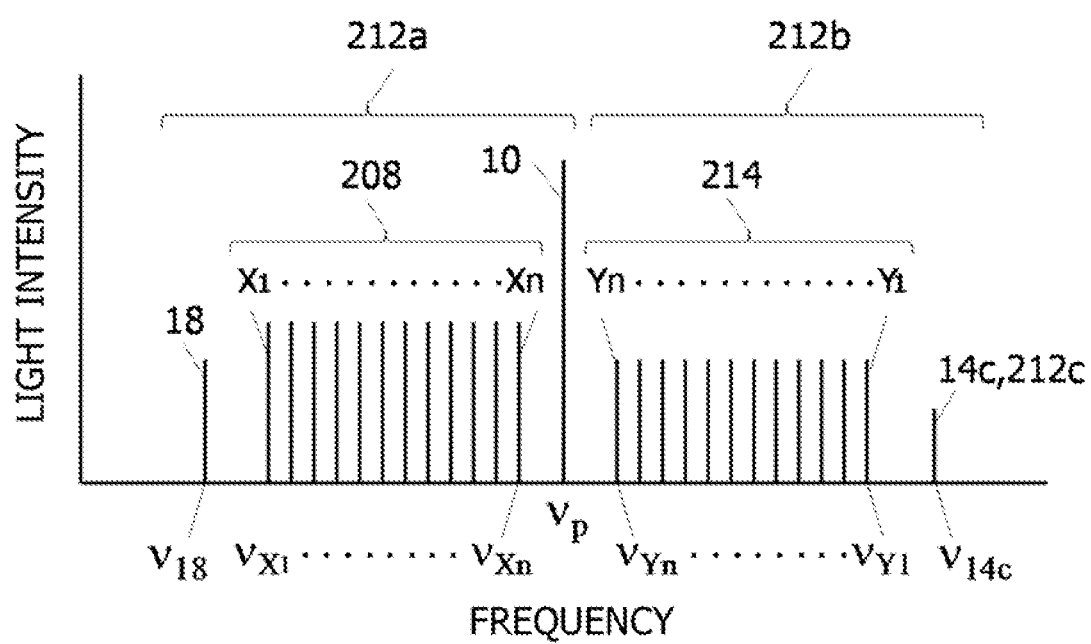

FIG. 32 is a diagram illustrating an example of spectra of the signal light 208 and the like. The horizontal axis is a frequency of light. The vertical axis is an intensity of the light (which is optical power). The signal light 208 of the third embodiment is, for example, the signal light 108 of the second embodiment described with reference to FIG. 14. In other words, the signal light 208 of the third embodiment is wavelength-multiplexed signal light. In this respect, the third embodiment is different from the third modification (see FIG. 9) of the first embodiment in which the number of the signal lights 8 is one.

The nonlinear optical medium 204 (see FIG. 31) generates new light (which is second light 212b) from the input light (which is the first light 212a) including the signal light 208 (see FIG. 32), the additional light 18, and the excitation light 10.

The frequency vie (see FIG. 32) of the additional light 18 is a frequency different from the frequency $v_{Xk}$ of each signal light Xk (k is an integer greater than or equal to 1 and less than or equal to n, n is an integer greater than or equal to 2) included in the multiplexed signal light 208 and the frequency $v_{10}$ of the excitation light 10. In other words, the wavelength of the additional light 18 is different from the wavelength of the excitation light 10 and the wavelength of the signal light 208 (which includes the signal lights X1 to Xn). The electric field strength of the excitation light 10 is stronger than an electric field strength of the signal light 208 (which includes the signal lights X1 to Xn) and an electric field strength of the additional light 18.

The nonlinear optical medium 204 generates wavelength-converted light 214 (see FIG. 32) from the signal light 208 and the excitation light 10 by, for example, degenerate four-wave mixing. The nonlinear optical medium 204 further generates the third wavelength-converted light 14c from the additional light 18 and the excitation light 10 by degenerate four-wave mixing. The second light 212b (see FIG. 32) of the third embodiment includes the wavelength-converted light 214 and the third wavelength-converted light 14c.

The wavelength-converted light 214 of the third embodiment is, for example, the wavelength-converted light 114 of the second embodiment described with reference to FIG. 14. The frequency $v_{Yk}$ of each wavelength-converted light Yk (k is an integer greater than or equal to 2 and less than or equal to n, n is an integer greater than or equal to 2) included in the wavelength-converted light 214 is a frequency different from any of the frequencies $v_{X1}$ to $v_{Xn}$ of the signal light 208, the frequency $v_{10}$ of the excitation light 10, and the frequency via of the additional light 18.

A frequency $v_{14c}$ of the third wavelength-converted light 14c is a frequency different from any of the frequencies $v_{X1}$ to $v_{Xn}$ of the signal light 208, the frequency $v_{10}$ of the excitation light 10, the frequency vie of the additional light 18, and the frequencies $v_{Y1}$ to $v_{Yn}$ of the wavelength-converted light 214.

The wavelength-converted light 214 may be generated by nondegenerate four-wave mixing. In this case, the third wavelength-converted light 14c is also generated by nondegenerate four-wave mixing.

(2-4) Operation of Temperature Control Unit

While acquiring information indicating the intensity of the third wavelength-converted light 14c (which is a "measurement result 230"), the temperature control unit 206 (see FIG. 31) controls the temperature (which is the first temperature) of the nonlinear optical medium 204 on the basis of the acquired information.

Specifically, the temperature control unit 206 controls the temperature (which is the first temperature) of the nonlinear optical medium 204 to cause the intensity of the third wavelength-converted light 14c (see FIG. 32) to be increased, on the basis of the measurement result 230 by the measurement unit 224. In other words, third light 212c (see FIG. 31) of the third embodiment is the third wavelength-converted light 14c.

(2-4-1) Operation of Heating and Cooling Unit

Except that a target of heat exchange is the nonlinear optical medium 204 of the third embodiment, operation of the heating and cooling unit 22 (see FIG. 31) is as described in "(2-3-1) Operation of heating and cooling unit" of the second embodiment. Thus, the description of the operation of the heating and cooling unit 22 will be omitted.

(2-4-2) Operation of Measurement Unit

The measurement unit 224 (see FIG. 31) measures the intensity of the third wavelength-converted light 14c (see FIG. 32) included in the new light (which is the second light 212b) generated by the nonlinear optical medium 204.

(2-4-3) Operation of Control Unit

Except that the heating and cooling unit 22 is controlled based on the "measurement result 230" of the third embodiment, operation of the control unit 26 (see FIG. 31) is as described in "(2-3-3) Operation of control unit" of the second embodiment. Thus, the description of the operation of the control unit 26 will be omitted.

(2-5) Output of Wavelength-Converted Light

The wavelength conversion device 202 outputs the wavelength-converted light 214 included in the second light 212b.

The third wavelength-converted light 14c generated from the excitation light 10 and the additional light 18 may be output from the wavelength conversion device 202 together with the wavelength-converted light 214.

Even if the third wavelength-converted light 14c is output from the wavelength conversion device 202, the wavelength of the third wavelength-converted light 14c is different from the wavelength of the wavelength-converted light 214, so that it is easy to separate the third wavelength-converted light 14c from the wavelength-converted light 214, outside the wavelength conversion device 202.

(3) Suppression of Fluctuation of Wavelength Conversion Efficiency

The temperature control unit 206 (see FIG. 31) controls the temperature of the nonlinear optical medium 204 to cause the intensity to be increased of the third wavelength-converted light 14c (which is the third light 212c) generated from the additional light 18. Thus, the wavelength conversion efficiency of the nonlinear optical medium 204 is maintained near the maximum value (which is the maximum value of the wavelength conversion efficiency) even if the environmental temperature changes. The maintenance of the wavelength conversion efficiency is achieved by keeping the temperature of the nonlinear optical medium 204 substantially constant by the temperature control of the temperature control unit 206. Since the temperature of the nonlinear optical medium 204 is kept substantially constant, a zero dispersion wavelength of the nonlinear optical medium 204 is maintained near the excitation light wavelength λp, and the decrease is suppressed in the wavelength conversion efficiency due to the change in the environmental temperature (see "(3) Suppression of fluctuation of wavelength conversion efficiency" in the first embodiment).

Moreover, in the third embodiment, the temperature of the nonlinear optical medium 204 is controlled on the basis of the intensity of the additional light 18 irrelevant to an intensity of the signal light 208, so that, according to the third embodiment, the fluctuation of the wavelength conversion efficiency due to the change in the intensity of the signal light 208 is also suppressed.

(4) Wavelength Conversion Method

A wavelength conversion method of the third embodiment is substantially the same as the wavelength conversion method described with reference to FIG. 7. However, in step s2 (see FIG. 7), the first light 212a including the signal light 208, the additional light 18, and the excitation light 10 is input to the nonlinear optical medium 204, and the second light 212b is generated including the wavelength-converted light 214 and the third wavelength-converted light 14c. The wavelength-converted light 214 is generated from the signal light 208 and the excitation light 10. The third wavelength-converted light 14c is generated from the additional light 18 and the excitation light 10.

Moreover, in step s4, while step s2 is executed, at least one of heating or cooling of the nonlinear optical medium 204 is performed on the basis of the intensity of the third wavelength-converted light 14c (which is the third light 212c).

In step s6, the wavelength-converted light 214 is output.

(5) Hardware Configuration

Figure 33:
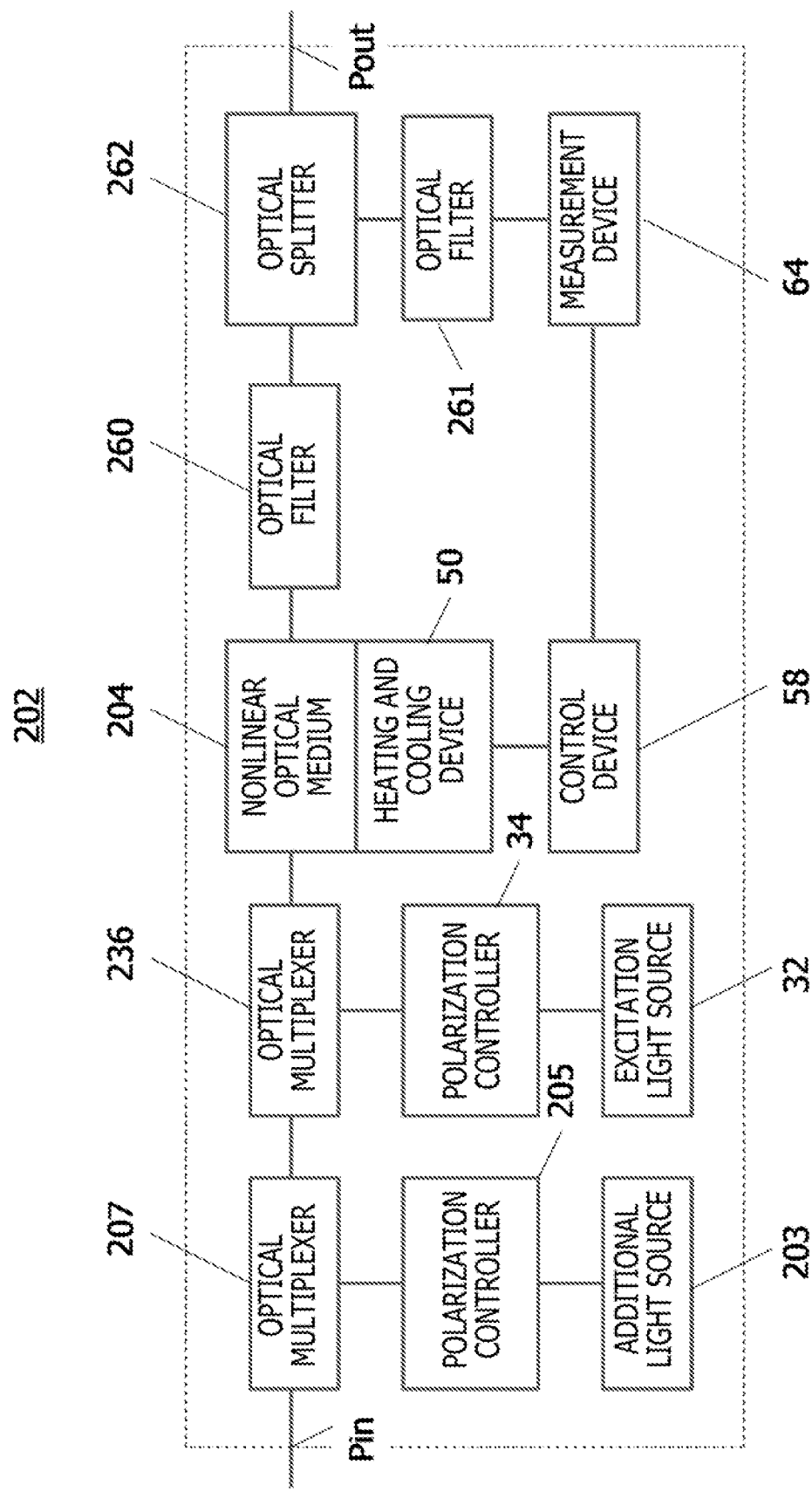
FIG. 33 is a diagram illustrating an example of a hardware configuration of the wavelength conversion device 202 of the third embodiment.

FIG. 33 is a diagram illustrating an example of a hardware configuration of the wavelength conversion device 202 (see FIG. 31) of the third embodiment. Each functional block (for example, the additional light supply unit 201) of the wavelength conversion device 202 is implemented by one or a plurality of hardware components illustrated in FIG. 33. Hereinafter, a hardware configuration of each functional block of the wavelength conversion device 202 will be described.

(5-1) Hardware Configuration of Additional Light Supply Unit

Figure 34:
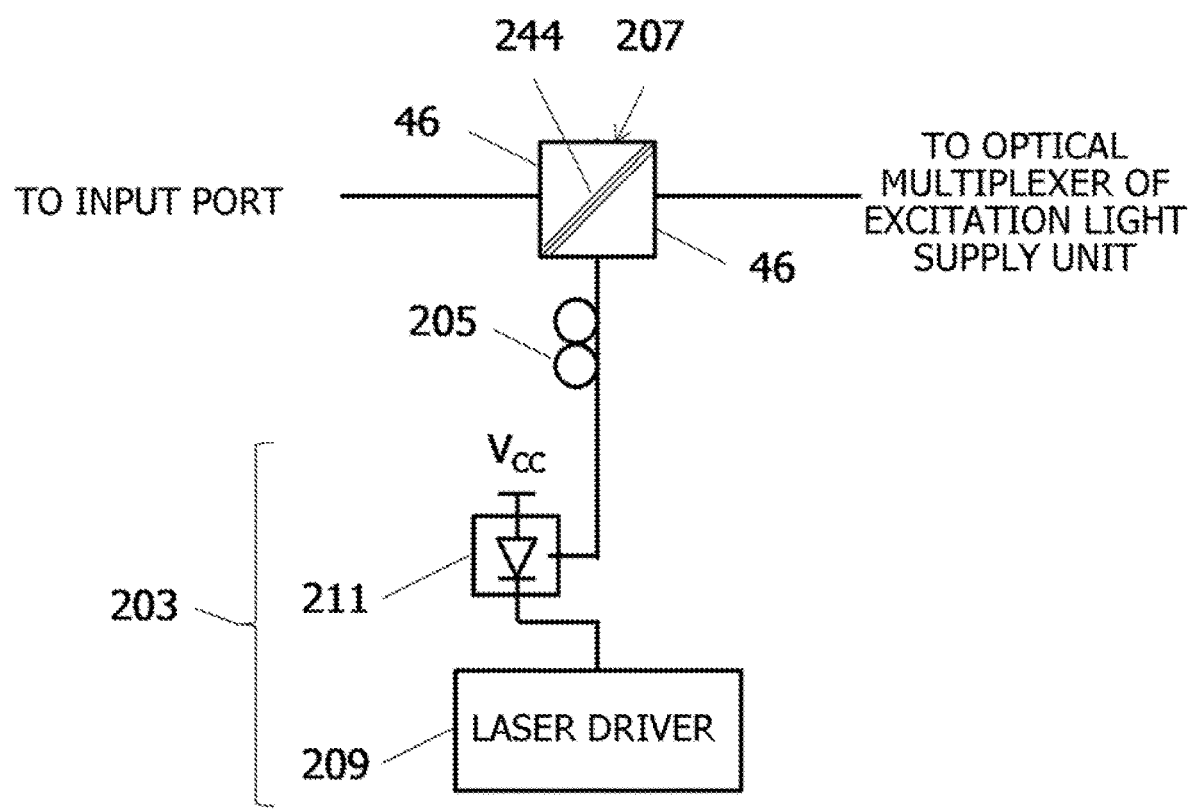
FIG. 34 is a diagram illustrating an example of each of an additional light source 203, a polarization controller 205, and an optical multiplexer 207.

The additional light supply unit 201 (see FIG. 31) includes, for example, an additional light source 203 (see FIG. 33), a polarization controller 205, and an optical multiplexer 207. FIG. 34 is a diagram illustrating an example of each of the additional light source 203, the polarization controller 205, and the optical multiplexer 207.

—Additional Light Source 203—

The additional light source 203 includes, for example, a laser driver 209 and a semiconductor laser 211. The additional light source 203 generates a seed of the additional light 18.

The laser driver 209 is a circuit that drives the semiconductor laser 211. When driven by the laser driver 209, the semiconductor laser 211 outputs laser light. The laser light output from the semiconductor laser 211 is, for example, continuous light. The semiconductor laser 211 is, for example, a distributed feedback semiconductor laser, a distributed reflector semiconductor laser, or an external cavity semiconductor laser.

—Polarization Controller 205—

The laser light output from the semiconductor laser 211 passes through the polarization controller 205 and then is incident on the optical multiplexer 207. The additional light 18 (see FIG. 31) is laser light output from the semiconductor laser 211 and whose polarization direction is further controlled by the polarization controller 205.

The polarization controller 205 controls the polarization direction of the laser light output from the semiconductor laser 211 so that the polarization direction of the additional light 18 after being multiplexed with the signal light 208 matches a polarization direction of the signal light 208. The polarization controller 205 is, for example, an optical device including a half-wave plate and a quarter-wave plate.

—Optical Multiplexer 207—

The optical multiplexer 207 multiplexes the signal light 208 input from the input port Pin of the wavelength conversion device 202 with the additional light 18. The optical multiplexer 36 is, for example, an optical device including a dielectric multilayer film 244 sandwiched between the pair of transparent prisms 46.

(5-2) Hardware Configuration of Excitation Light Supply Unit

The excitation light supply unit 220 (see FIG. 31) includes, for example, the excitation light source 32, the polarization controller 34, and an optical multiplexer 236, as illustrated in FIG. 33. The excitation light source 32 is the excitation light source 32 of the second embodiment described with reference to FIGS. 15 to 16. Similarly, the polarization controller 34 is the polarization controller 34 of the second embodiment described with reference to FIGS. 15 to 16.

The optical multiplexer 236 is similar to the optical multiplexer 36 of the second embodiment described with reference to FIGS. 15 to 16. However, the optical multiplexer 236 (see FIG. 33) is different from the optical multiplexer 36 of the second embodiment in that the dielectric multilayer film 44 (see FIG. 16) allows the additional light 18 to pass through in addition to the signal light 208.

(5-3) Hardware Configuration of Nonlinear Optical Medium

The nonlinear optical medium 204 (see FIG. 31) is, for example, a member physically the same as the nonlinear optical medium 104 of the second embodiment (for example, a single-mode optical fiber). "Physically the same" means that the structure and material are substantially the same.

However, the nonlinear optical medium 204 generates the third wavelength-converted light 14c from the additional light 18 and the excitation light 10 in addition to the wavelength-converted light 214 (see FIG. 32).

(5-4) Hardware Configurations of Heating and Cooling Unit and Control Unit

The heating and cooling unit 22 (see FIG. 31) includes, for example, the heating and cooling device 50 (see FIG. 33). The heating and cooling unit 22 controls the temperature of the nonlinear optical medium 204 in accordance with the command 88 from the control unit 26. The heating and cooling device 50 is, for example, the heating and cooling device 50 of the second embodiment described with reference to FIGS. 15 to 16.

The control unit 26 (see FIG. 31) includes, for example, the control device 58 (see FIG. 33). The control device 58 controls the heating and cooling unit 22 to cause the intensity of the third wavelength-converted light 14c (which is the third light 212c) to be increased while receiving the measurement result 230 of the measurement unit 224 (see FIG. 31).

The control device 58 is, for example, the control device 58 (which is the device including the memory 72 and the processor coupled to the memory 72) of the second embodiment described with reference to FIG. 18. The processor (which is the CPU 74) of the control device 58 controls a temperature of the heating and cooling unit 22 by executing, for example, the control program whose flowchart is illustrated in FIGS. 19 to 20.

The heating and cooling device 50 (see FIG. 33) may be the heating and cooling device of the fourth modification of the second embodiment (the same applies to a heating and cooling device of the fourth embodiment). In this case, the control device 58 is the control device (which is the control device that controls the power supply 94a for the heating wire 92) described in the fourth modification of the second embodiment.

The heating and cooling device 50 (see FIG. 33) may be the heating and cooling device of the fifth or sixth modification of the second embodiment (the same applies to the heating and cooling device of the fourth embodiment). The control device 58 in this case is the control device (which is the control device that controls the light source 96M5 or 96M6 for the infrared rays) of the fifth or sixth modification of the second embodiment.

(5-5) Hardware Configuration of Measurement Unit

The measurement unit 224 (see FIG. 31) includes, for example, an optical filter 260 (see FIG. 33) and the optical splitter 262. The measurement unit 224 further includes another optical filter 261 and the measurement device 64.

—Optical Filter 260—

The optical filter 260 (see FIG. 33) allows the new light (which is the second light 212b) generated by the nonlinear optical medium 204 to pass through, and blocks the excitation light 10, the signal light 208, and the additional light 18.

The optical filter 260 is, for example, an optical filter including a dielectric multilayer film, similarly to the optical filter 60 of FIG. 17.

—Optical Splitter 262—

The optical splitter 262 (see FIG. 33) sends, to the optical filter 261, a part (hereinafter referred to as split light) of each of the lights (which are the wavelength-converted light 214 and the third wavelength-converted light 14c) that pass through the optical filter 260. The optical splitter 262 further sends, to the output port Pout, a part (hereinafter referred to as output light) other than the split light of the lights that pass through the optical filter 260. The output light that reaches the output port Pout is output from the output port Pout to the outside of the wavelength conversion device 202.

The optical splitter 262 is, for example, the optical splitter (which is the optical fiber coupler or the directional coupler on the substrate) described with reference to FIG. 17.

—Optical Filter 261—

The optical filter 261 (see FIG. 33) allows the third wavelength-converted light 14c (which is a part of the third wavelength-converted light 14c) of the split light (which is the branch light) sent from the optical splitter 262 to pass through, and blocks the wavelength-converted light 214 (which is a part of the wavelength-converted light 214). The third wavelength-converted light 14c that passes through the optical filter 261 is sent to the measurement device 64.

The optical filter 261 is, for example, an optical filter including a dielectric multilayer film, similarly to the optical filter 60 of FIG. 17.

—Measurement Device 64—

The measurement device 64 (see FIG. 33) receives the third wavelength-converted light 14c from the optical filter 261 and transmits a digital signal (which is the "measurement result 230") indicating the intensity of the third wavelength-converted light 14c to the control unit 26 (see FIG. 31). The measurement device 64 is, for example, the device described with reference to FIG. 17.

(6) Modification

Figure 52:
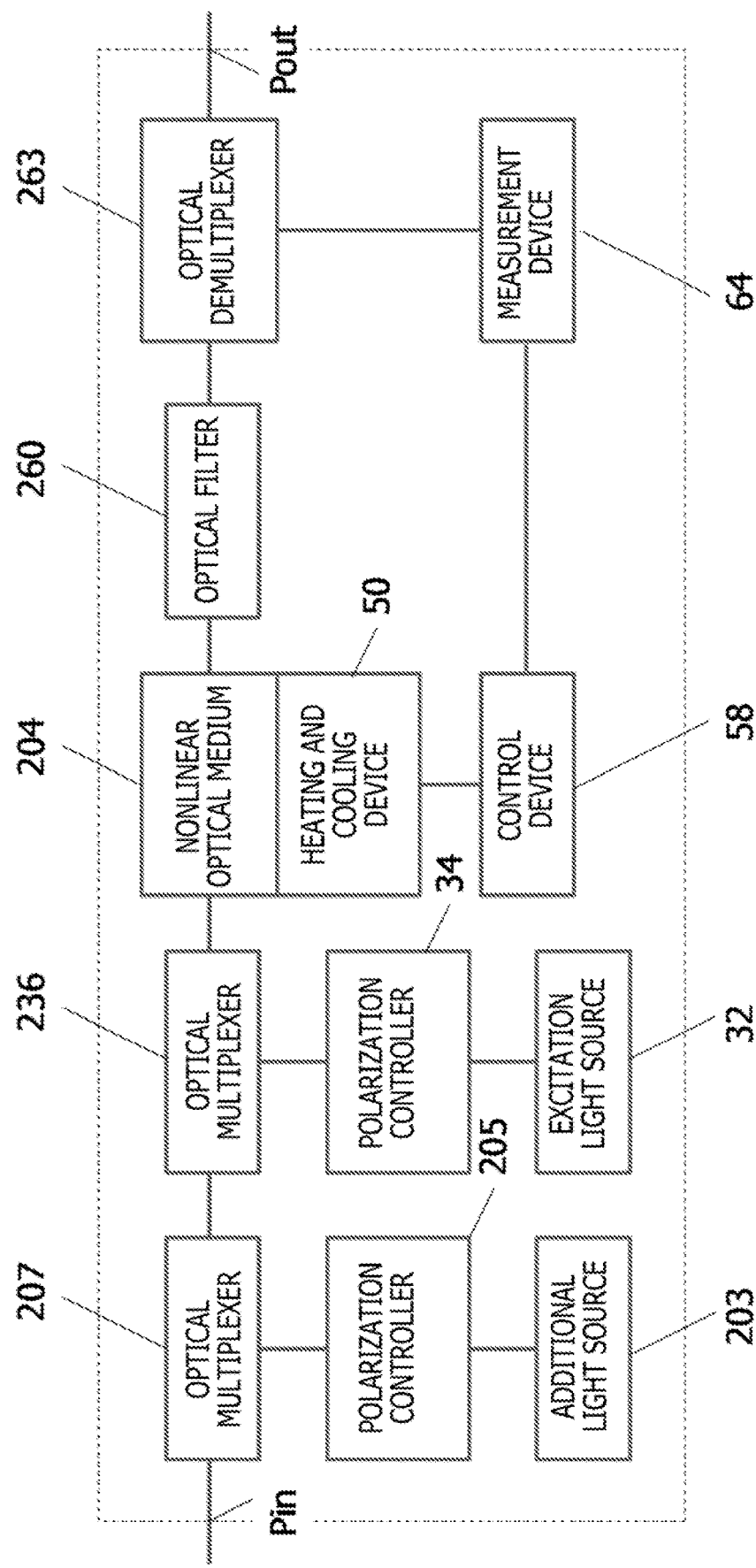
FIG. 52 is a diagram explaining a modification of the third embodiment.

FIG. 52 is a diagram explaining a modification of the third embodiment. As illustrated in FIG. 52, a wavelength conversion device 202M of the modification includes an optical demultiplexer 263 instead of the optical splitter 262 (see FIG. 33) and the optical filter 261.

The optical demultiplexer 263 sends, to the measurement device 64, the third wavelength-converted light 14c out of the lights (which are the wavelength-converted light 214 and the third wavelength-converted light 14c) that pass through the optical filter 260, and sends the wavelength-converted light 214 to the output port Pout.

In other words, from the plurality of lights (which is the second light 212b) having different wavelengths and passing through the optical filter 260, the optical demultiplexer 263 causes a part (here, the third wavelength-converted light 14c) of the plurality of lights to branch off. The optical demultiplexer 263 further sends the remaining portion (here, the wavelength-converted light 214) of the second light 212b to the output port Pout. The optical demultiplexer 263 is, for example, an optical device including a dielectric multilayer film and a pair of transparent prisms sandwiching the dielectric multilayer film. In the example illustrated in FIG. 52, the input light (which is the second light 212b) of the optical demultiplexer 263 is a plurality of lights having different wavelengths, generated by the nonlinear optical medium 204.

The temperature control unit 206 controls the temperature of the nonlinear optical medium 204 on the basis of the intensity of the branch light that branches off from the second light 212b.

In the above example, the additional light 18 is continuous light. However, the additional light 18 may be pulsed light. In this case, by synchronizing detection (for example, detection of a photocurrent output from the photodetector 66) of the third wavelength-converted light 14c with generation of the additional light 18, it is possible to improve a signal-to-noise ratio of the measurement result 230.

Moreover, the third embodiment is an example of the third modification of the first embodiment. However, although the number of the signal lights 8 in the third modification of the first embodiment is one, the number of the signal lights 208 of the third embodiment is two or more. Thus, according to the wavelength conversion device and the wavelength conversion method of the third embodiment, it is possible to suppress the fluctuation of the wavelength conversion efficiency due to the change in the environmental temperature while generating the wavelength-converted light from the wavelength-multiplexed signal whose intensity fluctuates.

In the third embodiment, the temperature of the nonlinear optical medium 204 is controlled based on the intensity of the additional light 18 irrelevant to the intensity of the signal light 208, so that, according to the third embodiment, the fluctuation of the wavelength conversion efficiency due to the change in the intensity of the signal light 208 is also suppressed.

Fourth Embodiment

FIG. 12 described in the second embodiment also illustrates an example of a functional block diagram of a wavelength conversion device 302 of the fourth embodiment. The wavelength conversion device 302 and a wavelength conversion method of the fourth embodiment are similar to the wavelength conversion device and the wavelength conversion method of the first to second embodiments (for example, the fourth modification of the first embodiment). Thus, the description of the same portions as those in the first to second embodiments will be omitted or simplified. The fourth embodiment is an example of the fourth modification of the first embodiment.

(1) Structure

The wavelength conversion device 302 (see FIG. 12) of the fourth embodiment includes a nonlinear optical medium 304, a temperature control unit 306, and the excitation light supply unit 20.

The structure of the excitation light supply unit 20 has been described in the second embodiment. The nonlinear optical medium 304 is the medium described in the first embodiment (for example, a single-mode optical fiber).

The temperature control unit 306 includes the heating and cooling unit 22, a measurement unit 324, and a control unit 326. The structure of the heating and cooling unit 22 has been described in the second embodiment (2) Operation Hereinafter, operation and the like of each functional block (for example, the excitation light supply unit 20) illustrated in FIG. 12 will be described.

(2-1) Operation of Excitation Light Supply Unit

FIG. 13 described in the second embodiment also illustrates an example of a flow of signal light 308 and the like in the wavelength conversion device 302 of the fourth embodiment.

The excitation light supply unit 20 generates the excitation light 10, and multiplexes the signal light 308 with the excitation light 10. Input light (which is first light 312a) of the nonlinear optical medium 304 is light including the signal light 308 and the excitation light 10.

(2-2) Operation of Nonlinear Optical Medium

Figure 35:
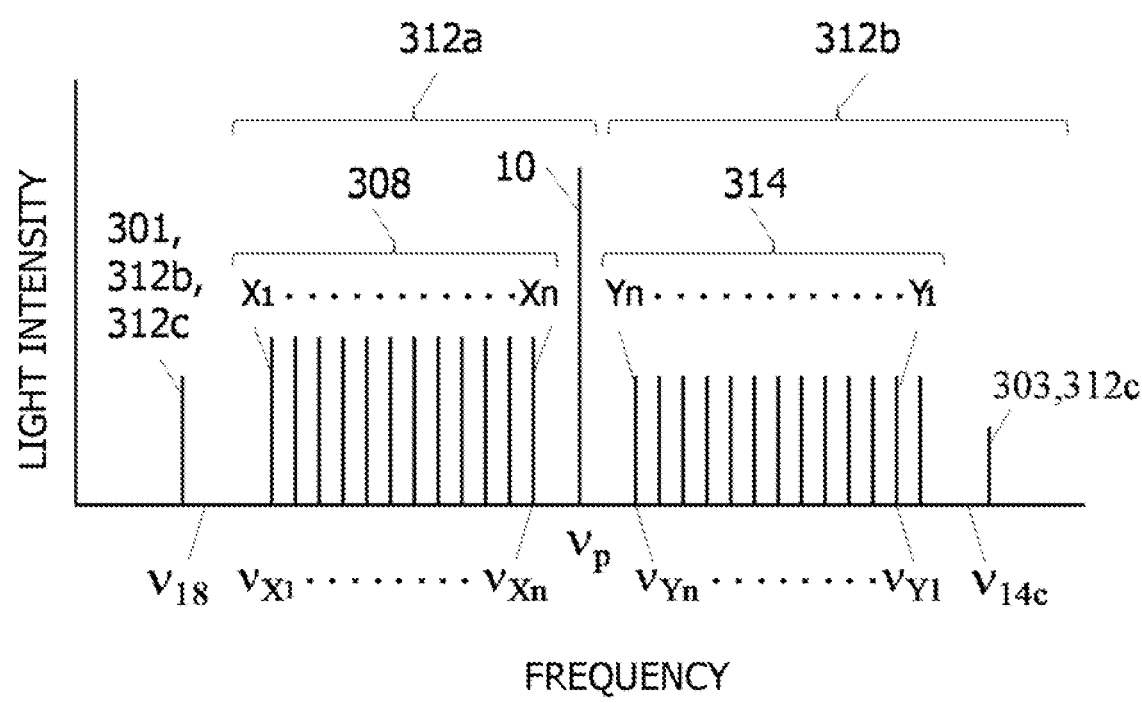

FIG. 35 is a diagram illustrating an example of spectra of the signal light 308 and the like. The horizontal axis is a frequency of light. The vertical axis is an intensity of the light (which is optical power). The signal light 308 of the fourth embodiment is, for example, the signal light 108 of the second embodiment described with reference to FIG. 14. In other words, the signal light 308 of the fourth embodiment is wavelength-multiplexed signal light. In this respect, the fourth embodiment is different from the fourth modification (see FIG. 10) of the first embodiment in which the number of the signal lights 8 is one.

The nonlinear optical medium 304 (see FIG. 13) generates new light (which is second light 312b) from the input light (which is the first light 312a) including the signal light 308 and the excitation light 10.

The nonlinear optical medium 304 generates wavelength-converted light 314 from the signal light 308 and the excitation light 10 by, for example, degenerate four-wave mixing. The wavelength-converted light 314 is, for example, the wavelength-converted light 114 of the second embodiment described with reference to FIG. 14. The wavelength-converted light 314 may be generated by nondegenerate four-wave mixing.

The nonlinear optical medium 304 further generates the Stokes light 301 (see FIG. 35) and the anti-Stokes light 303 by Raman scattering of the excitation light 10. The new light (which is the second light 312b) generated by the nonlinear optical medium 304 is light including the wavelength-converted light 314, the Stokes light 301, and the anti-Stokes light 303.

(2-3) Operation of Temperature Control Unit

While acquiring information (which is a "measurement result 330") indicating the intensities of the Stokes light 301 and the anti-Stokes light 303, the temperature control unit 306 (see FIG. 13) controls the temperature (which is the first temperature) of the nonlinear optical medium 304 on the basis of the acquired information.

Specifically, the temperature control unit 306 controls the temperature of the nonlinear optical medium 304 to cause the temperature of the nonlinear optical medium 304 to be dose to a target value on the basis of the intensity of the Raman scattered light (which includes the Stokes light 301 and the anti-Stokes light). Third light 312c of the fourth embodiment is the Raman scattered light.

As described in the fourth modification of the first embodiment, the target value described above is, for example, a temperature (second temperature) at which an absolute value of a difference between a zero dispersion wavelength of the nonlinear optical medium 304 and the wavelength of the excitation light 10 is less than or equal to a certain value (which is a tolerance).

As described above, the nonlinear optical medium 304 may generate the wavelength-converted light 314 by non-degenerate four-wave mixing. The target value in this case has been described in the fifth modification of the first embodiment.

(2-3-1) Operation of Heating and Cooling Unit

Except that a target of heat exchange (supply and absorption of the heat 28) is not the nonlinear optical medium 104 of the second embodiment but the nonlinear optical medium 304 of the fourth embodiment, the operation of the heating and cooling unit 22 is as described in the second embodiment. Thus, the description of the operation of the heating and cooling unit 22 will be omitted.

(2-3-2) Operation of Measurement Unit

The measurement unit 324 (see FIG. 13) measures the intensity of the Raman scattered light (which includes the Stokes light 301 and the anti-Stokes light 303) included in the new light (which is the second light 312b) generated by the nonlinear optical medium 304.

In the fourth embodiment, the excitation light 10 is also used as Raman scattering probe light. When the wavelength of the probe light is 1400 nm to 1700 nm, a wavelength difference between the probe light and the Stokes light 301 is about 100 nm. Similarly, a wavelength difference between the probe light and the anti-Stokes light 303 is about 100 nm.

The bandwidth of each of the S band, C band, and L band is about 40 nm. Thus, by arranging the probe light (which is the excitation light 10) at the boundary between the C band and the S band, the Raman scattered light can be generated outside the C band and the S band. Similarly, by arranging the probe light (which is the excitation light 10) at the boundary between the C band and the L band, the Raman scattered light can be generated outside the C band and the L band. Thus, it is possible to generate the Raman scattered light of the excitation light 10 outside the optical communication band while generating the wavelength-converted light of the signal light in the optical communication band (S band, C band, L band, and the like).

(2-3-3) Operation of Control Unit

The control unit 326 (see FIG. 13) controls the heating and cooling unit 22 to cause the temperature (which is the first temperature) of the nonlinear optical medium 304 to be dose to the target value (which is the target value of the first temperature) on the basis of the measurement result 330 of the measurement unit 324.

For example, the control unit 326 derives an amount (hereinafter referred to as a temperature equivalent) corresponding to the temperature of the nonlinear optical medium 304 on the basis of the measurement result 330 of the measurement unit 324, and controls the heating and cooling unit 22 to cause the derived temperature equivalent to be dose to its target value (which is a target value of the temperature equivalent).

An intensity ratio (which is Ias/Is) of the Raman scattered light changes depending on the temperature of the nonlinear optical medium 304. Here, Ias is the intensity of the anti-Stokes light 303. Is is the intensity of the Stokes light 301. The temperature equivalent described above is, for example, the intensity ratio (which is Ias/Is) of the Raman scattered light.

The control unit 326 may derive the temperature of the nonlinear optical medium 304 on the basis of the measurement result 330 of the measurement unit 324, and control the heating and cooling unit 22 on the basis of the derived temperature.

(2-4) Output of Wavelength-Converted Light

The wavelength conversion device 302 (see FIG. 13) outputs the wavelength-converted light 314 included in the second light 312b.

(3) Suppression of Fluctuation of Wavelength Conversion Efficiency

The temperature control unit 306 controls the temperature of the nonlinear optical medium 304 to cause the temperature of the nonlinear optical medium 304 to be dose to the target value based on the intensity of the Raman scattered light of the excitation light 10. As a result, the temperature of the nonlinear optical medium 304 is kept near the target value even if the environmental temperature changes. Thus, according to the fourth embodiment, the fluctuation of the wavelength conversion efficiency due to the change in the environmental temperature is suppressed.

Moreover, in the fourth embodiment, the temperature of the nonlinear optical medium 304 is controlled on the basis of the intensity of the Raman scattered light irrelevant to an intensity of the signal light 308, so that, according to the fourth embodiment, the fluctuation of the wavelength conversion efficiency due to a change in the intensity of the signal light 308 is also suppressed.

(4) Wavelength Conversion Method

A wavelength conversion method of the fourth embodiment is substantially the same as the wavelength conversion method described with reference to FIG. 7. However, in step s2 (see FIG. 7), the first light 312a including the signal light 308 and the excitation light 10 is input to the nonlinear optical medium 304, and the second light 312b (which is "new light") is generated including the wavelength-converted light 314 and the Raman scattered light.

Moreover, in step s4, while step s2 is executed, at least one of heating or cooling of the nonlinear optical medium 304 is executed based on the intensity of the Raman scattered light.

In step s6, the wavelength-converted light 314 is output.

(5) Hardware Configuration

Figure 36:
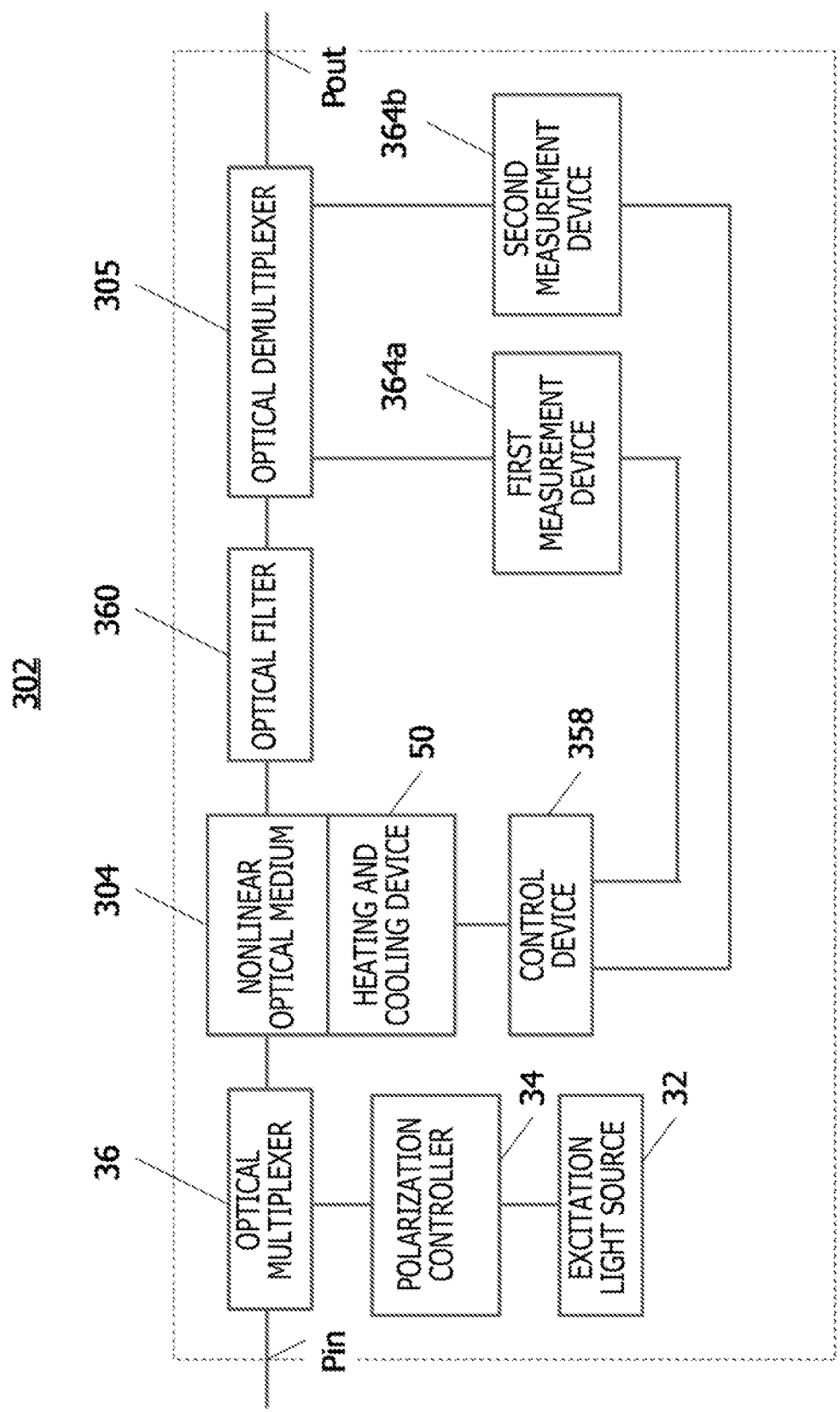
FIG. 36 is a diagram illustrating an example of a hardware configuration of a wavelength conversion device 302 of a fourth embodiment.

FIG. 36 is a diagram illustrating an example of a hardware configuration of the wavelength conversion device 302 (see FIG. 12) of the fourth embodiment. Each functional block of the wavelength conversion device 302 (for example, the measurement unit 324) is implemented by one or a plurality of hardware components illustrated in FIG. 36. Hereinafter, the hardware configuration of each functional block of the wavelength conversion device 302 will be described.

(5-1) Hardware Configuration of Excitation Light Supply Unit

The hardware configuration of the excitation light supply unit 20 (see FIG. 12) has been described in the second embodiment.

(5-2) Hardware Configuration of Nonlinear Optical Medium

The nonlinear optical medium 304 (see FIG. 12) is, for example, a member (for example, a single-mode optical fiber) physically the same as the nonlinear optical medium 104 of the second embodiment.

(5-3) Hardware Configuration of Heating and Cooling Unit

The heating and cooling unit 22 (see FIG. 12) includes, for example, the heating and cooling device 50 (see FIG. 36). The heating and cooling device 50 controls the temperature of the nonlinear optical medium 304 in accordance with the command 88 from the control unit 326. The heating and cooling device 50 is, for example, the heating and cooling device of the second embodiment described with reference to FIG. 16.

(5-4) Hardware Configuration of Measurement Unit

The measurement unit 324 includes, for example, an optical filter 360 (see FIG. 36) and an optical demultiplexer 305. The measurement unit 324 further includes a first measurement device 364a and a second measurement device 364b.

Figure 37:
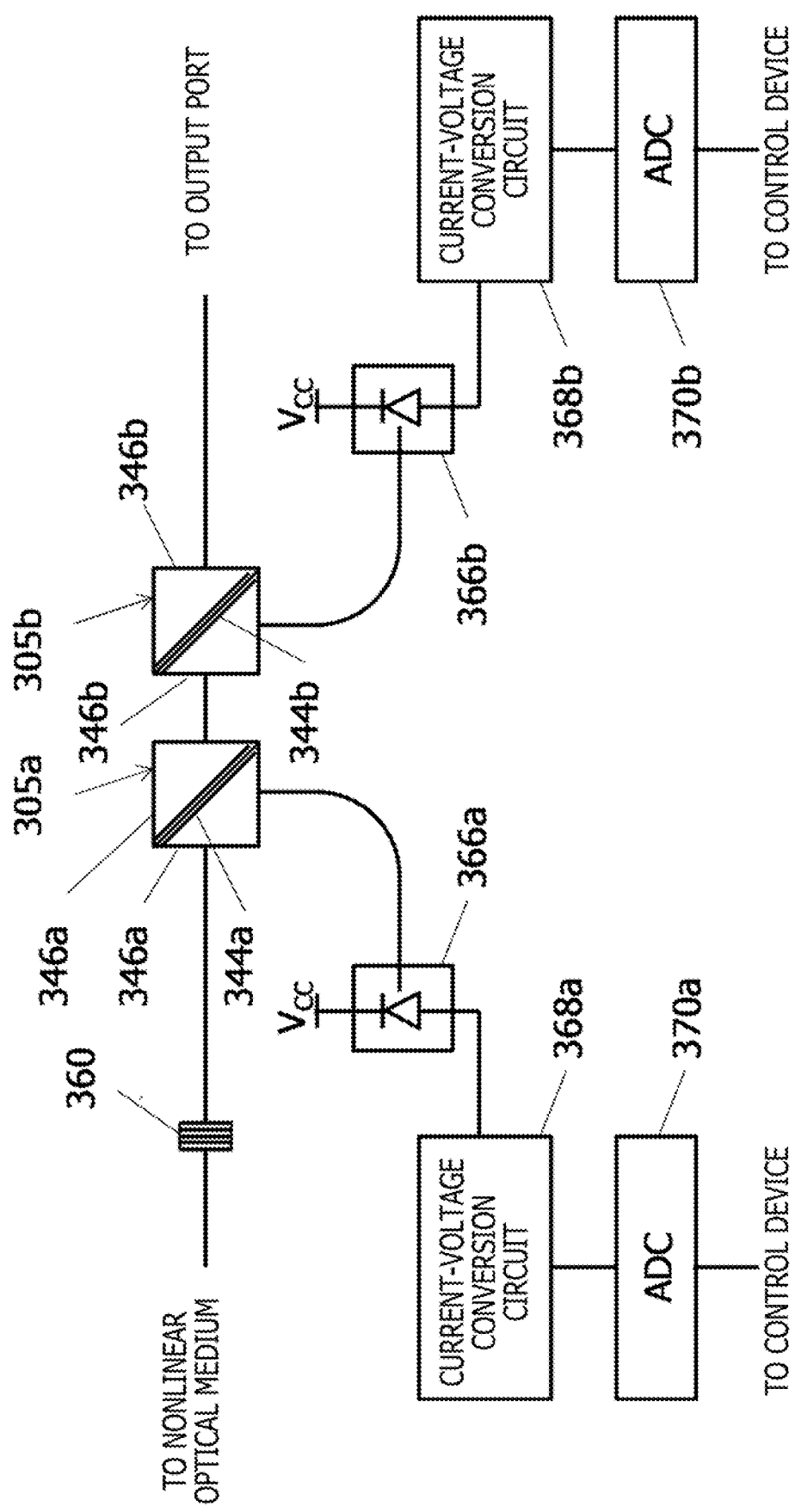
FIG. 37 is a diagram illustrating an example of a hardware configuration of a measurement unit 324.

FIG. 37 is a diagram illustrating an example of a hardware configuration of the measurement unit 324 (see FIG. 12).

—Optical Filter 360—

The optical filter 360 allows the new light (which includes the wavelength-converted light 314 and the Raman scattered light) generated by the nonlinear optical medium 304 to pass through, and blocks the excitation light 10 and the signal light 308. The optical filter 360 is, for example, the optical filter 60 (the optical filter including the dielectric multilayer film) described with reference to FIG. 17.

—Optical Demultiplexer 305—

The optical demultiplexer 305 (see FIG. 36) extracts the Stokes light 301 from the light that passes through the optical filter 360 and sends the Stokes light 301 to the first measurement device 364a. The optical demultiplexer 305 further extracts the anti-Stokes light 303 from the light that passes through the optical filter 360 and sends the anti-Stokes light 303 to the second measurement device 364b.

The optical demultiplexer 305 further extracts the wavelength-converted light 314 from the light that passes through the optical filter 360 and sends the wavelength-converted light 314 to the output port Pout. The wavelength-converted light 314 that reaches the output port Pout is output from the output port Pout to the outside of the wavelength conversion device 302.

The optical demultiplexer 305 includes, for example, a first optical demultiplexer 305a (see FIG. 37) and a second optical demultiplexer 305b. The first optical demultiplexer 305a extracts, for example, the Stokes light 301 (see FIG. 35) from the light that passes through the optical filter 360 and sends the Stokes light 301 to the first measurement device 364a (see FIG. 36). The second optical demultiplexer 305b (see FIG. 37) extracts the anti-Stokes light 303 (see FIG. 35) from the light that passes through the first optical demultiplexer 305a and sends the anti-Stokes light 303 to the second measurement device 364b (see FIG. 36).

The first optical demultiplexer 305a includes, for example, a dielectric multilayer film 344a and a pair of transparent prisms 346a sandwiching the dielectric multilayer film 344a. The dielectric multilayer film 344a reflects the Stokes light 301 toward the first measurement device 364a side while allowing the wavelength-converted light 314 and the anti-Stokes light 303 to pass through.

The second optical demultiplexer 305b (see FIG. 37) includes, for example, a dielectric multilayer film 344b and a pair of transparent prisms 346b sandwiching the dielectric multilayer film 344b. The dielectric multilayer film 344b reflects the anti-Stokes light 303 toward the second measurement device 364b side while allowing the wavelength-converted light 314 to pass through.

—First Measurement Device 364a—

The first measurement device 364a (see FIG. 36) receives the Stokes light 301 from the optical demultiplexer 305 and transmits first information indicating the intensity of the Stokes light 301 to the control unit 326 (see FIG. 13). The first information is included in the measurement result 330 (see FIG. 13) by the measurement unit 324.

The first measurement device 364a (see FIG. 36) includes, for example, the first photodetector 366a (see FIG. 37), a first current-voltage conversion circuit 368a, and a first analog-to-digital converter 370a. The first photodetector 366a receives the Stokes light 301 from the first optical demultiplexer 305a, and converts the received Stokes light 301 into a photocurrent. The first current-voltage conversion circuit 368a converts the photocurrent into a voltage. The first analog-to-digital converter 370a converts the voltage into a first digital signal and transmits the first digital signal to the control unit 326 (see FIG. 13). The first digital signal is an example of the first information described above.

—Second Measurement Device 364b—

The second measurement device 364b (see FIG. 36) receives the anti-Stokes light 303 from the optical demultiplexer 305, and transmits second information indicating the intensity of the anti-Stokes light 303 to the control unit 326 (see FIG. 13). The second information is information included in the measurement result 330 (see FIG. 13) by the measurement unit 324.

The second measurement device 364b (see FIG. 36) includes, for example, the second photodetector 366b (see FIG. 37), a second current-voltage conversion circuit 368b, and a second analog-to-digital converter 370b. The second photodetector 366b receives the anti-Stokes light 303 from the second optical demultiplexer 305b, and converts the received anti-Stokes light 303 into a photocurrent. The second current-voltage conversion circuit 368b converts the photocurrent into a voltage. The second analog-to-digital converter 370b converts the voltage into a second digital signal and transmits the second digital signal to the control unit 326 (see FIG. 13). The second digital signal is an example of the second information described above.

(5-5) Hardware Configuration of Control Unit

The control unit 326 (see FIG. 13) includes, for example, a control device 358 (see FIG. 36). For example, the control device 358 controls the heating and cooling unit 22 to cause the temperature of the nonlinear optical medium 304 to be dose to the target value while receiving the measurement result 330 by the measurement unit 324 (see FIG. 13).

The control device 358 (see FIG. 36) is physically the same device as the control device 58 of the second embodiment described with reference to FIG. 18, for example. The control device 358 (which is the control unit 326) is implemented by, for example, the CPU 74, the memory 72, the non-volatile memory 76, and the plurality of input and output interfaces 80a to 80e.

The non-volatile memory 76 records a control program for controlling the heating and cooling device 50 on the basis of the measurement result 330 including the first information from the first measurement device 364a and the second information from the second measurement device 364b. The non-volatile memory 76 further records the termination program (see the second embodiment) and a look-up table described later.

The CPU 74 is connected to the first analog-to-digital converter 370a of the first measurement device 364a, for example, via the input and output interface 80d. The CPU 74 is further connected to the second analog-to-digital converter 370b of the second measurement device 364b via the other input and output interface 80e.

While acquiring information (which is the "measurement result 330") indicating an intensity of the third light 312c (which is the Raman scattered light) included in the second light 312b generated by the nonlinear optical medium 304, the CPU 74 controls the heating and cooling unit 22 on the basis of the acquired information. When acquiring the information, the CPU 74 acquires the measurement result 330 from the first measurement device 364a and the second measurement device 364b via the input and output interfaces 80d and 80e, for example.

—Control Program—

Figure 38:
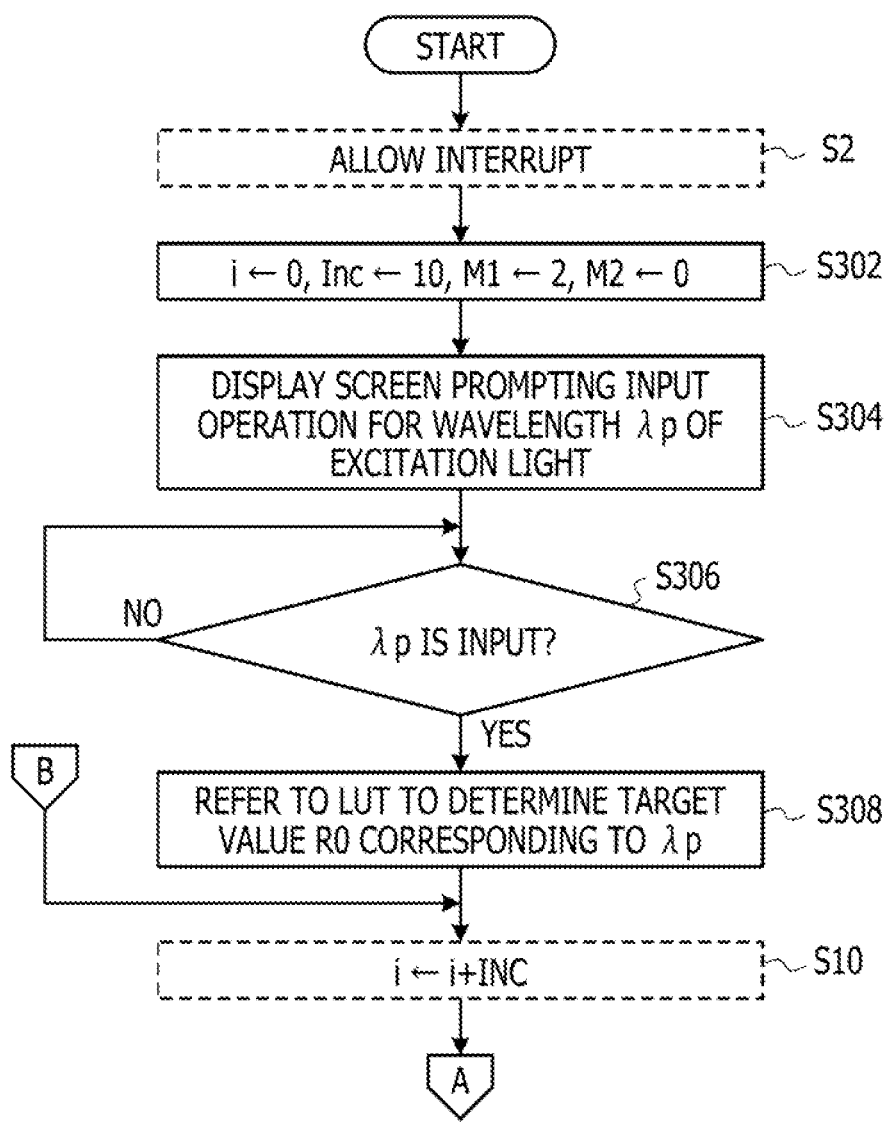
FIG. 38 is a diagram illustrating an example of a flowchart of a control program of the fourth embodiment.
Figure 39:
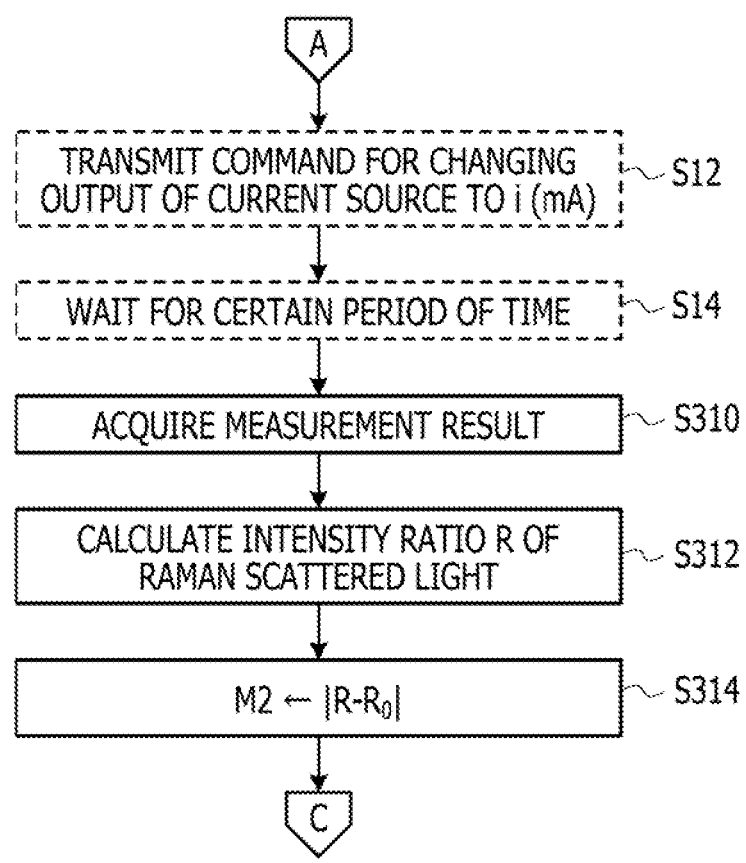
FIG. 39 is a diagram illustrating the example of the flowchart of the control program of the fourth embodiment.
Figure 40:
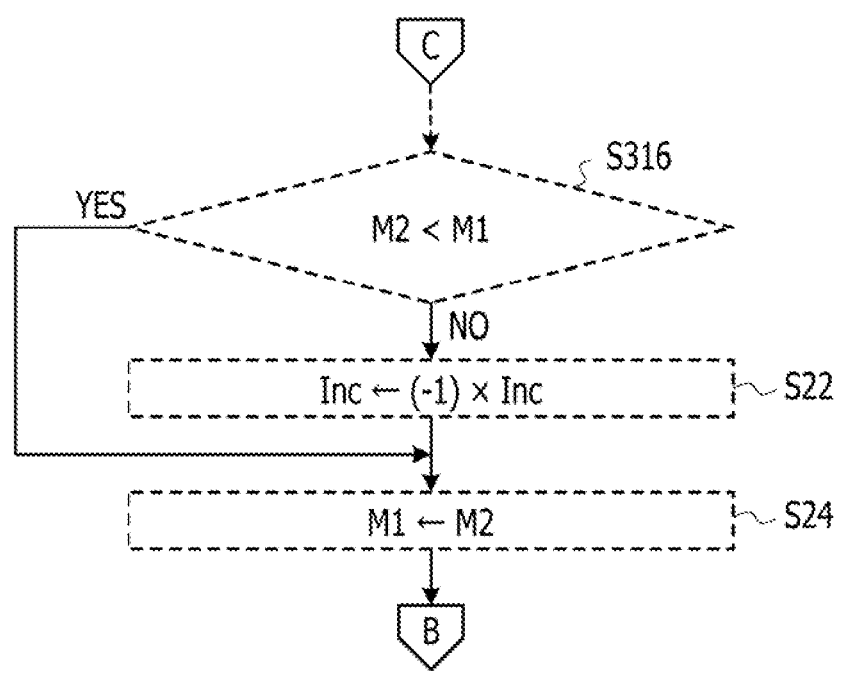
FIG. 40 is a diagram illustrating the example of the flowchart of the control program of the fourth embodiment.

FIGS. 38 to 40 are diagrams illustrating an example of a flowchart of the control program of the fourth embodiment. Each step of FIGS. 38 to 40 is executed by the control unit 326 (see FIG. 12). FIG. 41 is a diagram illustrating an example of a look-up table 307 recorded in the non-volatile memory 76.

The CPU 74 (see FIG. 18) reads and executes the control program from the non-volatile memory 76 in response to start instruction operation performed with the input device 84. Among steps of FIGS. 38 to 40, the description of steps (which are steps surrounded by the broken line frames) included in the control program of the second embodiment will be omitted or simplified.

—Step S302—

After step S2, the CPU 74 assigns initial values to multiple variables i, Inc, M1, and M2. The initial value of the variable i is, for example, zero. The initial value of the variable Inc is, for example, 10. The variable i is the output current of the current source 54 (see FIG. 16). The variable Inc is an increment of the variable i. The unit of the variable i and the variable Inc is, for example, mA.

The initial value of the variable M1 is, for example, a value greater than or equal to the maximum value of the intensity ratio (Ias/Is) recorded in the second column of the look-up table 307. In the example illustrated in FIG. 38, the initial value of M1 is 2. The initial value of the variable M2 is, for example, zero.

—Step S304—

After step S302, the CPU 74 displays a screen prompting input operation of the wavelength λp of the excitation light 10 on the display device 86. The input operation for the wavelength λp is performed with, for example, the input device 84.

—Step S306—

After step S304, the CPU 74 determines whether or not the wavelength λp is input. If the wavelength λp is not input, the CPU 74 re-executes step S306. If the wavelength λp is input, the CPU 74 proceeds to step S308.

—Step S308—

After step S306, the CPU 74 refers to the look-up table 307 to determine a target value $R_0$ corresponding to the wavelength λp of the excitation light 10. The target value $R_0$ is the target value of the temperature equivalent (here, the intensity ratio of the Raman scattered light) of the nonlinear optical medium 304.

The first column of the look-up table 307 indicates the temperature of the nonlinear optical medium 304. The second column of the look-up table 307 indicates the intensity ratio (which is Ias/Is) of the Raman scattered light. The third column of the look-up table 307 indicates the zero dispersion wavelength of the nonlinear optical medium 304. For example, when the temperature of the nonlinear optical medium 304 is 30° C., the intensity ratio of the Raman scattered light generated by the nonlinear optical medium 304 is 1.00. When the temperature of the nonlinear optical medium 304 is 30° C., the zero dispersion wavelength of the nonlinear optical medium 304 is 1567.8 nm. For example, the look-up table 307 records information actually measured in advance.

When the wavelength λp (which is the wavelength of the excitation light 10) input and confirmed in step S306 is 1567.8 nm, the CPU 74 determines the target value $R_0$ as 1.00 on the basis of the fourth row of the look-up table 307. The value 1.00 of the target value $R_0$ corresponds to the temperature 30° C. of the nonlinear optical medium 304.

—Step S310—

After step S14, the CPU 74 acquires the measurement result 330 by the measurement unit 324 (see FIG. 13). Specifically, the CPU 74 acquires the first information indicating the intensity of the Stokes light 301 and the second information indicating the intensity of the anti-Stokes light 303.

—Step S312—

After step S310, the CPU 74 calculates an intensity ratio R (which is Ias/Is) of the Raman scattered light on the basis of the measurement result 330 acquired in step S310.

—Step S314—

After step S312, the CPU 74 assigns, to the variable M2, an absolute value (hereinafter referred to as intensity deviation) of a difference between the intensity ratio R calculated in step S312 and the target value $R_0$ determined in step S308.

—Step S316—

After step S314, the CPU 74 determines whether or not the variable M2 is less than the variable M1. If the variable M2 is less than the variable M1, the CPU 74 proceeds to step S24. If the variable M2 is greater than or equal to the variable M1, the CPU 74 proceeds to step S22.

With steps S10 to S24, the output current i (for example, a drive current of the Peltier element 52) of the current source 54 (see FIG. 16) is repeatedly changed so that the intensity deviation is reduced between the intensity ratio R of the Raman scattered light and the target value $R_0$.

The intensity ratio R of the Raman scattered light is an amount corresponding to the temperature of the nonlinear optical medium 304. Thus, the CPU 74 executes the control program illustrated in FIGS. 38 to 40, whereby the temperature of the nonlinear optical medium 304 is maintained near the target value (for example, 30° C.).

The target value (for example, 30° C.) is a temperature at which the zero dispersion wavelength (for example, 1567.8 nm) of the nonlinear optical medium 304 matches the wavelength $\lambda_{10}$. Thus, the zero dispersion wavelength of the nonlinear optical medium 304 is kept near the wavelength $\lambda_{10}$ of the excitation light 10. As a result, the fluctuation of the wavelength conversion efficiency of the nonlinear optical medium 304 is suppressed.

In the above example, the heating and cooling device 50 (see FIG. 36) is the device described with reference to FIG. 16. However, the heating and cooling device 50 may be the heating and cooling device of the fourth to sixth modifications of the second embodiment. In this case, for example, the CPU 74 executes a program in which steps S28 to S32 of FIG. 24 are added to the control program of FIGS. 38 to 40.

(6) Modifications (6-1) First Modification

In the above example, the wavelength conversion device 302 controls the temperature of the nonlinear optical medium 304 based on the intensity of the Raman scattered light scattered forward. However, the wavelength conversion device 302 may control the temperature of the nonlinear optical medium 304 based on the intensity of the Raman scattered light scattered backward. In this case, the optical demultiplexer 305 (see FIG. 36) is arranged, for example, between the optical multiplexer 36 and the nonlinear optical medium 304.

Thus, according to the first modification, it is possible to avoid a loss of the wavelength-converted light 314 due to the optical demultiplexer 305.

(6-2) Second Modification

In the above example, the wavelength conversion device 302 controls the temperature of the nonlinear optical medium 304 based on the Raman scattered light generated from the excitation light 10. However, the wavelength conversion device 302 may control the temperature of the nonlinear optical medium 304 on the basis of the intensity of the Raman scattered light generated from pulsed light having a wavelength different from that of the excitation light 10. According to this control, the Raman scattered light is also pulsed light, so that it is possible to improve a signal-to-noise ratio of a measured value (which is the "measurement result 330") of the intensity of the Raman scattered light (see "(5-5) Hardware configuration of measurement unit" of the third embodiment). Moreover, by using the pulsed light, it is possible to measure a temperature distribution by an Optical Time Domain Reflectometer (OTDR), so that it is also possible to control a temperature distribution of the nonlinear optical medium 304.

(7) Polarization Diversity Configuration

In the second to third embodiments and the present embodiment (see FIG. 36), the polarization direction of the excitation light 10 is matched to the polarization direction of the signal lights 108, 208, or 308, and then fixed. For this reason, when the polarization direction of the signal light 108, 208, or 308 changes, the wavelength conversion efficiency of the signal light 108, 208, or 308 decreases. The decrease in the wavelength conversion efficiency due to the change in the polarization direction of the signal light can be suppressed by using a polarization diversity configuration.

Hereinafter, the polarization diversity configuration using the wavelength conversion device 102 of the second embodiment will be described. Based on this description, a wavelength conversion device having the polarization diversity configuration using the wavelength conversion device 202 or 302 of the third embodiment or the present embodiment (see FIG. 36) can also be easily implemented.

(7-1) First Polarization Diversity Configuration

Figure 42:
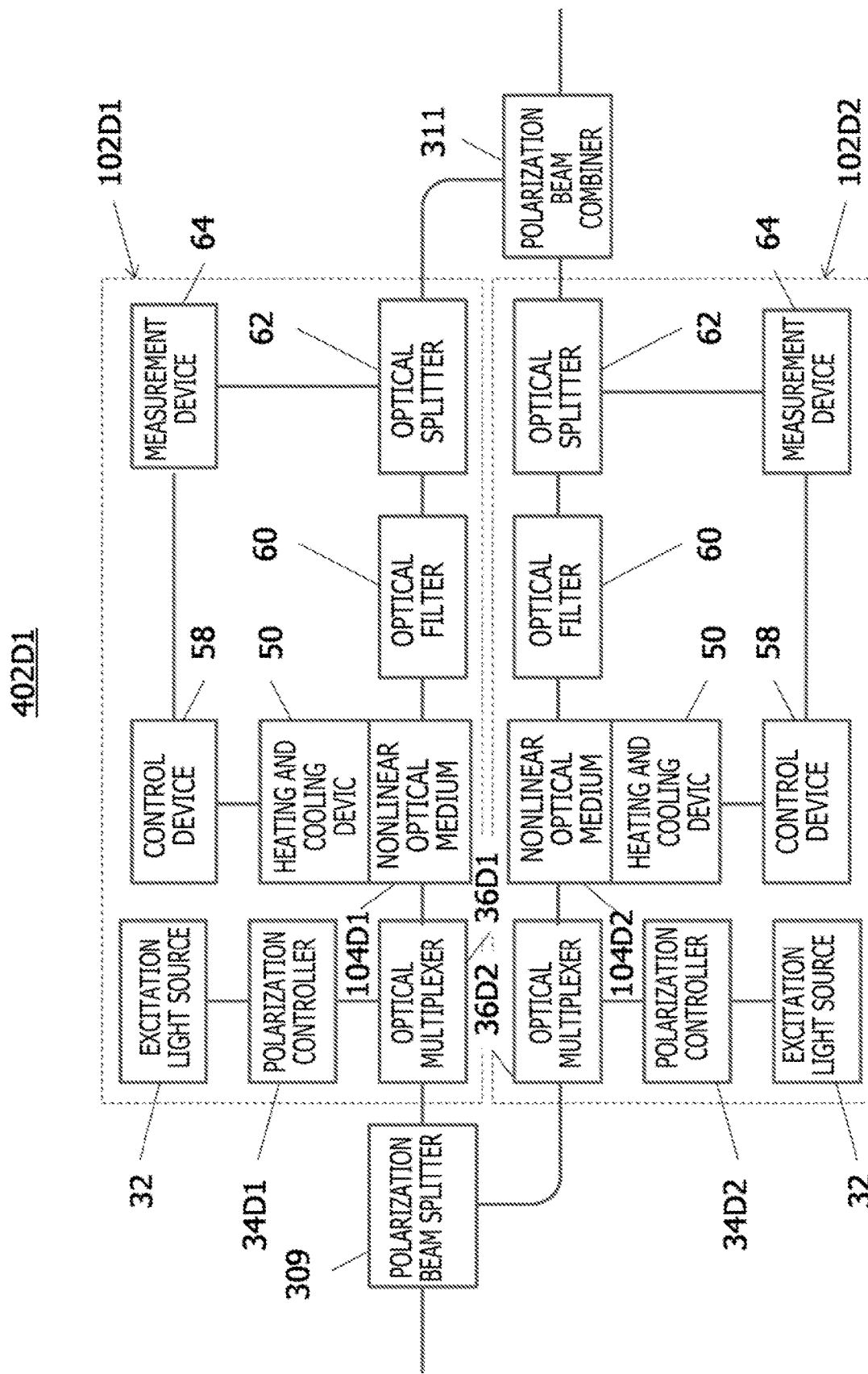
FIG. 42 is a diagram illustrating an example of a wavelength conversion device 402D1 in which a first polarization diversity configuration is used.

FIG. 42 is a diagram illustrating an example of a wavelength conversion device 402D1 in which a first polarization diversity configuration is used. As illustrated in FIG. 42, the wavelength conversion device 402D1 includes a first wavelength conversion device 102D1 and a second wavelength conversion device 102D2. The first wavelength conversion device 102D1 and the second wavelength conversion device 102D2 are the wavelength conversion device 102 of the second embodiment (see FIG. 15). Thus, the description of the device (for example, the control device) included in each of the first wavelength conversion device 102D1 and the second wavelength conversion device 102D2 will be omitted or simplified. The wavelength conversion device 402D1 further includes a polarization beam splitter 309 and a polarization beam combiner 311.

Figure 43:
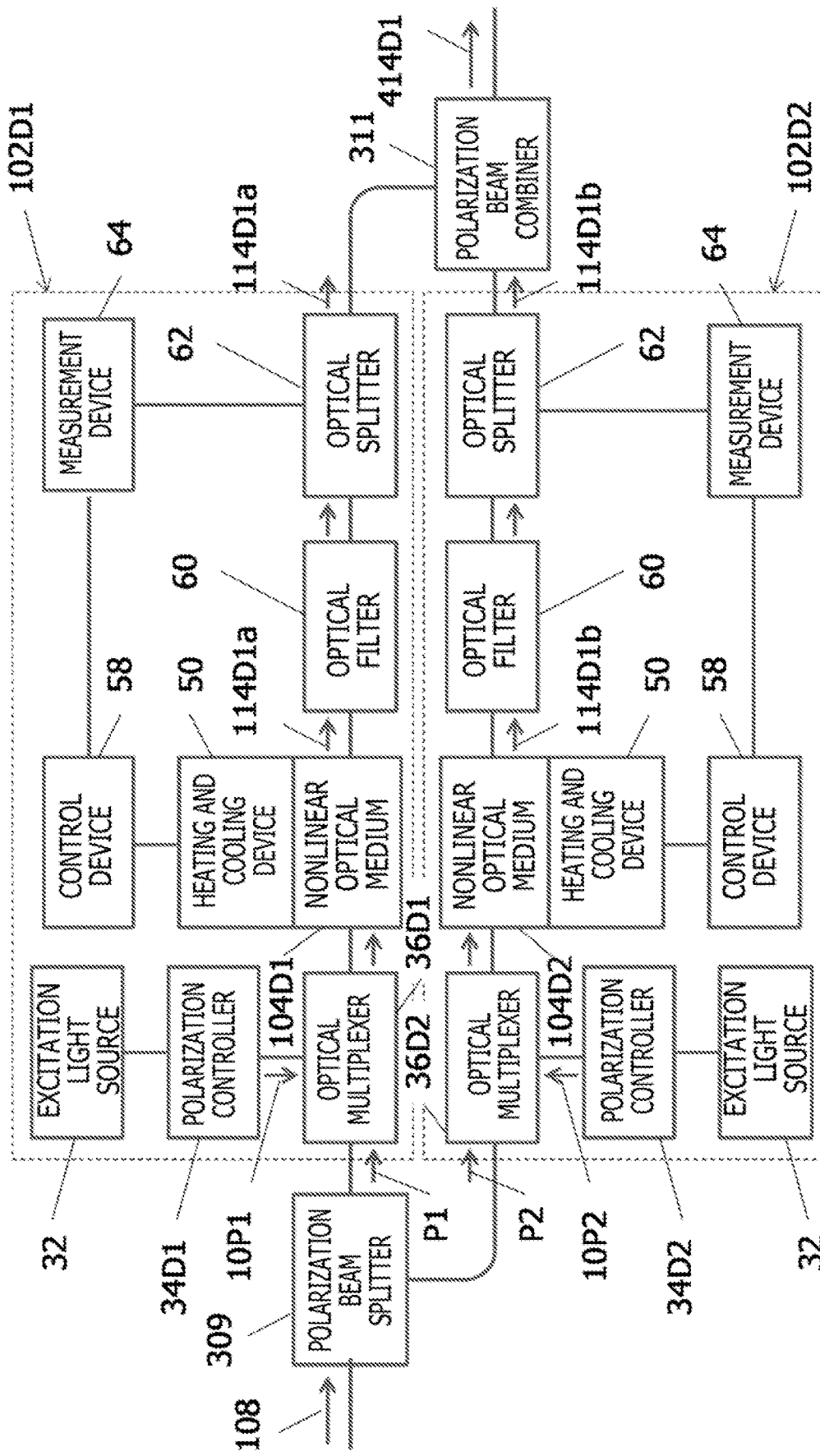
FIG. 43 is a diagram illustrating an example of a flow of the signal light 108 and the like in the wavelength conversion device 402D1.

FIG. 43 is a diagram illustrating an example of a flow of the signal light 108 and the like in the wavelength conversion device 402D1. The polarization beam splitter 309 splits the signal light 108 into first polarized light P1 (hereinafter also referred to as an H polarized wave) and second polarized light P2 (hereinafter also referred to as a V polarized wave). A polarization direction of the first polarized light P1 is a first polarization direction. A polarization direction of the second polarized light P2 is a second polarization direction orthogonal to the first polarization direction.

An optical multiplexer 36D1 of the first wavelength conversion device 102D1 multiplexes the first polarized light P1 with third excitation light 10P1. The third excitation light 10P1 is substantially the same light as the excitation light 10 described with reference to FIG. 13 except that a polarization direction of the third excitation light 10P1 is controlled to match the first polarization direction by a polarization controller 34D1. The optical multiplexer 36D1 is physically the same device as the optical multiplexer 36 described with reference to FIG. 15. Similarly, the polarization controller 34D1 is physically the same device as the polarization controller 34 described with reference to FIG. 15.

A nonlinear optical medium 104D1 of the first wavelength conversion device 102D1 generates wavelength-converted light 114D1a from the first polarized light P1 and the third excitation light 10P1 having the same polarization directions.

An optical multiplexer 36D2 of the second wavelength conversion device 102D2 multiplexes the second polarized light P2 with fourth excitation light 10P2. The fourth excitation light 10P2 is substantially the same light as the excitation light 10 described with reference to FIG. 13 except that a polarization direction of the fourth excitation light 10P2 is controlled to match the second polarization direction by a polarization controller 34D2. The optical multiplexer 36D2 is physically the same device as the optical multiplexer 36 described with reference to FIG. 15. Similarly, the polarization controller 34D2 is physically the same device as the polarization controller 34 described with reference to FIG. 15.

A nonlinear optical medium 104D2 of the second wavelength conversion device 102D2 generates wavelength-converted light 114D1b from the second polarized light P2 and the fourth excitation light 10P2 having the same polarization directions.

The polarization beam combiner 311 multiplexes the wavelength-converted light 114D1a generated by the first wavelength conversion device 102D1 with the wavelength-converted light 114D1b generated by the second wavelength conversion device 102D2 to generate wavelength-converted light 414D1.

The polarization direction of the first polarized light P1 (which is the first polarization direction) matches the polarization direction of the third excitation light 10P1 (which is the first polarization direction). Thus, even if the polarization direction of the signal light 108 changes, a wavelength conversion efficiency $E1_{D1}$ of the first polarized light P1 does not change. For the same reason, even if the polarization direction of the signal light 108 changes, a wavelength conversion efficiency $E2_{D1}$ of the second polarized light P2 does not change. Thus, if the first wavelength conversion efficiency $E1_{D1}$ of the first polarized light P1 substantially matches the second wavelength conversion efficiency $E2_{D1}$ of the second polarized light P2, a wavelength conversion efficiency of the wavelength conversion device 402D1 is not affected by a change in the polarization direction of the signal light 108.

It is easy to substantially match the first wavelength conversion efficiency $E1_{D1}$ to the second wavelength conversion efficiency $E2_{D1}$. For example, first, a material and a structure of the nonlinear optical medium 104D1 of the first wavelength conversion device 102D1 are matched to a material and a structure of the nonlinear optical medium 104D2 of the second wavelength conversion device 102D2. Moreover, by matching the intensity of the third excitation light 10P1 to the intensity of the fourth excitation light 10P2, it is possible to match the first wavelength conversion efficiency $E1_{D1}$ to the second wavelength conversion efficiency $E2_{D1}$. Thus, according to the wavelength conversion device 402D1 of FIG. 43, it is possible to suppress the fluctuation of the wavelength conversion efficiency due to the change in the polarization direction of the signal light 108.

In the example illustrated in FIG. 42, the first wavelength conversion device 102D1 and the second wavelength conversion device 102D2 are the wavelength conversion device 102 of the first embodiment. However, the first wavelength conversion device 102D1 and the second wavelength conversion device 102D2 may be the wavelength conversion devices of the third embodiment and the present embodiment (see FIG. 36). Moreover, the first wavelength conversion device 102D1 and the second wavelength conversion device 102D2 may be the wavelength conversion device of each modification of the second to third embodiments or the wavelength conversion device of each modification of the present embodiment (see FIG. 36).

(7-2) Second Polarization Diversity Configuration

Figure 44:
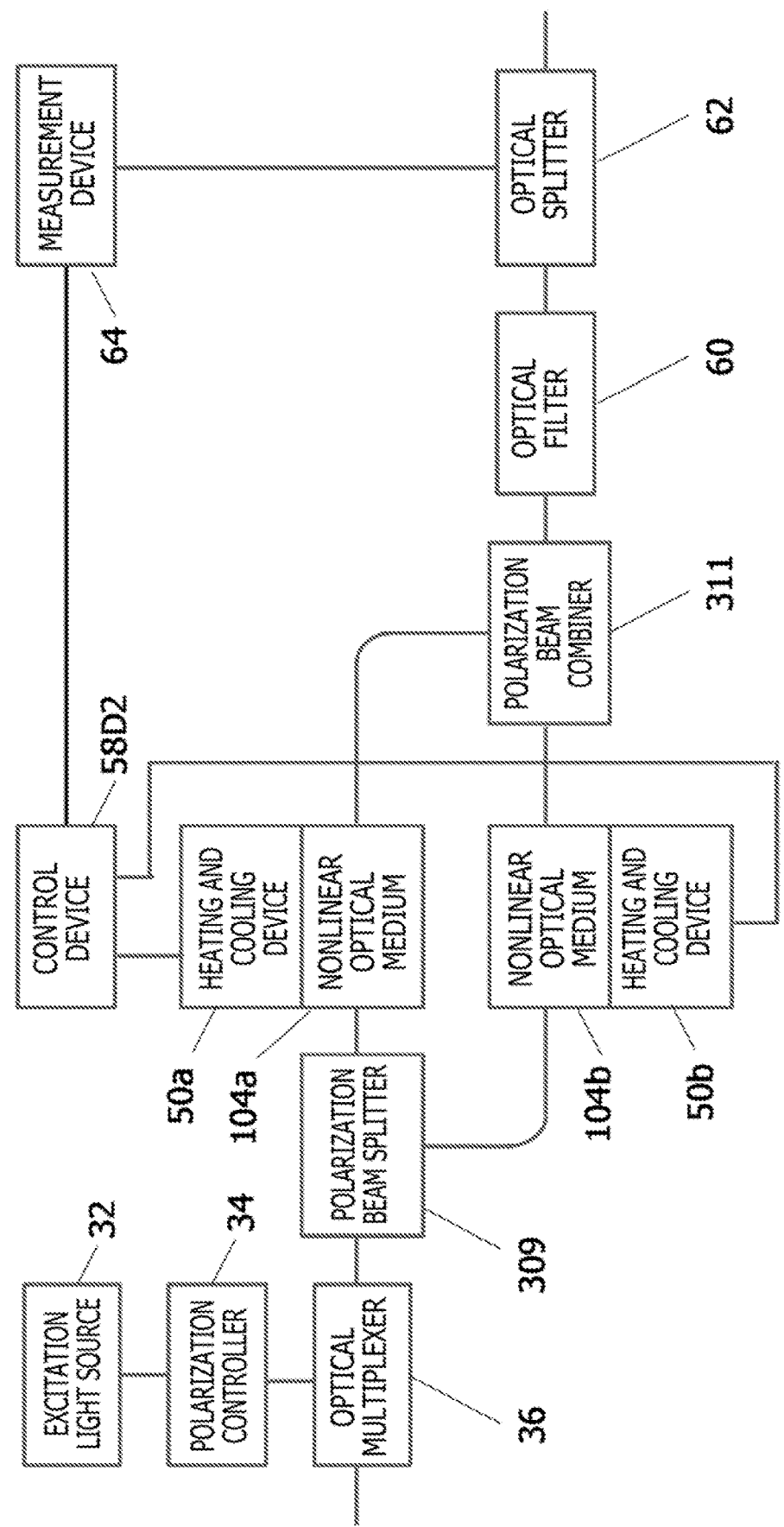
FIG. 44 is a diagram illustrating an example of a wavelength conversion device 402D2 in which a second polarization diversity configuration is used.

FIG. 44 is a diagram illustrating an example of a wavelength conversion device 402D2 in which a second polarization diversity configuration is used. As illustrated in FIG. 44, the wavelength conversion device 402D2 includes substantially all of the devices (for example, the optical multiplexer 36) included in the wavelength conversion device 102 of the second embodiment (see FIG. 15). However, the wavelength conversion device 402D2 includes another control device 58D2 instead of the control device 58 of the second embodiment. The wavelength conversion device 402D2 of FIG. 44 is a modification of the wavelength conversion device 102 of the second embodiment.

The control device 58D2 has substantially the same structure as the control device 58 of the second embodiment. Moreover, the control device 58D2 performs substantially the same operation as that of the control device 58.

However, the control device 58D2 is connected to a first heating and cooling device 50a described later and a second heating and cooling device 50b also described later, and controls both the first heating and cooling device 50a and the second heating and cooling device 50b. For example, the control device 58D2 transmits the same command 88 (for example, the command transmitted in step 12 of FIG. 19) to each of the first and second heating and cooling devices 50a and 50b, to control the first heating and cooling device 50a and the second heating and cooling device 50b. The control device 58D2 is a modification of the control device 58 of the second embodiment.

The wavelength conversion device 402D2 includes a first nonlinear optical medium 104a and a second nonlinear optical medium 104b. The first nonlinear optical medium 104a and the second nonlinear optical medium 104b are physically the same members as the nonlinear optical medium 104 described with reference to FIG. 15. The wavelength conversion device 402D2 includes the first heating and cooling device 50a and the second heating and cooling device 50b. The first heating and cooling device 50a and the second heating and cooling device 50b are physically the same devices as the heating and cooling device 50 described with reference to FIG. 15.

The wavelength conversion device 402D2 further includes the polarization beam splitter 309 and the polarization beam combiner 311.

Figure 45:
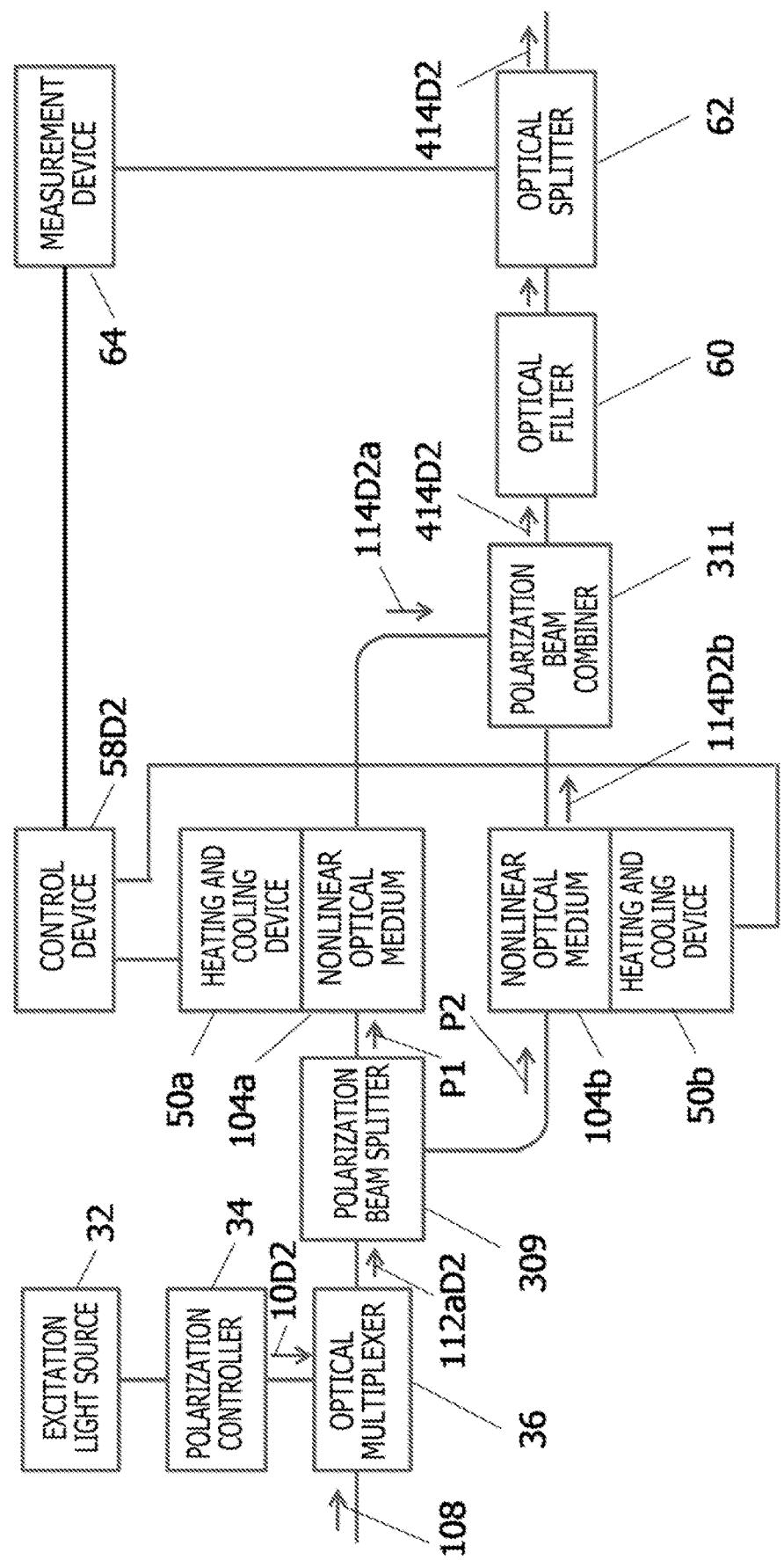
FIG. 45 is a diagram illustrating an example of a flow of the signal light 108 and the like in the wavelength conversion device 402D2.

FIG. 45 is a diagram illustrating an example of a flow of the signal light 108 and the like in the wavelength conversion device 402D2. The optical multiplexer 36 multiplexes excitation light 10D2 with the signal light 108, and outputs first light 112aD2. The excitation light 10D2 is light controlled by the polarization controller 34 so that a polarization direction of the excitation light 10D2 matches a third polarization direction. The excitation light 10D2 is light different from the excitation light 10 of the second embodiment in this respect and substantially the same in other respects. The third polarization direction is a direction inclined by 45° with respect to each of the first and second polarization directions (see "(7-1) First polarization diversity configuration").

The polarization beam splitter 309 splits the first light 112aD2 into the first polarized light P1 (which is the H polarized wave) and the second polarized light P2 (which is the V polarized wave). The polarization beam splitter 309 sends the first polarized light P1 to the first nonlinear optical medium 104a. The polarization beam splitter 309 further sends the second polarized light P2 to the second nonlinear optical medium 104b.

The first polarized light P1 includes a component (hereinafter referred to as a first excitation light component) in the first polarization direction of the excitation light 10D2 and a component (hereinafter referred to as a first signal light component) in the first polarization direction of the signal light 108. The first nonlinear optical medium 104a generates wavelength-converted light 114D2a from the first excitation light component and the first signal light component.

The second polarized light P2 includes a component (hereinafter referred to as a second excitation light component) in the second polarization direction of the excitation light 10D2 and a component (hereinafter referred to as a second signal light component) in the second polarization direction of the signal light 108. The second nonlinear optical medium 104b generates wavelength-converted light 114D2b from the second excitation light component and the second signal light component.

The polarization beam combiner 311 multiplexes the wavelength-converted light 114D2a with the wavelength-converted light 114D2b to generate the wavelength-converted light 414D2. A polarization direction (which is the first polarization direction) of the first excitation light component matches a polarization direction (which is the first polarization direction) of the first signal light component. Thus, even if the polarization direction of the signal light 108 changes, a wavelength conversion efficiency $E1_{D2}$ of the first signal light component does not change. For the same reason, even if the polarization direction of the signal light 108 changes, a wavelength conversion efficiency $E2_{D2}$ of the second signal light component does not change.

By the way, since the third polarization direction that is the polarization direction of the excitation light 10D2 is inclined by 45° with respect to the first polarization direction and the second polarization direction, an intensity of the first excitation light component is the same as an intensity of the second excitation light component. Thus, by matching a material and a structure of the first nonlinear optical medium 104a to a material and a structure of the second nonlinear optical medium 104b, it is possible to match the wavelength conversion efficiency $E1_{D2}$ of the first signal light component to the wavelength conversion efficiency $E2_{D2}$ of the second signal light component.

If both the wavelength conversion efficiencies $E1_{D2}$ and $E2_{D2}$ are substantially the same, the wavelength conversion efficiency of the signal light 108 is not affected by the polarization direction of the signal light 108. Thus, according to the wavelength conversion device 402D2 of FIG. 44, the fluctuation of the wavelength conversion efficiency due to the change in the polarization direction of the signal light 108 is suppressed. Moreover, according to the wavelength conversion device 402D2 of FIG. 44, a device structure can be simplified as compared with that of the wavelength conversion device 402D1 in which the first polarization diversity configuration is used.

The wavelength conversion device 402D2 of FIG. 44 is a device based on the wavelength conversion device 102 (see FIG. 15) of the second embodiment. However, the wavelength conversion device 402D2 may be a device based on the wavelength conversion device of the third embodiment and the present embodiment (see FIG. 36). Moreover, the wavelength conversion device 402D2 may be a device based on the wavelength conversion device of each modification of the second to third embodiments or the wavelength conversion device of each modification of the present embodiment (see FIG. 36). For example, the wavelength conversion device 402D2 may be a device including the additional light supply unit 201 (see FIG. 30).

(7-3) Third Polarization Diversity Configuration

Figure 46:
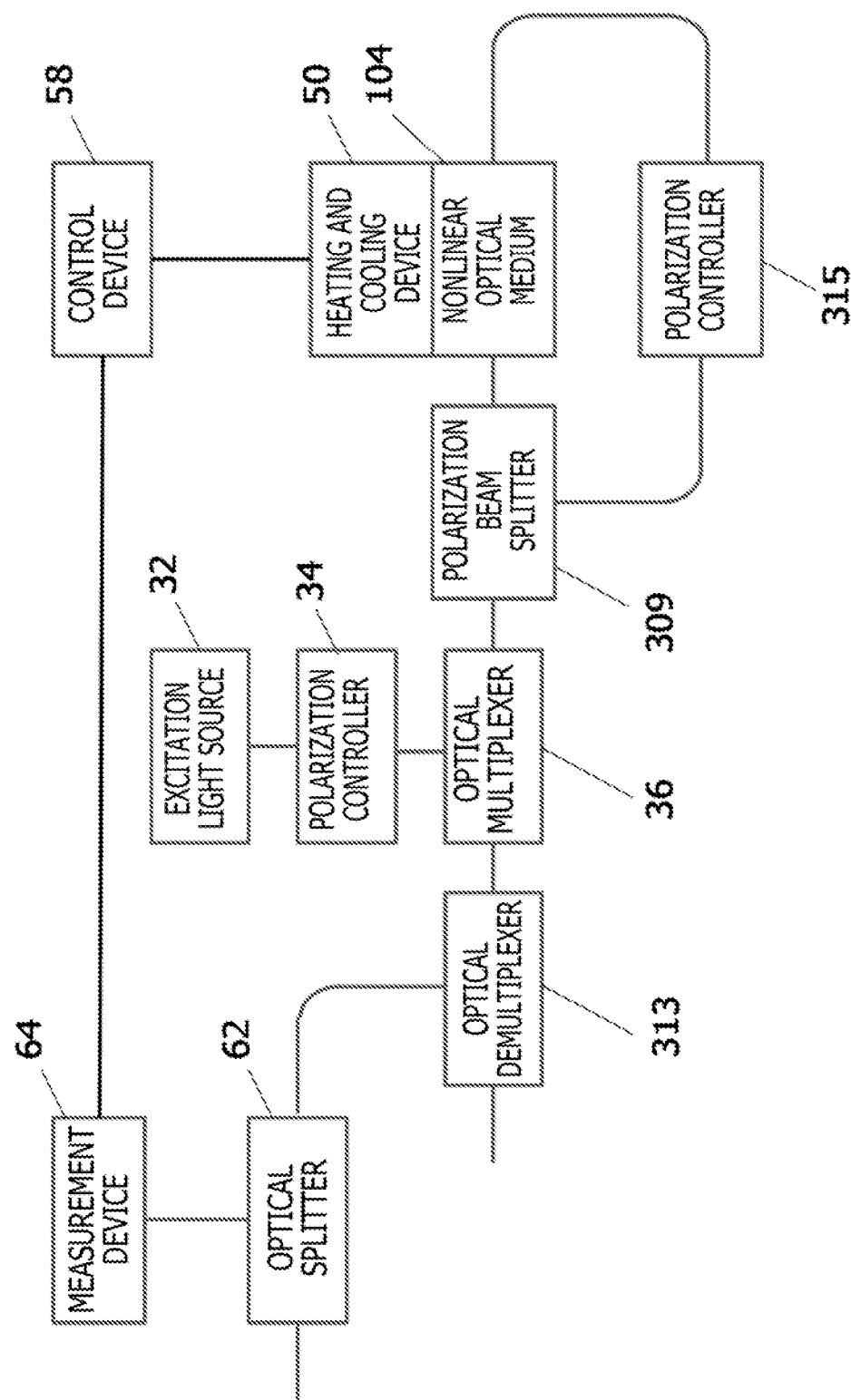
FIG. 46 is a diagram illustrating an example of a wavelength conversion device 402D3 in which a third polarization diversity configuration is used.

FIG. 46 is a diagram illustrating an example of a wavelength conversion device 402D3 in which a third polarization diversity configuration is used. As illustrated in FIG. 46, the wavelength conversion device 402D3 includes substantially all of the devices (for example, the optical multiplexer 36) included in the wavelength conversion device 102 of the second embodiment (see FIG. 15). However, the wavelength conversion device 402D3 of FIG. 46 does not include the optical filter 60.

In the wavelength conversion device 402D3 of FIG. 46, for example, the optical multiplexer 36 removes the excitation light propagating together with the wavelength-converted light instead of the optical filter 60. The wavelength conversion device 402D3 further includes the polarization beam splitter 309, an optical demultiplexer 313, and a polarization controller 315. The wavelength conversion device 402D3 is a modification of the wavelength conversion device 102 of the second embodiment.

Figure 47:
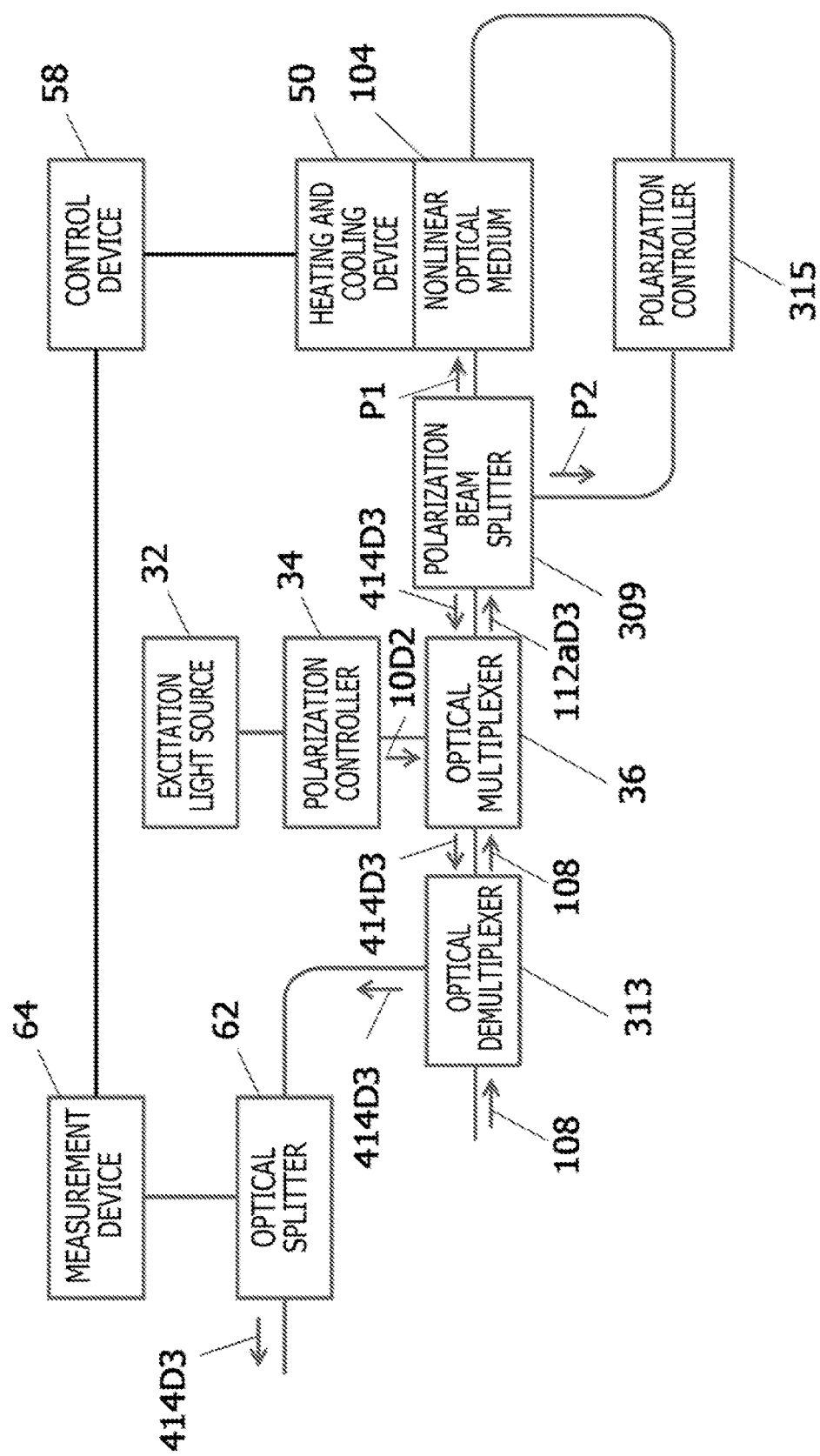
FIG. 47 is a diagram illustrating an example of a flow of the signal light 108 and the like in the wavelength conversion device 402D3.

FIG. 47 is a diagram illustrating an example of a flow of the signal light 108 and the like in the wavelength conversion device 402D3. The optical demultiplexer 313 allows the signal light 108 to pass through. The optical demultiplexer 313 is physically the same device as the first optical demultiplexer 305a (or the second optical demultiplexer 305b) described with reference to FIG. 37, for example.

The optical multiplexer 36 multiplexes the signal light 108 that passes through the optical demultiplexer 313 with the excitation light 10D2 to output first light 112aD3. The excitation light 10D2 is light controlled by the polarization controller 34 so that the polarization direction of the excitation light 10D2 matches the third polarization direction (see "(7-2) Second polarization diversity configuration"). The excitation light 10D2 is the excitation light 10D2 described with reference to FIG. 45. The polarization controller 34 is physically the same device as the polarization controller 34 described with reference to FIG. 15.

The polarization beam splitter 309 splits the first light 112aD3 into the first polarized light P1 (for example, the H polarized wave) and the second polarized light P2 (for example, the V polarized wave). The polarization direction of the first polarized light P1 is, for example, the first polarization direction. The polarization direction of the second polarized light P2 is, for example, the second polarization direction orthogonal to the first polarization direction.

The polarization beam splitter 309 sends the first polarized light P1 to one end of the nonlinear optical medium 104. The polarization beam splitter 309 further sends the second polarized light P2 to the other end of the nonlinear optical medium 104 via the polarization controller 315.

The nonlinear optical medium 104 generates fourth wavelength-converted light (not illustrated) from the first polarized light P1. The polarization controller 315 changes a polarization direction of the generated fourth wavelength-converted light from the first polarization direction to the second polarization direction.

The polarization controller 315 further changes the polarization direction of the second polarized light P2 from the second polarization direction to the first polarization direction. The nonlinear optical medium 104 generates fifth wavelength-converted light (not illustrated) from the second polarized light P2 whose polarization direction is changed.

The polarization beam splitter 309 multiplexes the fourth wavelength-converted light with the fifth wavelength-converted light to generate wavelength-converted light 414D3. The generated wavelength-converted light 414D3 passes through the optical multiplexer 36 and is incident on the optical demultiplexer 313. The optical demultiplexer 313 sends the wavelength-converted light 414D3 that passes through the optical multiplexer 36 to the optical splitter 62. The wavelength-converted light 414D3 is output to the outside of the wavelength conversion device 402D3 via the optical splitter 62.

The wavelength conversion device 402D3 generates the wavelength-converted light 414D3 by using the excitation light 10D2 inclined by 45° with respect to the first polarization direction and the second polarization direction orthogonal to the first polarization direction, so that the fluctuation of the wavelength conversion efficiency due to the change in the polarization direction of the signal light 108 is suppressed (see "(7-2) Second polarization diversity configuration").

Moreover, according to the wavelength conversion device 402D3 of FIG. 46, influence of polarization direction dependence of the wavelength conversion efficiency in the nonlinear optical medium 104 is suppressed. In most nonlinear optical media 104, a wavelength conversion efficiency of light in the first polarization direction (which is the H polarized wave) is slightly different from a wavelength conversion efficiency of light in the second polarization direction (which is the V polarized wave).

In the wavelength conversion device 402D3 of FIG. 46, the second polarized light P2 (see FIG. 47) is incident on the nonlinear optical medium 104 after the polarization direction is converted to the first polarization direction by the polarization controller 315. Thus, the polarization direction of the first polarized light P1 and the polarization direction of the second polarized light P2 are the same at the time of incident on the nonlinear optical medium 104.

For this reason, the wavelength conversion efficiencies of the first polarized light P1 and the second polarized light P2 are not affected by the polarization direction and are substantially the same. Thus, according to the wavelength conversion device 402D3 of FIG. 46, the influence of the polarization direction dependence of the wavelength conversion efficiency is suppressed.

The wavelength conversion device 402D3 of FIG. 46 is a device based on the wavelength conversion device 102 (see FIG. 15) of the second embodiment. However, the wavelength conversion device 402D3 may be a device based on the wavelength conversion device of the third embodiment and the present embodiment (see FIG. 36). Moreover, the wavelength conversion device 402D3 may be a device based on the wavelength conversion device of each modification of the second to third embodiments or the wavelength conversion device of each modification of the present embodiment (see FIG. 36). For example, the wavelength conversion device 402D3 may be a device including the additional light supply unit 201 (see FIG. 31).

(8) Application to Optical Transmission Device

Figure 48:
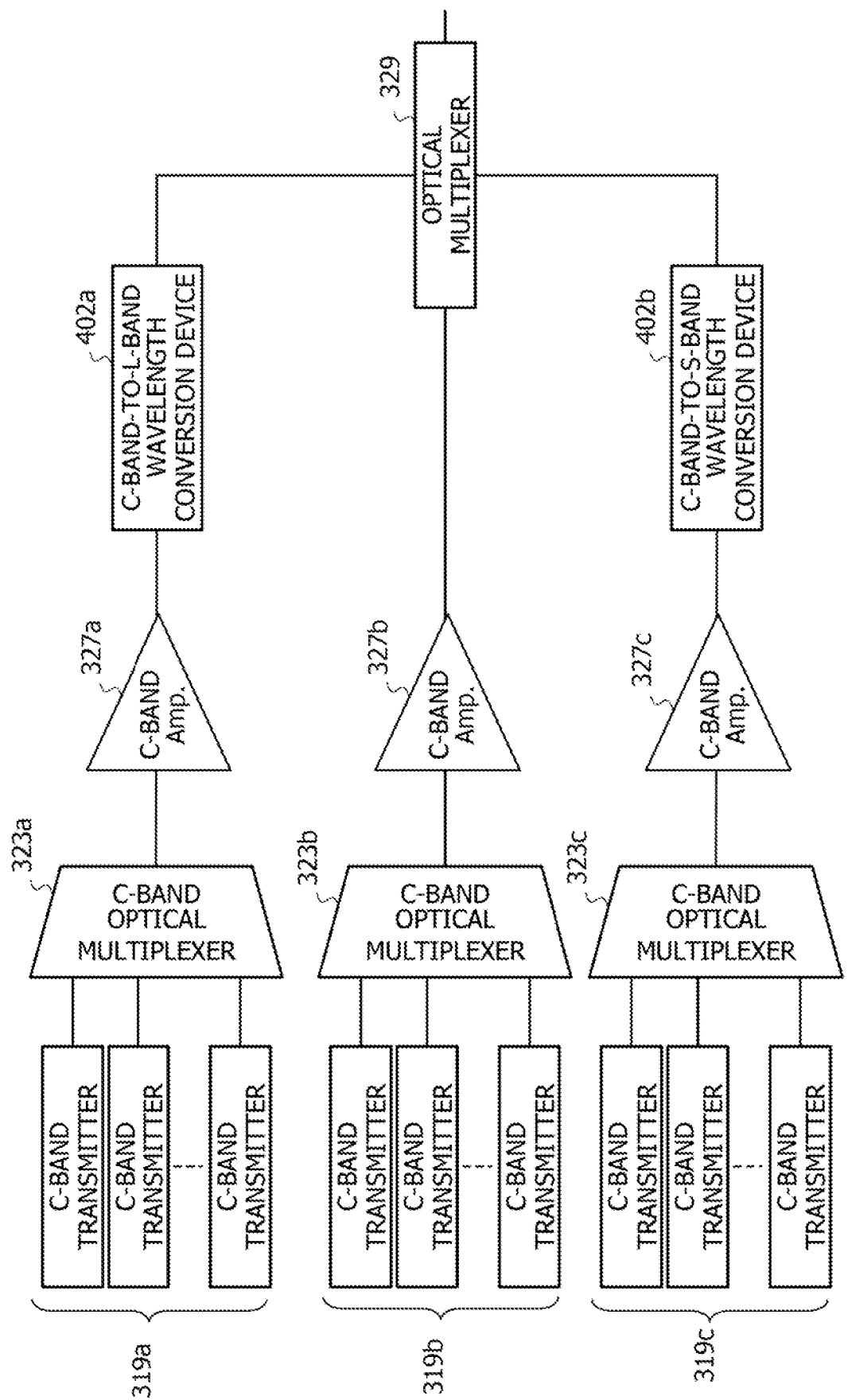
FIG. 48 is a diagram illustrating an example of an optical transmission device 317 including the wavelength conversion devices of the first to fourth embodiments.
Figure 49:
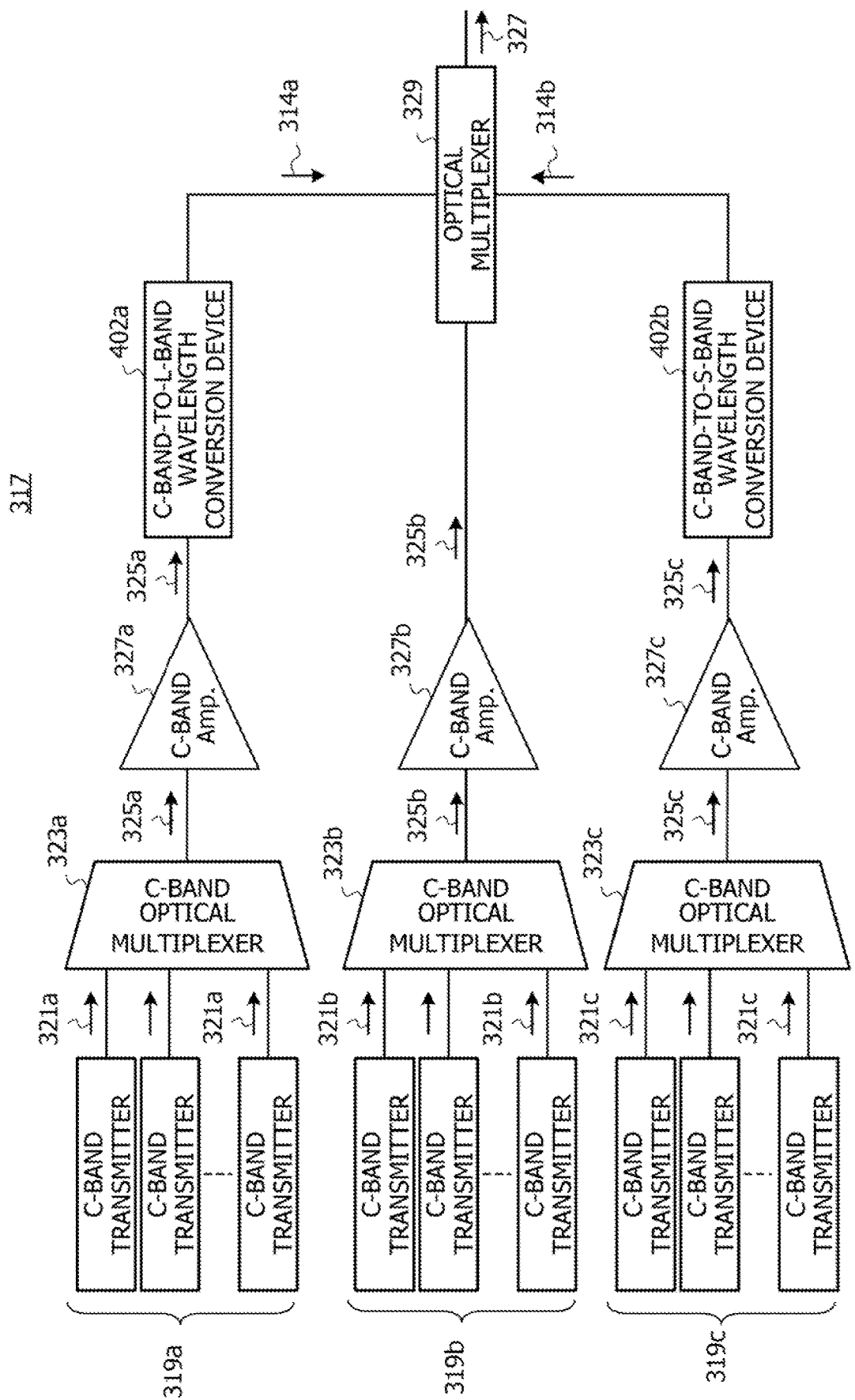
FIG. 49 is a diagram illustrating an example of a flow of signal light and the like in the optical transmission device 317.

FIG. 48 is a diagram illustrating an example of an optical transmission device 317 including the wavelength conversion devices of the first to third embodiments or the present embodiment (see FIG. 36). FIG. 49 is a diagram illustrating an example of a flow of signal light and the like in the optical transmission device 317.

The optical transmission device 317 is a device that transmits a plurality of signal lights over the S band, C band, and L band by using devices (C-band optical transmitters and C-band optical amplifiers) that process C-band signal light.

The optical transmission device 317 includes a plurality of C-band transmitters 319a (see FIG. 49) and a first C-band optical multiplexer 323a that multiplexes a plurality of signal lights 321a output by the plurality of C-band transmitters 319a. The plurality of signal lights 321a is signal lights having different wavelengths. A C-band transmitter is an optical transmitter that outputs C-band signal light. A C-band optical multiplexer is an optical multiplexer that multiplexes C-band signal lights.

The optical transmission device 317 further includes a plurality of C-band transmitters 319b (see FIG. 49) and a second C-band optical multiplexer 323b that multiplexes a plurality of signal lights 321b output by the plurality of C-band transmitters 319b. The plurality of signal lights 321b is signal lights having different wavelengths.

The optical transmission device 317 further includes a plurality of C-band transmitters 319c and a third C-band optical multiplexer 323c that multiplexes a plurality of signal lights 321c (see FIG. 49) output by the plurality of C-band transmitters 319c. The plurality of signal lights 321c is signal lights having different wavelengths.

The optical transmission device 317 further includes a first C-band optical amplifier (which is an optical amplifier that amplifies C-band signal light) 327a that amplifies first wavelength-multiplexed light 325a including the plurality of signal lights 321a multiplexed by the first C-band optical multiplexer 323a. The optical transmission device 317 further includes a second C-band optical amplifier 327b that amplifies second wavelength-multiplexed light 325b including the plurality of signal lights 321b multiplexed by the second C-band optical multiplexer 323b. The optical transmission device 317 further includes a third C-band optical amplifier 327c that amplifies third wavelength-multiplexed light 325c including the plurality of signal lights 321c multiplexed by the third C-band optical multiplexer 323c.

The optical transmission device 317 further includes a wavelength conversion device (hereinafter, referred to as a C-band-to-L-band wavelength conversion device) 402a that generates L-band light (hereinafter, referred to as first wavelength-converted light 314a) from the amplified first wavelength-multiplexed light 325a. The C-band-to-L-band wavelength conversion device 402a is, for example, the wavelength conversion device 402D1 having the polarization diversity configuration described with reference to FIG. 42. The excitation lights 10P1 and 10P2 for the C-band-to-L-band wavelength conversion device 402a are, for example, lights whose wavelengths are located at the boundary between the C band and the L band.

The optical transmission device 317 further includes a wavelength conversion device (hereinafter, referred to as a C-band-to-S-band wavelength conversion device) 402b that generates S-band light (hereinafter referred to as second wavelength-converted light 314b) from the amplified third wavelength-multiplexed light 325c. The C-band-to-S-band wavelength conversion device 402b is, for example, the wavelength conversion device 402D1 having the polarization diversity configuration described with reference to FIG. 42. The excitation lights 10P1 and 10P2 for the C-band-to-S-band wavelength conversion device 402b are, for example, lights whose wavelengths are located at the boundary between the C band and the S band.

The C-band-to-L-band wavelength conversion device 402a and the C-band-to-S-band wavelength conversion device 402b may be, for example, the wavelength conversion device 402D2 described with reference to FIG. 44 or the wavelength conversion device 402D3 described with reference to FIG. 46.

The optical transmission device 317 further includes an optical multiplexer 329 that multiplexes the first wavelength-converted light 314a, the amplified second wavelength-multiplexed light 325b, and the second wavelength-converted light 314b to form output light 327. The output light 327 includes the first wavelength-converted light 314a that is L-band wavelength-multiplexed light, the second wavelength-multiplexed light 325b that is C-band wavelength-multiplexed light, and the second wavelength-converted light 314b that is S-band wavelength-multiplexed light.

In other words, the optical transmission device 317 is an optical transmission device that transmits a plurality of signal lights (which is the output light 327) over the S band, C band, and L band by using devices (C-band optical transmitters and C-band optical amplifiers) that process C-band signal light.

Manufacturing an optical transmission device by preparing a device that processes S-band signal light, a device that processes C-band signal light, and a device that processes L-band signal light complicates the manufacturing of the optical transmission device. On the other hand, the optical transmission device 317 of FIG. 48 can be manufactured by preparing only the device that processes the C-band signal light, so that, according to the optical transmission device 317 of FIG. 48, the manufacturing complexity is suppressed.

Moreover, the wavelength conversion device having the polarization diversity configuration is used, so that, according to the optical transmission device 317 of FIG. 48, an optical transmission device is provided in which the output light 327 is less likely to be affected by changes in the polarization directions of the signal lights 321a, 321b, and 321c.

(9) Application to Optical Reception Device

Figure 50:
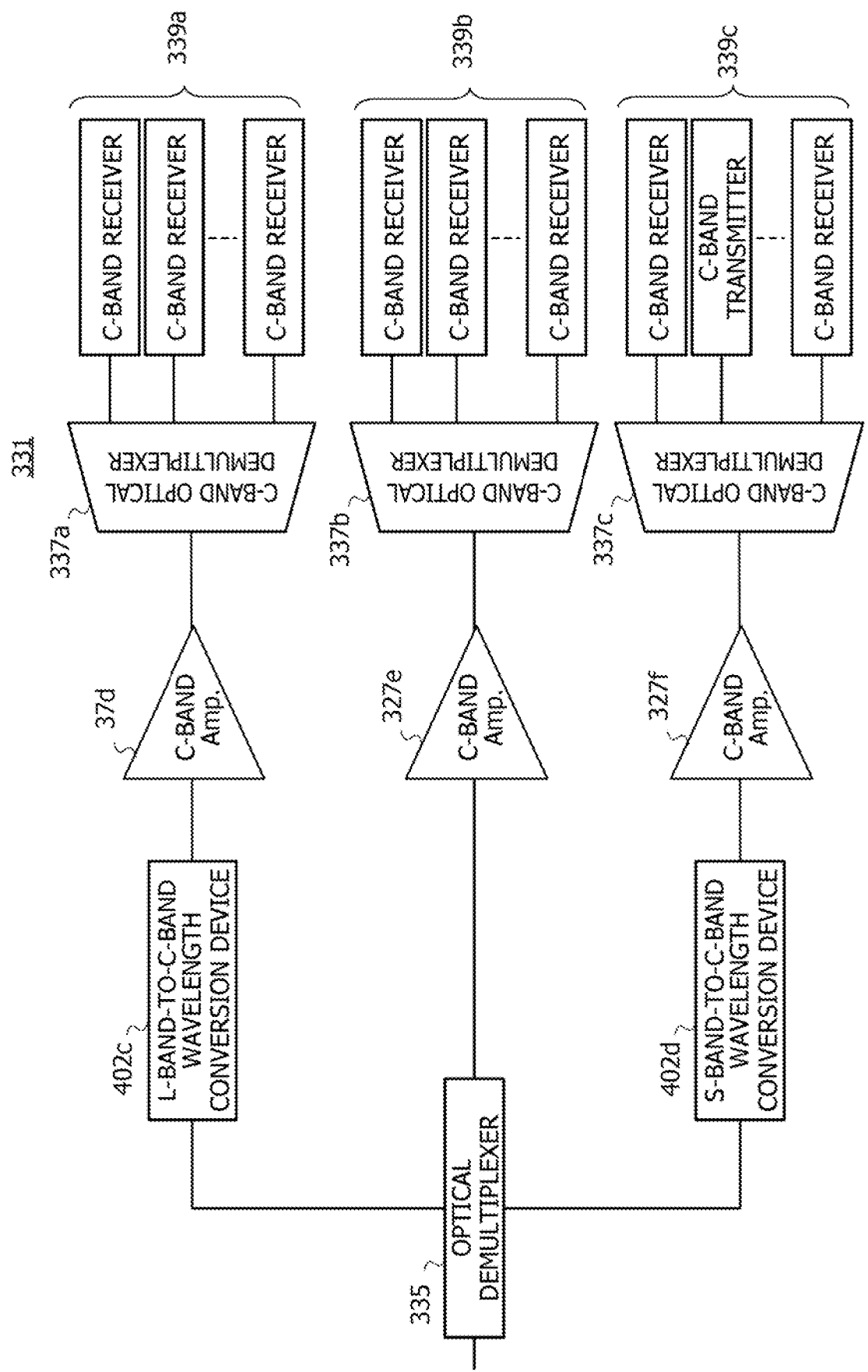
FIG. 50 is a diagram illustrating an example of an optical reception device 331 including the wavelength conversion devices of the first to fourth embodiments.
Figure 51:
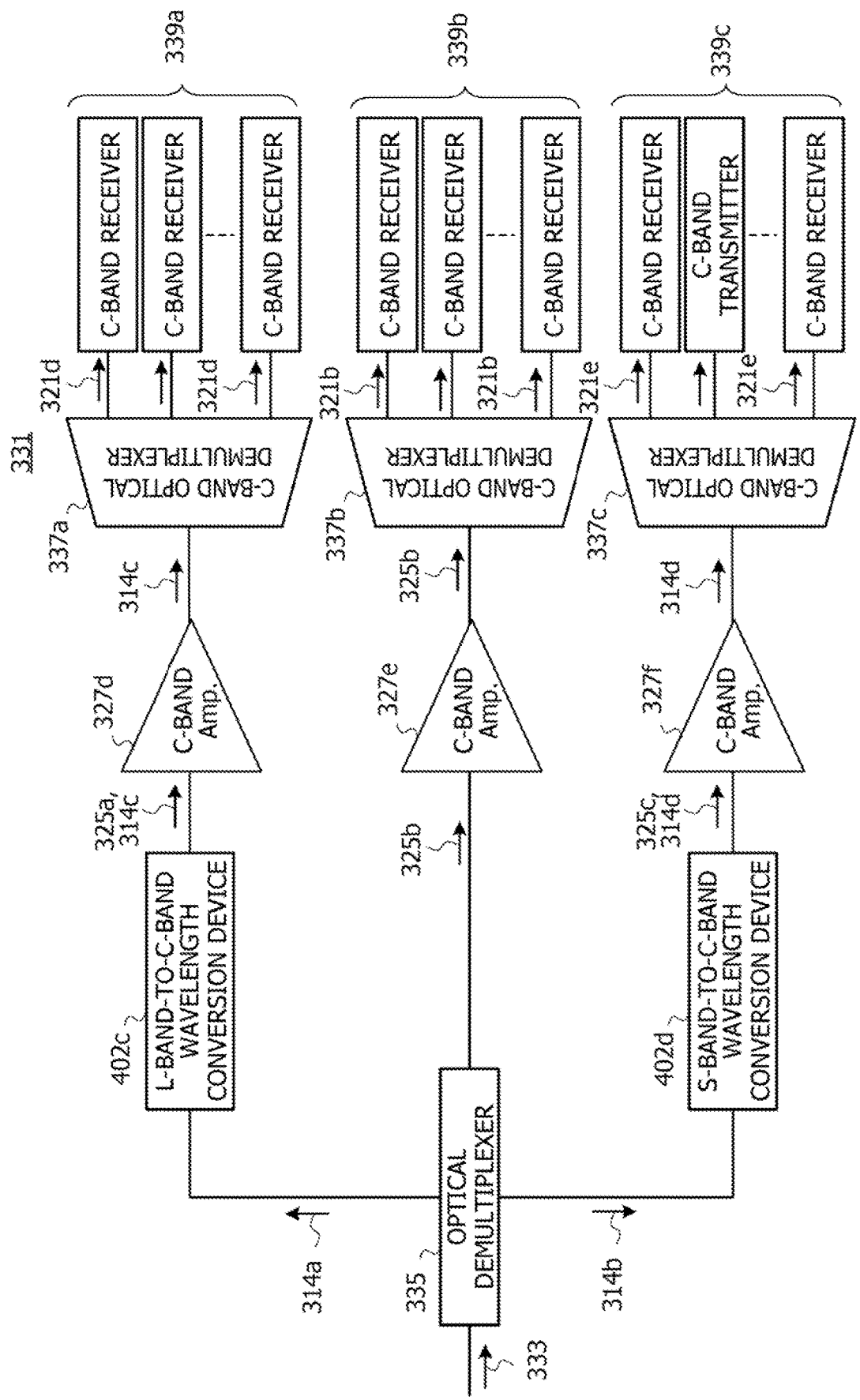
FIG. 51 is a diagram illustrating an example of a flow of signal light and the like in the optical reception device 331.

FIG. 50 is a diagram illustrating an example of an optical reception device 331 including the wavelength conversion devices of the first to third embodiments and the present embodiment (see FIG. 36). FIG. 51 is a diagram illustrating an example of a flow of signal light and the like in the optical reception device 331.

The optical reception device 331 is a device that receives a plurality of signal lights over the S band, C band, and L band and converts the signal lights into electric signals by using devices (C-band optical receivers and C-band optical amplifiers) that process C-band signal light.

The optical reception device 331 of FIG. 50 is a device that receives the output light 327 of the optical transmission device 317 of FIG. 48 and converts the output light 327 into an electric signal. The optical reception device 331 includes an optical demultiplexer 335 (see FIG. 51) that splits input light 333 (see FIG. 51) into the first wavelength-converted light 314a (see FIG. 49) in the L band, the second wavelength-multiplexed light 325b in the C band, and the second wavelength-converted light 314b in the S band. Here, the input light 333 is the output light 327 of the optical transmission device 317 incident on the optical reception device 331 via an optical transmission line (not illustrated).

The optical reception device 331 further includes a wavelength conversion device (hereinafter referred to as an L-band-to-C-band wavelength conversion device) 402c that generates C-band light (hereinafter referred to as third wavelength-converted light 314c) from the first wavelength-converted light 314a. The L-band-to-C-band wavelength conversion device 402c is, for example, the wavelength conversion device 402D1 having the polarization diversity configuration described with reference to FIG. 42. The excitation lights 10P1 and 10P2 for the L-band-to-C-band wavelength conversion device 402c are, for example, lights whose wavelengths are located at the boundary between the L band and the C band. The third wavelength-converted light 314c is the first wavelength-multiplexed light 325a regenerated by the L-band-to-C-band wavelength conversion device 402c.

The optical reception device 331 further includes a wavelength conversion device (hereinafter, referred to as an S-band-to-C-band wavelength conversion device) 402d that generates C-band light (hereinafter referred to as fourth wavelength-converted light 314d) from the second wavelength-converted light 314b. The S-band-to-C-band wavelength conversion device 402d is, for example, the wavelength conversion device 402D1 having the polarization diversity configuration described with reference to FIG. 42. The excitation lights 10P1 and 10P2 for the S-band-to-C-band wavelength conversion device 402d are, for example, lights whose wavelengths are located at the boundary between the S band and the C band. The fourth wavelength-converted light 314d is the third wavelength-multiplexed light 325c regenerated by the S-band-to-C-band wavelength conversion device 402d.

The L-band-to-C-band wavelength conversion device 402c and the S-band-to-C-band wavelength conversion device 402d may be, for example, the wavelength conversion device 402D2 described with reference to FIG. 44 or the wavelength conversion device 402D3 described with reference to FIG. 46.

The optical reception device 331 further includes a fourth C-band optical amplifier 327d that amplifies the third wavelength-converted light 314c. The optical reception device 331 further includes a fifth C-band optical amplifier 327e that amplifies the second wavelength-multiplexed light 325b. The optical reception device 331 further includes a sixth C-band optical amplifier 327f that amplifies the fourth wavelength-converted light 314d.

The optical reception device 331 further includes a first C-band optical demultiplexer (which is a demultiplexer that separates a plurality of signal lights in the C band depending on the wavelengths) 337a that splits the amplified third wavelength-converted light 314c into a plurality of signal lights 321d. The signal light 321d is the first signal light 321a (see FIG. 49) regenerated by the L-band-to-C-band wavelength conversion device 402c. The first signal light 321a is C-band signal light.

The optical reception device 331 further includes a second C-band optical demultiplexer 337b that splits the amplified second wavelength-multiplexed light 325b into the second signal lights 321b (see FIG. 49). The second signal light 321b is C-band signal light.

The optical reception device 331 further includes a third C-band optical demultiplexer 337c that splits the amplified fourth wavelength-converted light 314d into a plurality of signal lights 321e. The signal light 321e is the third signal light 321c (see FIG. 49) regenerated by the S-band-to-C-band wavelength conversion device 402d. The third signal light 321c is C-band signal light.

The optical reception device 331 further includes a plurality of C-band optical receivers (which are optical receivers that convert C-band signal lights into electric signals) 339a that receive the fourth signal light 321d and converts the fourth signal light 321d into an electric signal. The optical reception device 331 further includes a plurality of C-band optical receivers 339b that receives the second signal light 321b and converts the second signal light 321b into an electric signal. The optical reception device 331 further includes a plurality of C-band optical receivers 339c that receives fifth signal light 321e and converts the fifth signal light 321e into an electrical signal.

In other words, the optical reception device 331 is an optical reception device that receives a plurality of signal lights (which is the input light 333) over the S band, C band, and L band by using devices (C-band optical receivers and C-band optical amplifiers) that process C-band signal light.

Manufacturing an optical reception device by preparing a device that processes S-band signal light, a device that processes C-band signal light, and a device that processes L-band signal light complicates the manufacturing of the optical reception device. On the other hand, the optical reception device 331 of FIG. 50 can be manufactured by preparing only the device that processes the C-band signal light, so that, according to the optical reception device 331 of FIG. 50, the manufacturing complexity is suppressed.

Moreover, the wavelength conversion device having the polarization diversity configuration is used, so that, according to the optical reception device 331 of FIG. 50, an optical reception device is provided that is not easily affected by a change in a polarization direction of the input light 333.

The fourth embodiment is an example of the fourth modification of the first embodiment. However, although the number of the signal lights 8 in the fourth modification of the first embodiment is one, the number of the signal lights 308 of the fourth embodiment is two or more. Thus, according to the wavelength conversion device and the wavelength conversion method of the fourth embodiment, it is possible to suppress the fluctuation of the wavelength conversion efficiency due to the change in the environmental temperature while generating the wavelength-converted light from the wavelength-multiplexed signal whose intensity fluctuates.

Moreover, in the fourth embodiment, the temperature of the nonlinear optical medium 304 is controlled on the basis of the intensity of the Raman scattered light irrelevant to the intensity of the signal light 308, so that, according to the fourth embodiment, the fluctuation of the wavelength conversion efficiency due to the change in the intensity of the signal light 308 is also suppressed.

Moreover, the Raman scattered light is generated by the excitation light 10 for wavelength conversion, so that, according to the fourth embodiment, it is possible to suppress the fluctuation of the wavelength conversion efficiency due to the change in the intensity of the signal light 308 without increasing the size of the device (for example, adding an additional light supply unit).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wavelength conversion device comprising:
a nonlinear optical medium configured to generate light from signal light and excitation light, the excitation light having a wavelength different from a wavelength of the signal light and having a second electric field strength than a first electric field strength of the signal light, the light having a wavelength different from a wavelengths of the signal light and the excitation light; and
a controller configured to control a first temperature of the nonlinear optical medium based on an intensity of the light,
wherein the light includes first wavelength-converted light and second wavelength-converted light,
wherein the controller controls the first temperature based on an intensity of light having a wavelength farthest from the wavelength of the excitation light out of the first wavelength-converted light and the second wavelength-converted light.

2. The wavelength conversion device according to claim 1, wherein the controller controls the first temperature to cause the intensity of the light to be increased.

3. The wavelength conversion device according to claim 1, wherein the controller controls the first temperature based on an intensity of branch light that branches off from the light, and when the light includes a plurality of generated lights having different wavelengths, the branch light includes a plurality of split lights obtained by splitting each of the generated lights, or a part of the plurality of generated lights.

4. The wavelength conversion device according to claim 1, wherein
the signal light includes first signal light and second signal light having a wavelength different from a wavelength of the first signal light,
the first wavelength-converted light is generated from the first signal light and the excitation light, and the second wavelength-converted light is generated from the second signal light and the excitation light.

5. The wavelength conversion device according to claim 1, wherein the nonlinear optical medium generates, from the signal light, the excitation light, and additional light having a wavelength different from a wavelength of the signal light and the excitation light, the wavelength of the light being different from a wavelength of the additional light, the light includes wavelength-converted light generated from the signal light and the excitation light, and third wavelength-converted light generated from the additional light and the excitation light, and the controller controls the first temperature based on an intensity of the third wavelength-converted light of the light.

6. The wavelength conversion device according to claim 1, wherein the controller controls the first temperature to cause the first temperature to be dose to a target value of the first temperature, based on the intensity of the light.

7. The wavelength conversion device according to claim 6, wherein the target value is a second temperature at which an absolute value of a difference between the wavelength of the excitation light and a zero dispersion wavelength of the nonlinear optical medium is less than or equal to a certain value.

8. The wavelength conversion device according to claim 6, wherein the excitation light includes first excitation light and second excitation light having a wavelength different from a wavelength of the first excitation light, and the target value is a third temperature at which a difference between a wavelength corresponding to an average value of a frequency of the first excitation light and a frequency of the second excitation light and a zero dispersion wavelength of the nonlinear optical medium is less than or equal to a certain value.

9. The wavelength conversion device according to claim 6, wherein the light includes wavelength-converted light generated from the signal light and the excitation light, Stokes light, and anti-Stokes light, the Stokes light and anti-Stokes being generated by Raman scattering from the excitation light, and the controller controls the first temperature to cause the first temperature to be dose to the target value, based on an intensity of each of the Stokes light and the anti-Stokes light of the light.

10. The wavelength conversion device according to claim 1, wherein the light is generated by second-order nonlinear polarization or third-order nonlinear polarization of the nonlinear optical medium.

11. The wavelength conversion device according to claim 1, wherein the controller controls at least one of heating or cooling of the nonlinear optical medium based on the intensity of the light.

12. The wavelength conversion device according to claim 11, further comprising;
a coating film configured to surround the nonlinear optical medium, a heating wire embedded in the coating film, and a first power supply that supplies electric power to the heating wire, wherein the controller controls the first power supply based on the intensity of the light.

13. The wavelength conversion device according to claim 11, further comprising; a coating film configured to surround the nonlinear optical medium, wherein the coating film includes a material that absorbs infrared rays and generates heat, a light source that generates the infrared rays that are emitted to the coating film or guided through the nonlinear optical medium, and a second power supply that supplies electric power to the light source, and the controller controls the second power supply based on the intensity of the light.

14. The wavelength conversion device according to claim 11, further comprising: a liquid, wherein the liquid in which the nonlinear optical medium is immersed, and the nonlinear optical medium is heating or cooling of through the liquid.

15. A wavelength conversion method comprising:
generating light from signal light and excitation light, the excitation light having a wavelength different from a wavelength of the signal light and having a second electric field strength than a first electric field strength of the signal light, the light having a wavelength different from a wavelengths of the signal light and the excitation light;
controlling a first temperature of the nonlinear optical medium based on an intensity of the light; and
outputting the light,
wherein the light includes first wavelength-converted light and second wavelength-converted light,
wherein the first temperature is controlled based on an intensity of light having a wavelength farthest from the wavelength of the excitation light out of the first wavelength-converted light and the second wavelength-converted light.

16. A wavelength conversion device comprising:
a nonlinear optical medium configured to generate a first wavelength converted light from signal light and excitation light, and generate a second wavelength converted light from the excitation light and adding light, the excitation light having a wavelength different from a wavelength of the signal light and having a second electric field strength than a first electric field strength of the signal light, the first wavelength converted light having a wavelength different from a wavelengths of the signal light and the excitation light, the adding light having a wavelength different from the wavelengths of the signal light and the excitation light;
a controller configured to control a first temperature of the nonlinear optical medium based on an intensity of the second wavelength converted light; and
a transmitter configured to output the first wavelength converted light,
wherein the light includes first wavelength-converted light and second wavelength-converted light,
wherein the controller controls the first temperature based on an intensity of light having a wavelength farthest from the wavelength of the excitation light out of the first wavelength-converted light and the second wavelength-converted light.

\* \* \* \* \*